United States Patent [19]
Kwoleck

[11] 3,819,587
[45] June 25, 1974

[54] WHOLLY AROMATIC CARBOCYCLIC POLYCARBONAMIDE FIBER HAVING ORIENTATION ANGLE OF LESS THAN ABOUT 45°

[75] Inventor: Stephanie Louise Kwoleck, Wilmington, Del.

[73] Assignee: E. I. du Pont de Nemours and Company, Wilmington, Del.

[22] Filed: Sept. 7, 1971

[21] Appl. No.: 178,184

Related U.S. Application Data

[63] Continuation-in-part of Ser. No. 827,345, May 23, 1969, Pat. No. 3,671,542, which is a continuation-in-part of Ser. No. 736,410, June 12, 1968, abandoned, which is a continuation-in-part of Ser. No. 644,851, June 9, 1967, abandoned, which is a continuation-in-part of Ser. No. 556,934, June 13, 1966, abandoned.

[52] U.S. Cl............. 260/78 R, 57/140 R, 161/227, 260/30.2, 250/30.6 R, 260/30.8 R, 260/32.6 N, 260/37 N, 260/78 A, 260/78 S, 264/210

F, 264/235
[51] Int. Cl....................... C08g 20/20, C08g 20/38
[58] Field of Search... 260/78 R, 78 A, 78 S, 47 CZ

[56] References Cited
UNITED STATES PATENTS

| | | | |
|---|---|---|---|
| 3,079,219 | 2/1963 | King | 260/78 S |
| 3,094,511 | 6/1963 | Hill et al. | 260/78 R |
| 3,228,902 | 1/1966 | Beste | 260/78 S |
| 3,287,324 | 11/1966 | Sweeny | 260/78 R |
| 3,354,127 | 11/1967 | Hill et al. | 260/78 R |
| 3,554,971 | 1/1971 | Jones et al. | 260/78 R |

*Primary Examiner*—Harold D. Anderson

[57] ABSTRACT

Fibers of unique internal structure (evidenced by low orientation angle and/or high sonic velocity) and exceptionally high tensile properties (e.g., initial modulus) are prepared from spinning dopes of selected carbocyclic aromatic polyamides in suitable liquid media.

16 Claims, 9 Drawing Figures

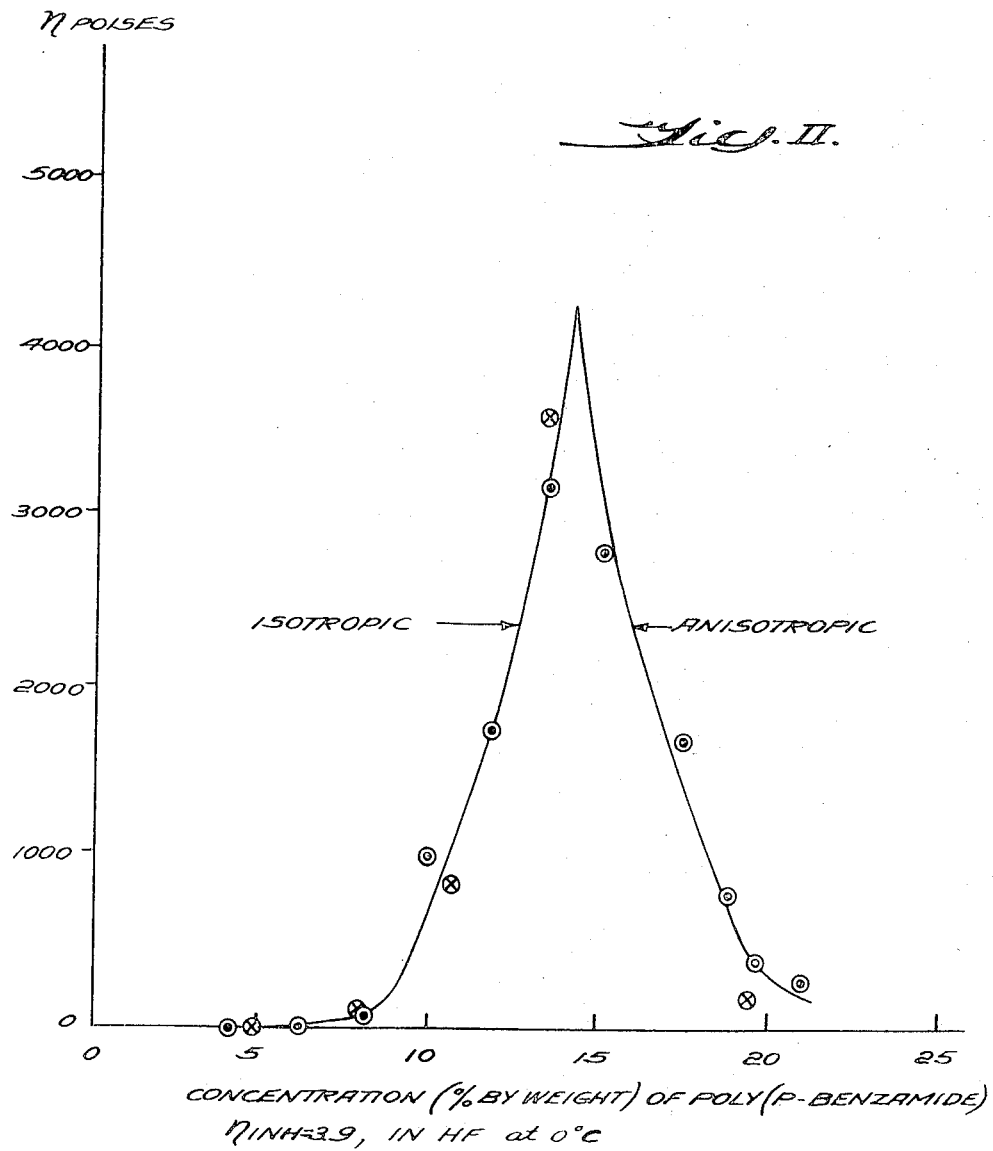

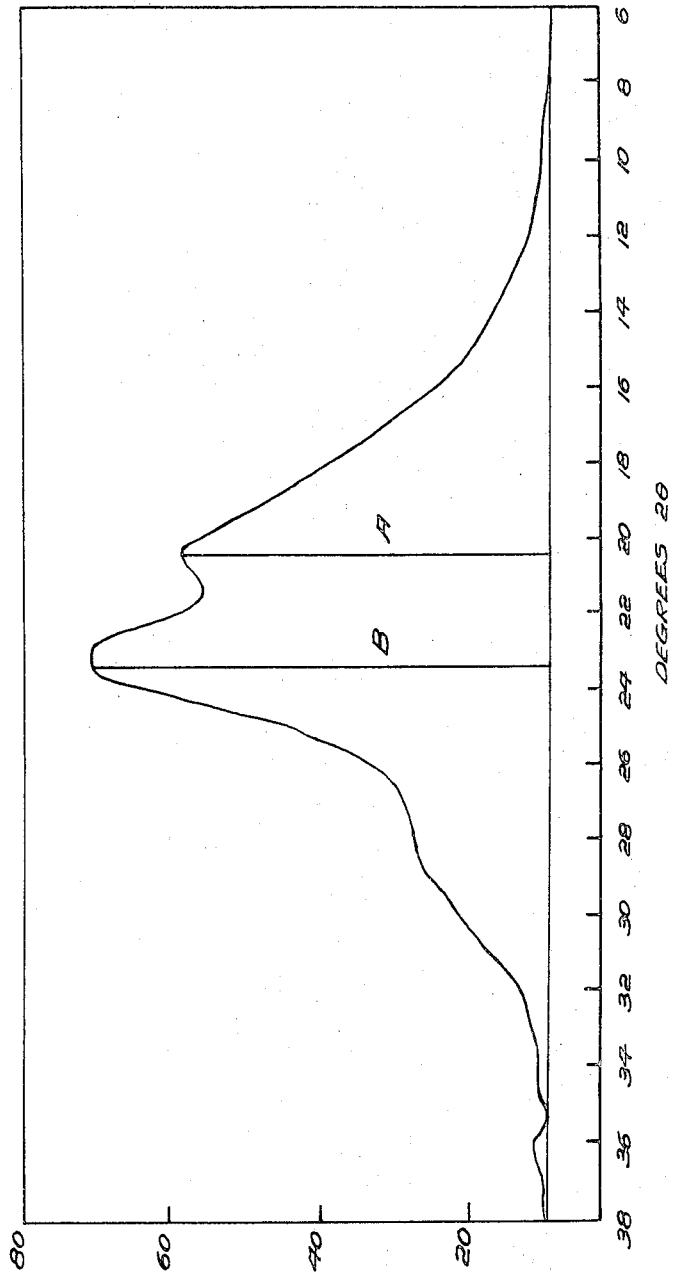

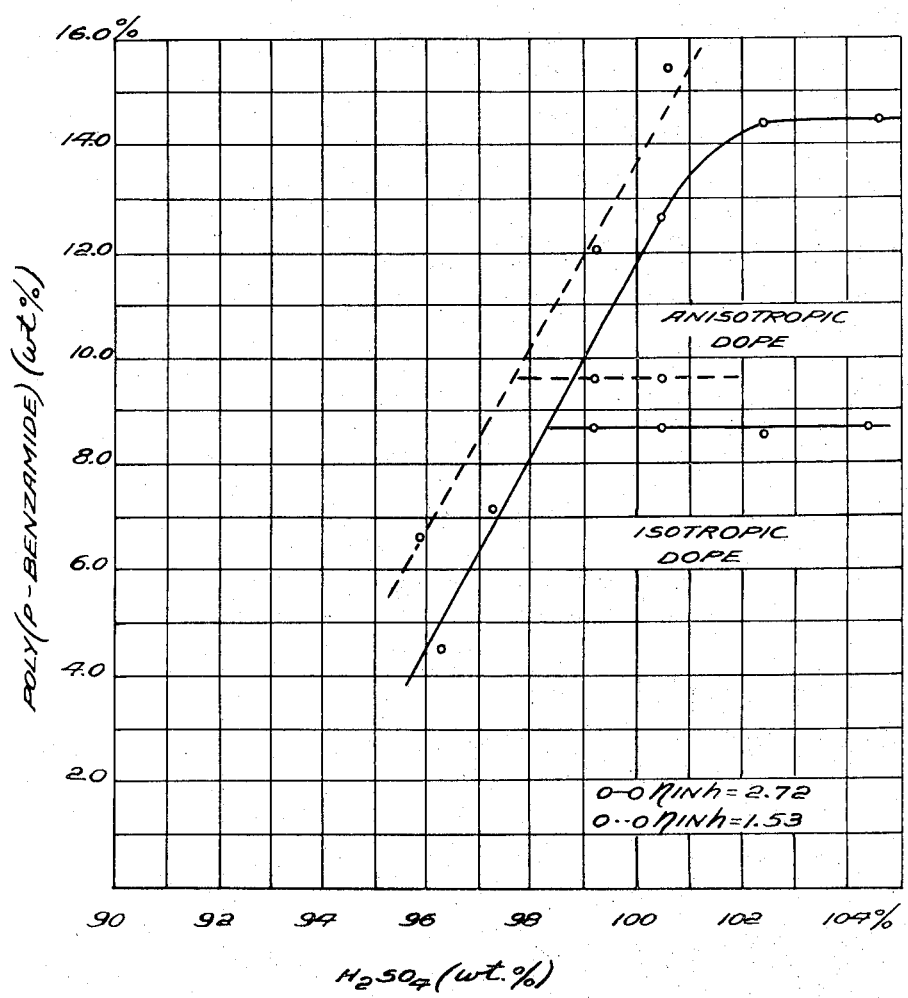

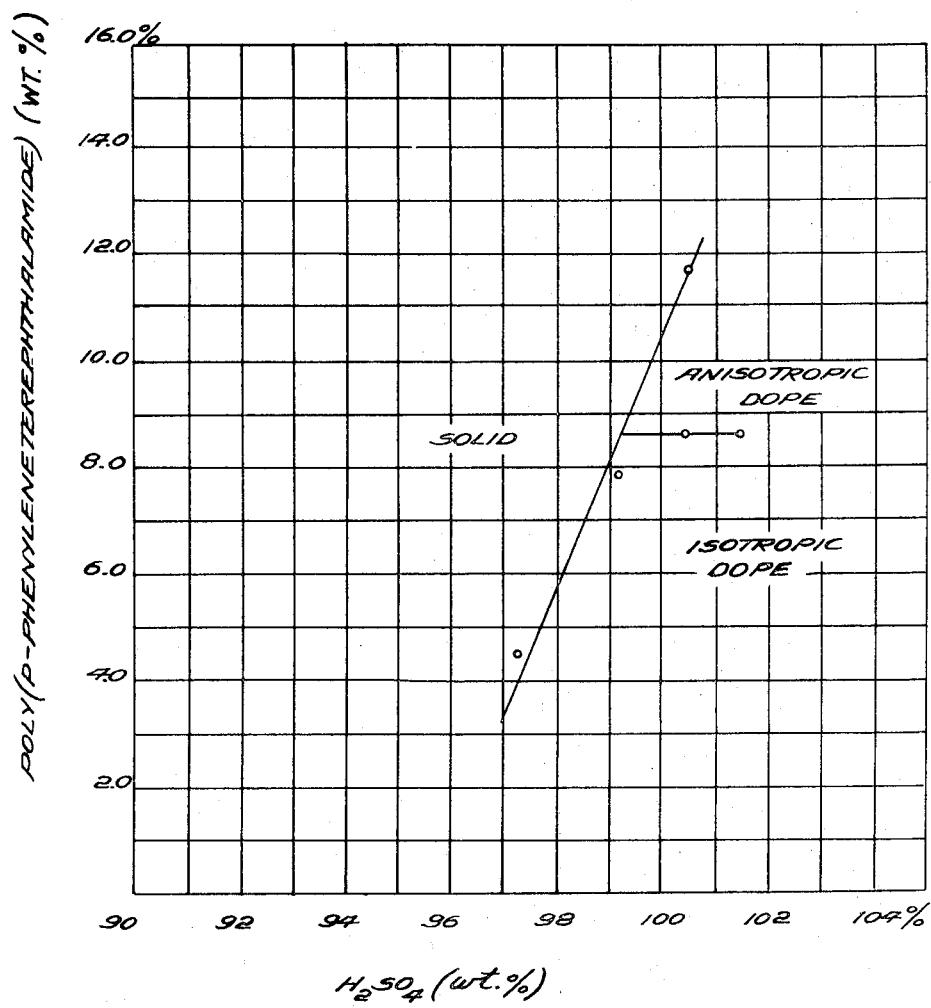

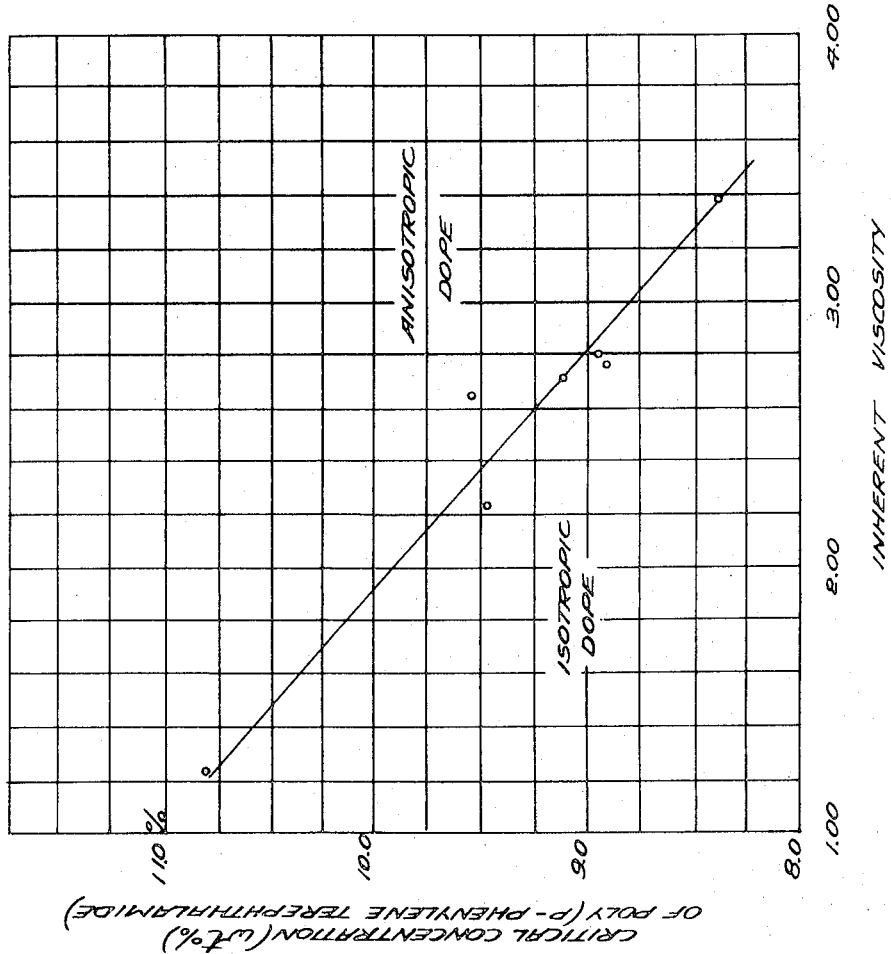

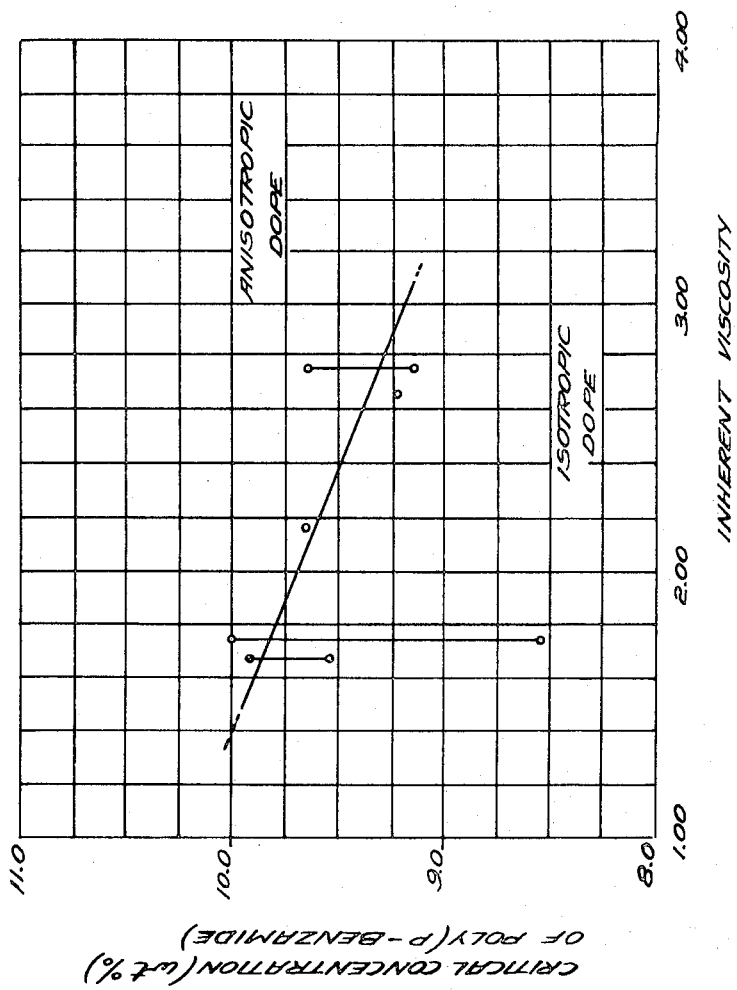
FIG. VII.

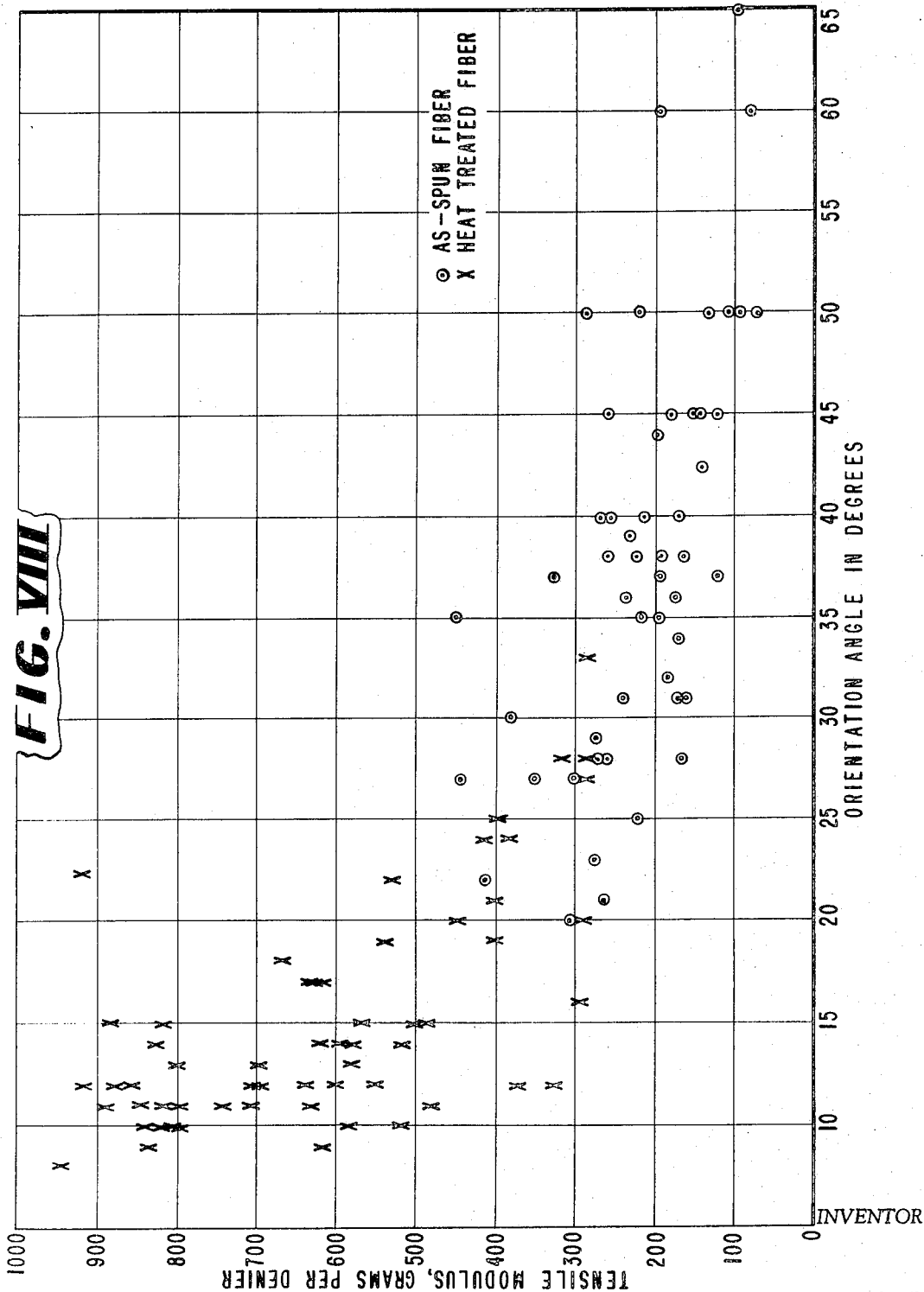

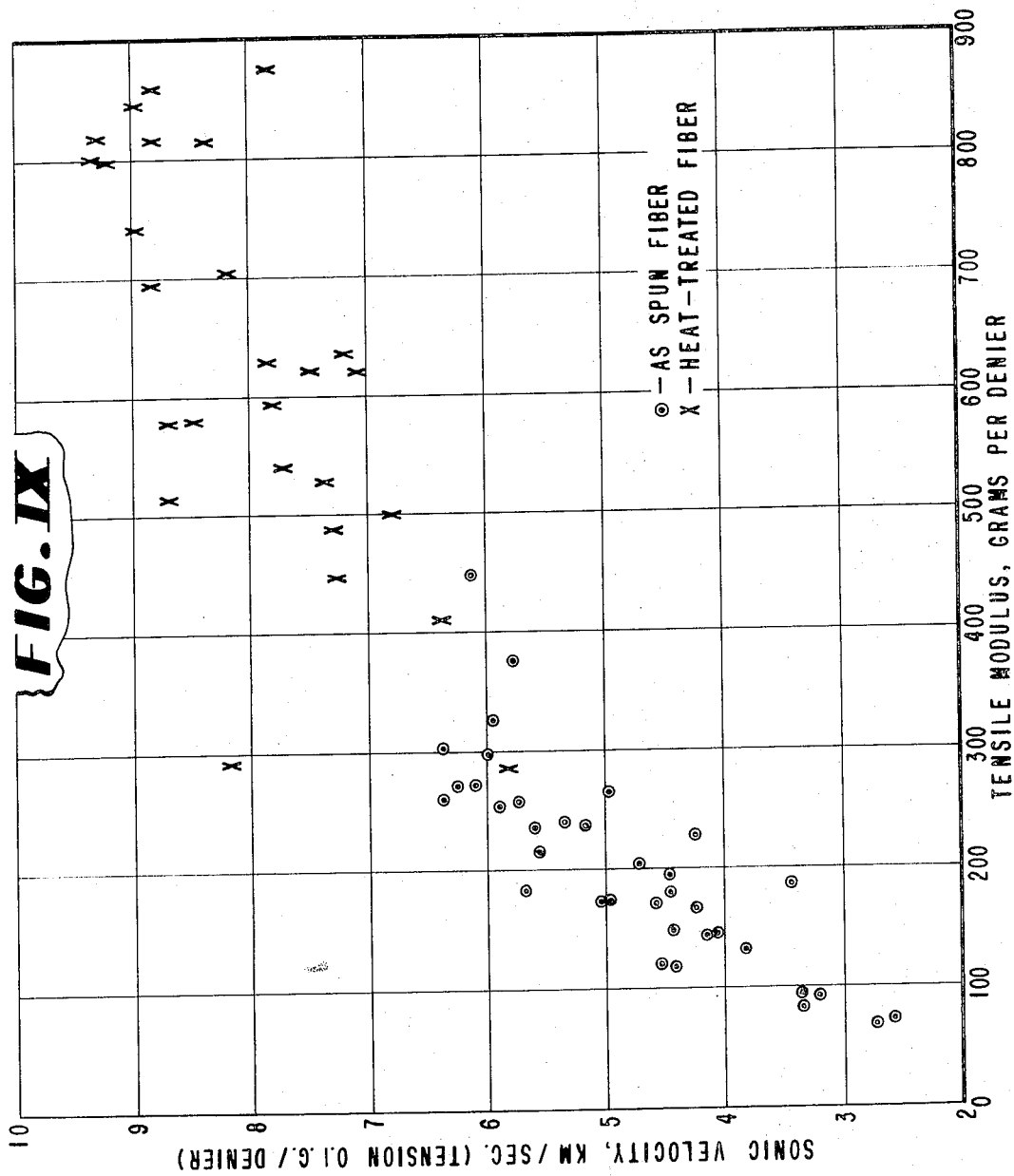
FIG. IX

WHOLLY AROMATIC CARBOCYCLIC POLYCARBONAMIDE FIBER HAVING ORIENTATION ANGLE OF LESS THAN ABOUT 45°

CROSS-REFERENCE TO RELATED APPLICATIONS

This application is a continuation-in-part of my copending application Ser. No. 827,345, filed May 23, 1969, now U.S. Pat. No. 3,671,542 of June 20, 1972 which in turn is a continuation-in-part of my application Ser. No. 736,410, filed June 12, 1968, which in turn is a continuation-in-part of my application Ser. No. 644,851, filed June 9, 1967, now abandoned which in turn is a continuation-in-part of my application Ser. No. 556,934, filed June 13, 1966, now abandoned.

This invention relates to novel, optically anisotropic dopes consisting essentially of carbocyclic aromatic polyamides in suitable liquid media. These dopes, and related isotropic dopes, are used to prepare useful fibers, films, fibrids, and coatings. In particular, fibers of unique internal structure and exceptionally high tensile properties are provided.

SUMMARY OF THE INVENTION

The dopes of this invention which are optically anisotropic (as measured by procedures described hereinafter) comprise ingredients selected from the group of carbocyclic aromatic polyamides whose chain extending bonds from each aromatic nucleus are essentially coaxial or parallel and oppositely directed in suitable liquid media, exemplified hereinafter, which may contain additives. The amount of polymer in the dope exceeds the critical concentration point and preferably comprises at least about 5 percent by weight of the dope. These anisotropic dopes are structurally and functionally distinct from known polyamide "solutions" and are uniquely suited for the preparation of high strength shaped articles (e.g., fibers) often without post-shaping treatment (e.g., drawing).

The fibers of this invention are prepared from the above optically anisotropic dopes, or related isotropic dopes, containing specified aromatic polyamides. These fibers are characterized by a unique internal structure and exceptionally high tensile properties, either as-extruded (as described hereinafter) or after being heat treated (as described hereinafter).

This unique internal structure of the fiber is evidenced by the fiber exhibiting a low orientation angle and/or high sonic velocity. Fibers of this invention exhibit orientation angles of less than about 45° and preferably less than about 35°, most preferably less than about 25°, measured as described hereinafter, and/or sonic velocity values of at least about 4 km./sec., preferably at least about 6 km./sec., most preferably at least about 7 km./sec., measured as described hereinafter.

The fiber possesses outstanding tensile properties, in particular, an initial modulus at least about 200 gpd. and preferably at least about 300 gpd., most preferably greater than about 400 gpd. and/or a tenacity at least about 5 gpd. Preferred as-extruded fiber of this invention exhibits an elongation of at least about 5 percent, in addition to high initial modulus and tenacity.

FIGURES

The invention will be more fully explained with reference to the Figures wherein:

FIG. I illustrates a phase diagram of a poly-(p-benzamide)/N,N-dimethylacetamide (containing water and lithium chloride) dope of this invention;

FIG. II illustrates a typical relationship of viscosity and polymer concentration for the dopes of this invention, showing the critical concentration point;

FIG. III illustrates a typical trace of an X-ray diffraction pattern of poly(p-benzamide) homopolymer;

FIGS. IV and V further illustrate phase diagrams of dopes of this invention;

FIGS. VI and VII illustrate critical concentration points of particular dopes of this invention as a function of inherent viscosity; and FIGS. VIII and IX illustrate the relationship of the fiber structural parameters, orientation angle, and sonic velocity, respectively, to an important physical property (initial modulus) of the fiber.

DETAILED DESCRIPTION OF THE INVENTION

Polyamides

Figure 1:
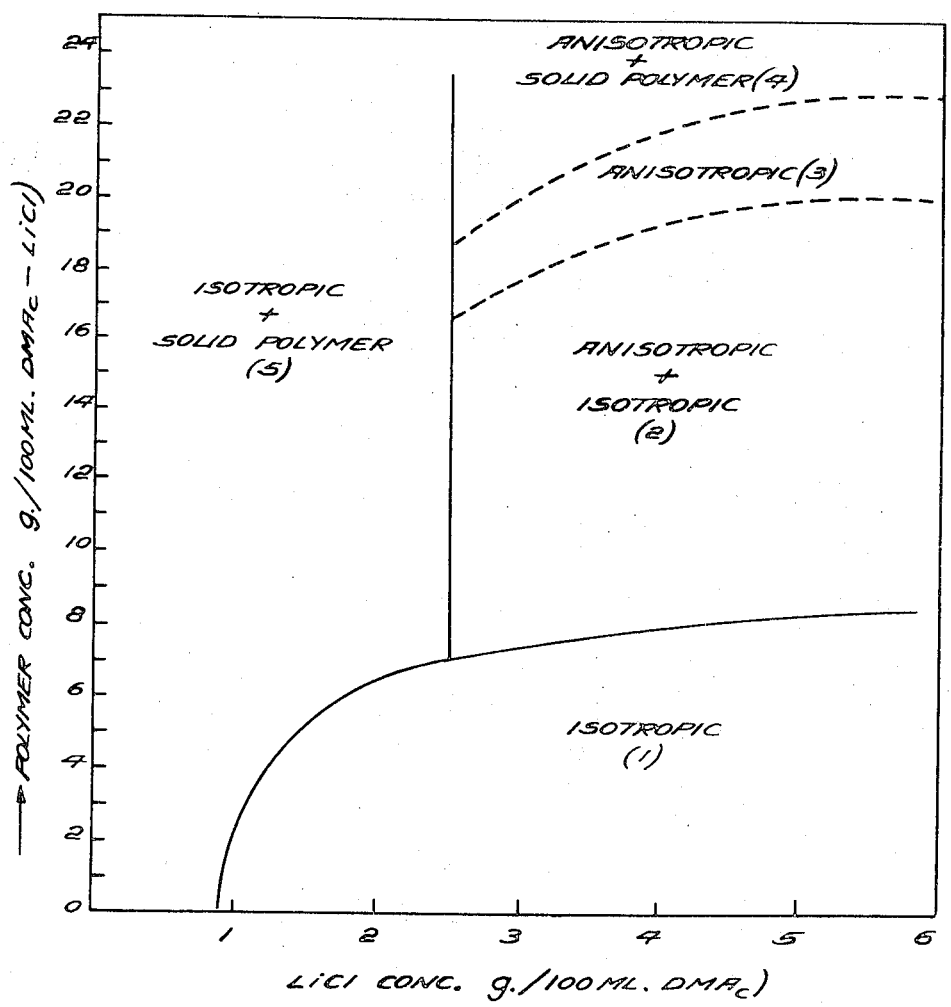

Among the suitable aromatic polyamides (of which the preferred anisotropic dopes of this invention are comprised and/or from which the fibers of this invention can be prepared) are those in which the chain extending bonds from each aromatic nucleus are essentially coaxial or parallel and oppositely directed. The term "aromatic nucleus" is used herein to include individual enchained aromatic rings and fused-ring aromatic divalent radicals. The preferred polymers include carbocyclic aromatic polyamides containing up to 2 aromatic rings, including enchained non-fused rings (e.g., 4,4'-biphenylene) or fused rings (e.g., 1,5-naphthalene) per amide linkage. The chain-extending bonds from these aromatic rings are paraoriented and/or essentially coaxial or parallel and oppositely directed.

Highly preferred polyamides are characterized by recurring units of the formula:

(I)
$$\left[ \begin{array}{c} O \quad O \quad H \quad H \\ \| \quad \| \quad | \quad | \\ -C-R-C-N-R'-N- \end{array} \right]$$

wherein R and R' (when the chain extending bonds are essentially coaxial) are selected from the group of:

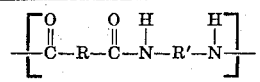 1,4-phenylene, and

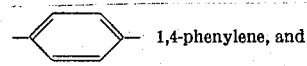 4,4'-biphenylene, and R and R' (when the chain extending bonds are essentially parallel) are selected from the group of:

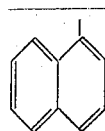 1,5-naphthylene, and

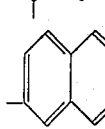 2,6-naphthylene.

R and R' may be the same or different and may contain substituents on the aromatic nuclei.

Additional highly preferred polyamides of this invention are characterized by recurring units of the formula:

(II) 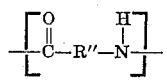

wherein R'' is selected from the group of:

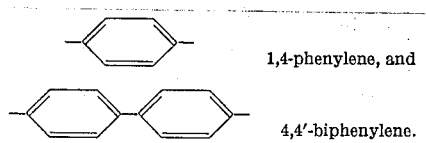

1,4-phenylene, and 4,4'-biphenylene.

Similarly R'' may contain substituents on the aromatic nuclei.

As previously stated, the aromatic nuclei of the polymers of this invention may bear substituents. These substituents should be non-reactive during the polymerization and preferably also should be non-reactive (e.g., thermally) during subsequent processing of the polymer, e.g., heat treating of a shaped article thereof. Such reactivity is undesirable in that it may cause crosslinking of the polymer and may adversely affect the dope and/or fiber properties. Among the preferred non-reactive substituents may be named halogens (e.g., chloro, bromo and fluoro), lower alkyl (e.g., methyl, ethyl, isopropyl and n-propyl), lower alkoxy (e.g., methoxy and ethoxy), cyano, acetyl, and nitro. Other suitable substituents non-reactive during the polymerization will be evident to those skilled in the art and are contemplated herein provided such do not adversely affect the desired properties of the dopes and/or fibers of this invention, e.g., due to factors such as steric hindrance. Generally, it is preferred that no more than two (and more preferably no more than one) suitable substituents be present per aromatic nucleus. However, more than two such substituents may suitably be present if the substituent is a relatively small group, e.g., methyl.

Both homo-and co-polyamides having substituted or unsubstituted aromatic nuclei, as described above, are well suited for the dopes and fibers of this invention. Random copolymers are preferred copolymers. By the term "random" is meant that the copolymer consists of molecules containing large numbers of units comprised of two or more different types in irregular sequence. The units may be of AB (e.g., from p-aminobenzoyl chloride hydrochloride), AA (e.g., from p-phenylenediamine or 2,6-dichloro-p-phenylene diamine), or BB (e.g., from terephthaloyl or 4,4'-bibenzoyl chloride) type or mixtures of these, provided always that the requirements of stoichiometry for high polymer formation are met. It is not necessary that the relative numbers of the different types of the unit be the same in different molecules or even in different portions of a single molecule.

One or more of these polymers may suitably be used in the dopes and/or fibers of this invention, i.e., a single homopolymer; a single copolymer; or homopolymer and/or copolymer blends are suitable herein.

While the polymer chains described above consist essentially of amide links (—CONH—) and aromatic ring nuclei as described above, the polymers useful for preparing the products of this invention may also comprise up to about 10 percent (mole basis) of units not conforming to the above-cited description, e.g., aromatic polyamide-forming units whose chain extending bonds are other than coaxial or parallel and oppositely directed, e.g., they may be meta-oriented, or of linkages other than amide, e.g., urea or ester groups.

Among the suitable aromatic polyamides may be named poly(p-benzamide); poly(p-phenylene terephthalamide); poly(2-chloro-p-phenylene terephthalamide); poly(2,6-dichloro-p-phenylene 2,6-naphthalamide); poly(p-phenylene p,p'-biphenyldicarboxamide); poly(p,p'-phenylene benzamide); poly(1,5-naphthylene terephthalamide); ordered aromatic copolyamides such as e.g., copoly(p,p'-diaminobenzanilide terephthalamide), and random copolyamides such as, e.g., copoly(p-benzamide/m-benzamide) (95/5); and many others.

It is to be understood that the designation of position locations of substituent groups on the aromatic nuclei of the polymers useful in this invention refers to the location(s) of the substituent(s) on the diamine, diacid, or other reactants from which the polymer is prepared. Thus e.g., random end-to-end distribution of polymer-forming units in the chain, if possible, is comprehended by the name by which any given polymer is identified herein.

Polyamides, as described above, having an inherent viscosity (as described hereinafter) of at least about 0.7, and preferably greater than about 1.0, are fiber forming and particularly useful herein. Lower inherent viscosities may be utilized for films, fibrids and/or coatings.

POLYMER PREPARATIONS

A preferred polyamide of this invention, substantially homopolymeric poly(p-benzamide), which consists essentially of recurring units of the formula:

(III) 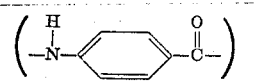

can be readily obtained by certain polymerization techniques from suitable monomers dissolved in particular solvents, which may contain lithium chloride and chain terminating agents if desired.

Suitable monomers include p-aminobenzoyl halide salts of the formula:

(IV)

$$X_1^-H_3N^+—\text{⟨phenylene⟩}—\overset{O}{\underset{\|}{C}}—X_2$$

wherein $X_1^-$ represents a member selected from the group consisting of arylsulfonate, alkylsulfonate, acid sulfonate, and halogen radicals, preferably bromide or chloride radicals, and $X_2$ represents a halogen radical, preferably bromide or chloride. p-Aminobenzoyl chloride hydrochloride is the preferred monomer. Other monomers suitable are p-aminobenzoyl bromide hydrobromide, p-aminobenzoyl chloride hydrobromide, p-aminobenzoyl chloride methanesulfonate, p-aminobenzoyl chloride benzenesulfonate, p-aminobenzoyl chloride toluenesulfonate, p- aminobenzoyl bromide ethanesulfonate, and p-aminobenzoyl chloride acid sulfate. Other monomers, not within Formula IV, e.g., p-aminobenzoyl chloride sulfate, are also suitable. The preferred p-aminobenzoyl chloride hydrochloride may be prepared in high yield from an ethereal solution of p-thionylaminobenzoyl chloride by the general procedure of Graf and Langer, J. prakt. Chem. 148, 161 (1937) under anhydrous conditions. The drying and anhydrous storage of this monomer are preferably performed under room temperature conditions because of the tendency of the compound to polymerize at higher temperatures.

Solvents which are suitable for the polymerization reaction include those selected from the group consisting of:
N,N,N',N'-tetramethylurea
hexamethylphosphoramide,
N,N-dimethylacetamide,
N-methylpyrrolidone-2,
N-methylpiperidone-2,
1,3-dimethylimidazolidinone-2, (i.e., N,N'-dimethylethyleneurea)
N,N,N',N'-tetramethylmalonamide,
N-methylcaprolactam,
N-acetylpyrrolidine,
N,N-diethylacetamide,
N-ethylpyrrolidone-2,
N,N-dimethylpropionamide,
N,N-dimethylisobutyramide,
N,N-dimethylbutyramide, and
tetrahydro-1,3-dimethyl-2(1H)-pyrimidinone (i.e., N,N'-dimethylpropyleneurea).

Salts, such as lithium chloride, are preferably added to the polymerization reaction mixture; such addition may assist in the maintenance of a fluid mixture.

Chain terminators, as indicated above, may be used in these polymerizations. By assisting in the control of the molecular weight of the polyamide, the use of chain terminators contributes to the ease by which subsequent processing of the polymer occurs and enhances the stability of the polymer dope for application in the hereinafter described "coupled" polymerization spinning process. Among the suitable chain terminators are monofunctional compounds which can react with the acid chloride ends of these polyamides such as ammonia, monoamines (e.g., methylamine, dimethylamine, ethylamine, butylamine, dibutylamine, cyclohexylamine, aniline, etc.), compounds containing a single amide-forming group, such as N,N-diethylethylenediamine, hydroxylic compounds such as methyl alcohol, ethyl alcohol, isopropyl alcohol, phenol, water, etc., and monofunctional compounds which can react with the amine ends of the polyamides such as other acid chlorides (e.g., acetyl chloride), acid anhydrides (e.g., acetic anhydride, phthalic anhydride, etc.), and isocyanates (e.g., phenyl isocyanate, m-tolyl isocyanate, ethyl isocyanate, etc.). Useful difunctional terminators include terephthaloyl chloride, isophthaloyl chloride, sebacyl chloride, 4,4'-biphenyldisulfonyl chloride, pyromellitic dianhydride, p-phenylenediisocyanate, benzidine diisocyanate, bis(4-isocyanatophenyl)methane, p-phenylenediamine, m-phenylenediamine, benzidine, bis(4-aminophenyl) ether, N,N'-diaminopiperazine, adipic dihydrazide, terephthalic dihydrazide and isophthalic dihydrazide.

The polymerization reaction may be carried out by dissolving the desired monomer or monomers (as well as the chain terminating agent and lithium chloride, if any is used) in the desired amide or urea solvent and vigorously stirring the resulting solution, externally cooled, until it develops into a viscous solution or a thick gel-like mass. Alternatively, the desired monomer may first be slurried in a small quantity of an anhydrous, inert organic liquid, such as tetrahydrofuran, dioxane, benzene or acetonitrile, prior to the addition of the amide solvent. Preferably, the resulting monomer/organic liquid mixture is stirred at an increased rate and a relatively large volume of the amide solvent is rapidly added. In a further variation, the amide solvent may be frozen and mixed, while frozen, with the desired monomer. The solvent is permitted to thaw and the resulting mixture stirred until a viscous solution or gel-like mass forms.

In each of the above techniques, the polymerization reaction is maintained at low temperatures, i.e., under 60°C. and preferably from −15°C. to +30°C., by external cooling, if necessary. The reaction mixture is stirred continuously until it gradually develops into a viscous solution or thick gel-like mass. The reaction is generally allowed to proceed a period of from about 1 to 48 hours, preferably from about 2 to 24 hours.

For the attainment of the highest molecular weights, these polymerizations are performed under strictly anhydrous conditions. The reaction vessel and auxiliary equipment, solvents, and reactants are carefully dried prior to use and the reaction vessel is continuously swept with a stream of dry, inert gas, e.g., nitrogen, during the polymerization.

The polymerization reaction produces an acidic by-product (e.g., HCl or HBr) which is preferably neutralized. Neutralization is especially preferred in embodiments hereinafter described wherein the reaction mixture is prepared for direct use in forming shaped articles of the polymer. In such a situation, it is preferred to add a base selected from the group consisting of:
lithium carbonate,
lithium oxide,
lithium hydroxide,
lithium hydroxide monohydrate,
lithium hydride,
calcium oxide,
calcium hydroxide
calcium hydride, and
calcium carbonate.
or mixtures thereof, to neutralize the reaction mixture. The use of a neutralization agent is highly desired, in that the acid may cause significant corrosion problems in processing equipment (e.g., the spinneret). Neutralization may also be necessary to achieve more fluid compositions which facilitate the formation of shaped articles. If more than the stoichiometric amount of neutralizing agent is used, an insoluble excess may remain.

Its removal may be required prior to forming a shaped article (e.g., by spinning). The neutralizing agent may be added before, shortly after, or long after monomer is added to the reaction medium depending upon the inherent viscosity desired. Addition of neutralizing agent may result in a sharp increase in polymer molecular weight as determined by measuring the inherent viscosity of polymer isolated from an aliquot of the reaction mixture before and after neutralization.

In addition to excess neutralization agents, the dopes may contain other insoluble material which preferably should be removed, by conventional means, prior to forming a shaped article. For example, when the acidic polymerization system produces bromide ion and lithium hydroxide is used as a neutralizing agent, the lithium bromide produced may be insoluble in particular dopes and should be removed before the dope is spun or cast.

The composition or dope may be concentrated under vacuum to produce a fluid of the desired solids content and/or viscosity for spinning or casting, under the conditions discussed hereinafter.

To isolate the poly(p-benzamide), the polymerization mixture is combined with a polymer nonsolvent, e.g., water in a suitable blender, and thereby is converted to a powder. The powered polymer, after being washed with both water and alcohol, is dried overnight in a vacuum oven at about 60° – 90°C. before being stored or treated for subsequent processing.

The essentially homopolymeric poly(p-benzamide), prepared as previously described, possesses a peak height ratio (PHR) of below 0.86 and, moreover, no sediment is seen in the tube when the polymer is subjected to a sedimentation test, all as described hereinafter. It will be understood, however, that the peak height ratio as measured on a sample of this polymer that has been spun or heated at elevated temperatures may exceed 0.86; the sedimentation properties of such a sample may also be different. Poly(p-benzamide) having a PHR greater than 0.86 is also useful in this invention, e.g., anisotropic dopes of this polymer in HF or oleum.

Other polyamides useful in this invention may be prepared from appropriate coreactants by low temperature solution polymerization procedures (i.e., under 60°C. and preferably from −10 to 30°C.) similar to those shown in Kwolek et al. U.S. Pat. No. 3,063,966 for preparing poly(p-phenylene terephthalamide). For example, such polyamides may be prepared by causing p-phenylenediamine or 2-chloro-p-phenylenediamine to react with polyamide-forming derivatives of terephthalic acid. This dicarboxcylic acid is conveniently employed in the form of its dihalides which are readily prepared by well-known methods; the diacid chloride is usually preferred. Preferably, these low temperature solution polymerizations are accomplished by first preparing a cooled solution of the diamine in a solvent or a mixture of solvents selected from the group of hexamethylphosphoramide, N-methylpyrrolidone-2, and N,N-dimethylacetamide. To this solution is added the diacid chloride, usually with stirring and cooling. Polymer precipitation frequently occurs within a few minutes and on other occasions the reaction mixture may gel. It may be desirable in some cases to stir or permit the reaction mixture to stand for 30 minutes to several hours or more. The polymer may be isolated by agitating the reaction mixture with a polymer nonsolvent, e.g., water, in a suitable blender. The polymer is collected, washed, and dried before being stored or subsequently processed into a dope.

Illustrations of preparations of other useful polymers and copolymers are shown in the examples which follow. These preparations may also include in situ synthesis of directly extrudable anisotropic dopes (e.g., see Example 4 herein).

DOPE PREPARATION

Polymers and copolymers which have been prepared by the previously described methods and which have been isolated after formation, may be combined with a suitable liquid medium (including additives, if any, e.g., LiCl) to form compositions or dopes (such embodiments will hereinafter be referred to as isolated polymer dopes). In certain other embodiments, the polymerization medium is utilized to form such compositions or dopes (such embodiments will hereinafter be referred to as in situ polymer dopes) in a "coupled" polymerization spinning process.

Liquid media useful for forming the anisotropic dopes of this invention, as well as related isotropic dopes, include:

1. Selected amides and ureas, including: N,N-dimethylacetamide, N,N-dimethylpropionamide, N,N-dimethylbutyramide, N,N-dimethylisobutyramide, N,N-dimethylmethoxyacetamide, N,N-diethylacetamide, N-methylpyrrolidone-2, N-methylpiperidone-2, N-methylcaprolactam, N-ethylpyrrolidone-2, N-acetylpyrrolidone, N-acetylpiperidine, N,N'-dimethylethyleneurea, N,N'-dimethylpropyleneurea, hexamethylphosphoramide and N,N,N', N'-tetramethylurea, which may contain lithium chloride and/or calcium chloride.

2. Concentrated sulfuric acid whose concentration is greater than about 90 percent by weight, usually > 98–100 percent by weight $H_2SO_4$ or oleum (i.e., concentrated sulfuric acid containing up to 20 percent or higher of free $SO_3$) which may contain additives (e.g., $NaHPO_4$, $Na_2SO_4$, potassium acetate which may be present in the amount of 2–3 percent by weight of the total dope). The selection of the sulfuric acid concentration most suited for a particular dope preparation is based upon, in part, the inherent viscosity of the polymer employed.

3. Hydrofluoric acid, used alone or in combination with additives such as water (1–2 percent by weight, of the total dope), NaF or KF (1–2 percent by weight of the total dope), an inert chlorinated hydrocarbon (e.g., $CH_2Cl_2$) or mixtures thereof (in an amount up to 5 percent by weight of the total dope).

4. Chloro-, fluoro- or methane-sulfonic acids used alone or in combination with additives such as lithium chloride (up to about 2.5 percent by weight).

Mixtures of two or more of the above liquid media may be used in suitable combinations e.g., any of the amides and ureas; hydrofluoric acid and fluoro-sulfonic acid; methane sulfonic acid and sulfuric acid; oleum and chloro-, fluoro- or methane-sulfonic acid; and the like.

The use of additives, as described above, is preferred in many of the dopes of this invention. It is believed that particular additives aid the solvation of the polyamide in the liquid medium. For the amide and urea media, it is highly desirable that at least about 2.0 weight percent of lithium chloride and/or calcium chloride be added to provide a reasonably concentrated dope from particular isolated polymers, e.g., poly(1,4-benzamide). In the preparation of amide or urea in situ dopes, the salt may be added before, during or after the polymerization, preferably by forming it as a byproduct of a neutralization (e.g., when the monomer is p-aminobenzoyl chloride hydrochloride and the neutralization agent is lithium carbonate, a by-product of the neutralization reaction is lithium chloride). In the preparation of an amide or urea dope from isolated polymer, the salt may be conveniently added to the polymer and/or liquid medium. In either type of dope (isolated or in situ) salt in excess of about 20 weight percent is generally neither necessary nor desired, less than about 15 weight percent is preferred, about 4 to 8 weight percent being most preferred. For liquid media, other than amides and ureas, the use of other solvation additives (e.g., as indicated above) may also be desirable; generally small amounts (e.g., less than about 5 weight percent) of these additives are used.

Although the dopes consist essentially of the polymer and the liquid medium (including additive, if any), additional substances may be present in the dope, such as small amounts of inert organic liquids (e.g., tetrahydrofuran, dioxane, benzene, or acetonitrile) used to disperse the monomer in the amide or urea dopes, water (either purposefully added or adventitiously present) and the acidic by-product of the polymerization reaction (e.g., if less than the stoichiometric amount of a neutralization agent is used).

The usual additives such as dyes, fillers, delusterants, UV stabilizers, antioxidants, etc., can be incorporated with the polymer or copolymer or dispersed in the dopes of this invention for the purposes intended, prior to the preparation of shaped articles thereof.

Dopes of this invention may be conveniently prepared e.g., by combining polymer and the liquid medium (and additives, if any) in a conventional manner (e.g., with stirring). Some dopes are formed at room temperature conditions and are useful (e.g., spinnable) under these conditions. Other dopes require specific heating techniques, i.e., flowable compositions may be obtained at room temperature in many instances, while heating, preferably with stirring, and sometimes heating and cooling cycles are required in a few instances. The amount of heating and/or cooling required to form a useful dope or composition varies with the liquid medium, the polymer (the composition, the inherent viscosity, the crystallinity, and the particle size of the polymer sample employed) and the quality of the stirring action. In the preparation of these dopes, care must be taken to avoid local overheating and formation of a "dry" or gelled spot at the meniscus of this composition or on the walls of the vessel being employed. Such portions of polymer frequently do not readily redissolve. Numerous suitable techniques useful in preparing specific dopes of this invention are illustrated in the Examples.

The anisotropic dopes of the invention may comprise a single anisotropic phase, or an emulsion of anisotropic and isotropic phases in any proportion or degree of dispersion. The isotropic dopes also useful in preparing fibers of this invention comprise a single insotropic phase. Minute quantities of undissolved polymer may be present in these phases or in the emulsion, particularly when the dope is prepared by dissolving isolated polymer. A "dope" is a shaped-structure-forming (e.g., fiber-forming, film-forming, or fibrid-forming) polymer-solvent system which comprises at least one of the above phases.

Anisotropic Dopes

When the dope-forming ingredients of this invention are combined in particular concentration ranges, the resultant dopes are optically anisotropic, i.e., microscopic regions of a given dope are birefringent; a bulk dope sample depolarizes plane-polarized light (described hereinafter), sometimes referred to herein as light or polarized light, because the light transmission properties of the microscopic areas of the dope vary with direction. This characteristic is associated with the existence of at least part of the dope in the liquid crystalline or mesomorphic state. As described in *Industrial Research*, G. H. Brown, May, 1966, pp. 53–57, liquid crystals are intermediate between the liquid and solid states in many of their properties. Thus, they have unique structural arrangements partially imparting the order of crystals and the fluidity of liquids.

The dopes of this invention exhibit anisotropy while in the relaxed state. Although conventional polyamide dopes may depolarize plane-polarized light when subjected to appreciable shear (e.g., flow birefringence wherein molecules in a solution are hydrodynamically oriented), static (i.e., stationary) samples of the dopes of this invention uniquely exhibit this phenomenon.

The extended stiff-chain aromatic polymers which are present in the anisotropic dopes of this invention are believed to be in essentially rod-like entities (aggregates or bundles) in the liquid medium. This extended, stiff-chain configuration of the polymer is indicated by values of the exponent, $\alpha$, in the Mark-Houwink relationship, $[\eta] = KM^{\alpha}$, for dilute solutions of lower molecular weight polymer. In this well-known relationship, $[\eta]$ is the intrinsic viscosity, M is the molecular weight, and K and $\alpha$ are constants for a given polymer/solvent system. The great majority of polymers for which this relationship has been evaluated in the literature have had values below 0.9. Among the polymers used in the dopes of this invention, poly-(p-benzamide) is determined to have an $\alpha$ value of 1.6, measured on unfractionated polymer with an inherent viscosity in the range of 0.4 to 2 and weight average molecular weight determinations made in sulfuric acid (95–98 percent by weight). When a given system exceeds a certain critical concentration point, an anisotropic phase is formed which gives rise to the characteristics of the anisotropic dopes of this invention.

For a given polyamide/liquid medium dope of this invention, below a particular polyamide concentration, the dope is isotropic. As the concentration of the polyamide increases, the viscosity of the dope increases. However, at a point referred to herein in as the "critical concentration point" there is a sharp discontinuity in the slope of the viscosity vs. concentration curve when the dope changes from isotropic to partially anisotropic without the formation of a solid phase. Further addition of polyamide results in a decrease in the viscosity of the dope, as the dopes become more anisotropic. An exemplary viscosity vs. concentration curve is described in Example 73 and illustrated in FIG. II.

As previously stated, a given dope of this invention is anisotropic when the ingredients of the dope are present in particular concentration ranges. There is a complex relationship existing among the concentration of the polymer or copolymer, the inherent viscosity thereof, and the temperature which generally determines the ranges in which a given polymer or copolymer/liquid medium dope is anisotropic. Exemplary phase relationships are shown in Example 64 and FIG. I, and Example 74 and FIGS. IV and V. Such relationships for other dopes of this invention can be easily determined by routine experimentation.

The critical concentration point varies with the particular polyamide, as well as the weight percent and the inherent viscosity thereof, the particular liquid medium and the temperature. The effect of the weight percent of polymer and temperature on dopes of two different polyamides is shown in Example 75. The effect of the inherent viscosity on two different polyamides is shown in Example 74 and FIGS. VI and VII.

Anisotropic dopes comprising polymers and copolymers, as previously described, incorporating up to about 10 percent (mole basis) of aromatic units whose chain extending bonds are not essentially coaxial or parallel and oppositely directed may be prepared according to this invention. For example, random high molecular weight copoly(p-benzamide/m-benzamide) (95/5) may be prepared from p-aminobenzoyl chloride hydrochloride and m-aminobenzoyl chloride hydrochloride by the previously described low temperature solution polymerization techniques. A dope prepared from such a copolyamide in, e.g., N,N-dimethylacetamide and lithium chloride, exhibits optical anisotropy.

Anisotropic dopes of aromatic copolyamides wherein all chain-extending bonds from each aromatic nucleus are essentially coaxial or parallel and oppositely directed are also comprehended by the present invention. For example, an ordered copolyamide prepared from 4,4'-diaminobenzanilide and terephthaloyl chloride or 2,6-naphthaloyl chloride may be incorporated into an anisotropic dope comprising the (1) copolymer, an amide mixture, and lithium chloride, or (2) the copolymer, a suitable sulfuric acid or oleum.

One spinnable group of anisotropic dopes comprises about 6–15 percent by weight poly(p-phenylene terephthalamide) whose inherent viscosity is in the range of about 0.7–3.5, from 0.5 to up to 5 percent by weight lithium chloride, and the balance an amide mixture of hexamethylphosphoramide and N-methylpyrrolidone-2 containing greater than 45 percent by volume of hexamethylphosphoramide. The relative amounts of these ingredients, particularly those of the hexamethylphosphoramide and N-methylpyrrolidone-2, contribute to the ease with which these spin dopes are obtained. For instance, as illustrated in the examples which follow a spin dope fluid at room temperature is obtained from these ingredients when a particular amide mixture is employed. However, when a different amide mixture containing more hexamethylphosphoramide is employed with the same amounts of the polymer and salt, the combined ingredients must be heated to at least about 35°C. to achieve a liquid anisotropic dope whose birefringence may be observed. Preparation of the dopes is preferably undertaken by vigorous mixing of the ingredients at low temperatures, e.g., as low as 0°C. to −10°C.

Another spinnable group of anisotropic dope comprises about 5–25 percent by weight poly(2-chloro-p-phenylene terephthalamide) whose inherent viscosity is in the range of about 0.7–3, from 0.5 to up to 8 percent by weight of lithium chloride and the balance being N,N-dimethylacetamide. In addition, anisotropic dopes comprising (1) poly(2-chloro-p-phenylene terephthalamide), lithium chloride, and N,N,N',N'-tetramethylurea (TMU) and (2) the same polymer with N,N-dimethylacetamide and calcium chloride can be prepared. For example, an anisotropic dope is prepared by combining 2.5 g. of poly(2-chloro-p-phenylene terephthalamide) ($\eta$inh = 1.27) with 25 ml. of a mixture prepared from 3.56 g. of lithium chloride and 100 ml. of TMU. This dope produces a bright field in a polarizing microscope and displays transmittance value (T) of 81 as measured herein.

There is a complex relationship existing among the amount of poly(2-chloro-p-phenylene terephthalamide) and the inherent viscosity thereof, the amount of salt, and the amount(s) of amide(s) that determine whether or not a given dope preparation is optically anisotropic under otherwise constant conditions. By way of illustration, an isotropic dope may be converted to an anisotropic dope by changing the polymer concentration. For example, a clear dope comprising 10 g. of poly(2-chloro-p-phenylene terephthalamide), $\eta$inh = 1.13, in 100 ml. of a mixture of 100 ml. of N,N-dimethylacetamide and 4.3 g. of lithium chloride is isotropic. However, when an additional 10 g. of the polymer is added thereto, the resulting dope becomes turbid and anisotropic as shown by light depolarization studies. That the amount of salt present in the dope contributes to the nature of the dope is demonstrated by observing that a dope comprising 20 g. of poly(2-chloro-p-phenylene terephthalamide), $\eta$inh = 1.13, and 100 ml. of a mixture of 100 ml. of N,N-dimethylacetamide and 7 g. of lithium chloride is isotropic.

Dopes comprising poly(2-chloro-p-phenylene terephthalamide) can be separated into 2 layers, an isotropic upper layer and a more dense anisotropic lower layer. This separation can be achieved by, e.g., permitting a spin dope to stand for a period of time sufficient to achieve the separation (e.g., one week) or by, e.g., centrifugation. Just as an isotropic poly(2-chloro-p-phenylene terephthalamide) dope can be converted to an anisotropic dope by changing polymer concentration at constant polymer inherent viscosity, a change in the volume of a given anisotropic phase in a two-layer dope system can be attained by incorporating in the dope a polymer of higher inherent viscosity. For example, a dope comprising 10 g. of poly(2-chloro-p-phenylene terephthalamide), $\eta$inh = 1.13, in 100 ml. of a mixture obtained by combining 100 ml. of N,N-dimethylacetamide and 3.12 g. of lithium chloride separates into 2 layers on long standing. The bottom layer is 20 percent of the total volume. When the dope is prepared with 10 g. of this polymer with an inherent viscosity of 1.85, the anisotropic bottom layer constitutes 33 percent of the total volume. It has been observed that the maximum amount of salt which may be preesnt in an anisotropic dope of this polymer increases as the inherent viscosity of the polymer employed to prepare the dope increases.

It is to be understood that the combinations of the aforesaid ingredients are chosen to provide an anisotropic dope; certain combinations of ingredients may not so provide. For example, poly(p-phenylene p,p'-biphenyldicarboxamide) and poly(p,p'-phenylene benzamide) which form anisotropic dopes in oleum, do not form anisotropic dopes in HF or in some of the amides and ureas useful with other polymers of this invention. Whether a given dope is anisotropic is readily determined by the methods described hereinafter.

DETERMINATION OF OPTICAL ANISOTROPY

In the examples which follow, the anisotropic character of the dopes of this invention is described in terms of e.g., (1) by plotting the relationship of dope viscosity vs. polymer concentration to determine the critical concentration point, (2) by numerical values of transmittance of light through crossed polarizers, identified as "T" or "DDA", (3) an observation of the bright field observed in a polarizing microscope, and (4) a visual determination of "stir opalescence."

Critical Concentration Point

A critical concentration point characterizes the anisotropic dopes of this invention, i.e., there is a sharp discontinuity in the slope of the dope viscosity v. polymer concentration curve. When the concentration exceeds this point, the dope is anisotropic and further addition of polymer results in a decrease in the viscosity as the dope becomes more anisotropic. This "point" (as well as the complete viscosity vs. concentration curve) is routinely determined using conventional concentration and viscosity measuring techniques. For example; a polymer dope of this invention may be placed in a polyallomer test tube equipped with a Teflon TFE-fluoro-carbon cap through which a viscometer spindle extends into the dope, constant temperature being maintained. The viscosity of the stirred dope may be conventionally measured with a viscometer (e.g., a Brookfield Syncho-Lectric Viscometer, Model RV, product of the Brookfield Engineering Laboratories, Inc., Staughton, Mass., or equivalent). Viscosity measurements are made at the initial polymer concentration and at higher concentrations (i.e., after an additional known amount of polymer is added). By this technique (or equivalent) a viscosity vs. concentration curve may be plotted for this system (the given polymer and liquid medium at that temperature) and the critical concentration point (i.e., the discontinuity in the slope of the curve) is determined.

T Test

The determination of the T value may be made by placing an anisotropic dope of this invention, prepared as described herein and containing no suspended solid matter, between a crossed polarizer and an analyzer. The dope sample is conveniently employed as a layer 80 $\mu$ thick. Thus, a drop taken from the interior of a dope sample of this invention is put on a dry, clean strain-free glass slide; a square cover of glass, supported on one edge by a glass tube or wire of known thickness (1.3 mm. diameter is convenient), is pressed down on the drop so as to form the roof of a liquid wedge. The edges are sealed with a fast-drying binder (e.g., Duco cement, DuPont's registered trademark for a transparent, flexible, waterproof adhesive), avoiding actual contact with the dope. The sharp edge of the wedge is sealed by excess dope which is squeezed out. In the operation, common care should be taken to avoid evaporation, moisture uptake, excessive shearing actions, dirt, and any suspended solid particles.

The samples are allowed to stand for a sufficient time to permit relaxation of the shear stresses resulting from the slide preparation to assure that the sample is static. For example, the amide or urea dopes are relaxed about 10 minutes; up to about 1½ hours is generally needed to relax sulfuric acid dopes (especially the more viscous samples); up to about 1 hour is generally sufficient to relax the other dopes of this invention, e.g., fluoro- and chloro-sulfonic acid dopes.

The wedge is positioned in a light beam, on a microscope stage between crossed polarizer and analyzer. The light beam has the intensity such as is ordinarily used in microscopic examinations. The wedge is positioned so that the thickness of the center of the layer of dope through which the light beam passes is 80 $\mu$ in thickness. The intensity is measured with polarizer and analyzer crossed ($I_+^s$) (superscript s to denote sample present in wedge) and with analyzer removed ($I_-^s$) and the difference $I_-^s - I_+^s$ is obtained. The transmitted light may be measured by conventional light sensitive detectors (e.g., by photo multipliers, selenium or cadmium light meters, bolometers, etc.). The same measurements are then made on a similarly constructed wedge containing air, and the difference $I_-^c - I_+^c$ (superscript c for control) is recorded. When the dopes of this invention are placed in the wedge the expression $(I_-^c - I_+^c) - (I_-^s - I_+^s)$ will be greater than zero and greater than can be accounted for by experimental error, using reasonable care and accurate instrumentation. It represents the increase in light transmittance through the analyzer due to the presence of the sample. The magnitude of $(I_-^c - I_+^c) - (I_-^s - I_+^s)$ will vary with the solvent being used, polymer concentration, concentration of dissolved salt, and the units in which light intensity is measured.

In the examples, an apparatus by which the anisotropic character, or T value, of the dopes is determined consists essentially of an A. O. Spencer Orthoscope Illuminator which contains a tungsten overvoltage microscope lamp (color temperature 3800°K.), an optical wedge containing the sample, an optical wedge containing air, a Bausch and Lomb Polarizing Microscope having a Leitz 10X objective and a Leitz 10X ocular Periplan, a Gossen "Sinarsix" exposure meter and a Polaroid MP3 Industrial Land Camera body. The wedge containing the sample is prepared as previously described and is positioned on the microscope stage (i.e., between the polarizer and the analyzer) to provide a sample layer 80 $\mu$ thick in the path of any light which reaches the analyzer and the light meter. The polarizer and the analyzer are adjusted to provide 90° crossed polarization planes. Light from the lamp which passes the analyzer by the route previously described is projected into the camera body and is measured in the image plane (at the ground glass level) by the exposure meter ($I_+^s$). The same measurement is made with the analyzer removed ($I_-^s$). This is repeated with the control wedge of air 80 $\mu$ thick to give $I_+^c$ and $I_-^c$. The light values from the Sinarsix exposure meter, which are expressed in logarithmic units to the base 2, may be converted to logarithmic units to the base 10 by multiplying them by 0.301 (i.e., by log 2); the antilogs$_{10}$ of these products are then determined. These antilog values are designated $I_+^{s'}$, $I_-^{s'}$, $I_+^{c'}$, and $I_-^{c'}$. Comparative intensity measurements, free from the particular intensity units, are conveniently stated in terms of relative intensities (i.e., intensity ratios or fractions of transmitted light intensities). The expression $I_+^{s'} / I_-^{s'}$ is the fraction of light intensities transmitted by the dope being examined. The fraction $I_+^{c'}/I_-^{c'}$ is the fraction of light transmitted by the control wedge. The difference $(I_+^{s'}/I_-^{s'}) - (I_+^{c'}/I_-^{c'})$ represents the increase in intensity of light transmitted due to the presence in the wedge of the dope being examined.

Since, for a depolarizing sample, the theoretical maximum value of $I_+^{s'}/I_-^{s'} - I_+^{c'}/I_-^{c'} = 0.5$, an index of the increase of light transmittance (T) may be conveniently taken as $2(I_+^{s'}/I_-^{s'} - I_+^{c'}/I_-^{c'}) \times 100$ since in this way the maximum value is 100. When measured according to the foregoing procedures, dopes having values greater than 4 are considered herein to be anisotropic in nature.

DDA Test

Another measurement from which a numerical quantity differentiates anisotropic dopes from isotropic dopes is shown in the examples; this measurement is identified as "degree of depolarization anisotropy" (DDA) and is used herein. This quantity is a measure of the depolarization of plane polarized light passing through a sample, and is defined by the following equation:

$$DDA = \frac{\epsilon'_\sigma/\epsilon'_\pi - \epsilon_\sigma/\epsilon_\pi}{\epsilon'_\sigma/\epsilon'_\pi - 1} \times 100,$$

in which the primes denote measurements on a blank (completely isotropic), $\epsilon$ is an opacity factor in the sense that two thicknesses of a given absorber have an $\epsilon$ value twice as great as a single thickness, and $\pi$ and $\sigma$ denote measurements made with polarizer and analyzer parallel and perpendicular, respectively. This is essentially a percent-difference equation. In practice, the incident light intensity is always adjusted so that a measurement of $\epsilon_\pi$ (and $\epsilon'_\pi$) corresponding to unity (i.e., a 100 percent transmission reading) is obtained with parallel polars for both (1) blank and (2) sample, indicating for (1) a total lack of depolarization and for (2) a complete depolarization for the field observed. In this case the DDA equation is simplified to $$DDA = [(\epsilon'_\sigma - \epsilon_\sigma)/(\epsilon'_\sigma - 1)] \times 100$$

The scale is from zero to 100, with the former indicating perfect isotropy and the latter perfect anisotropy for the field observed.

The apparatus used for making DDA measurements consists of a Bausch and Lomb polarizing microscope (polarizer rotatable, analyzer fixed). The light source is a Silge and Kuhne Ortho-Illuminator B with a 100 w G E. BMY bulb operated at a constant 115 v. The light intensity to regulate $\epsilon_\pi$ (and $\epsilon'_\pi$) is changed by the neutral filters and iris diaphragm in the illuminator. A light sensitive resistor, G.E. B-1036, operated at 22½ v. is used to detect transmitted light, and a 50μ a meter is used to register the relative intensity. The light path is through the following components in order: source, polarizer, condenser, sample, microscope objective (20X, N.A. = 0.33 Leitz long F.L.), analyzer, ocular (10X, compensating), to photoresistor.

All measurements are made in red light produced by a red band pass filter (with a transmission region from about 600mμ to a maximum of about 650mμ in the visible range) in the illuminator. The photoresistor is calibrated with a series of Kodak Color Compensating filter films, CC50R; an opacity of 1 (100 percent transmission on meter) being assigned to a single film, 2 to two films, etc. During calibration the films are placed on the microscope stage and the microscope focused approximately at the center of the stack of filter films (vertically). The operating conditions imposed on the photoresistor are designed to produce a linear calibration curve with log meter reading plotted against opacity. Sample opacities are then taken directly from the calibration curve. This gives a relative "red-opacity" value for the sample.

Samples are prepared for measurement by extracting a drop of dope from the interior of the bulk sample. This is placed on a "Pyrex" glass disk. An annular Teflon fluorocarbon spacer, 0.002 in. (51μ) thick is placed on the disk and a second glass disk closes the cell. This assembly is placed into a special screw-assembly which seats the glass against the spacer — assuring a constant 0.002 in. sample thickness (with the sample substantially filling the cell). These samples are allowed to relax for 1–1.5 hours before measurements are made. Blanks are prepared in the same way with pure solvent.

In making visual observations (crossed polarizers in microscope) on the dopes for which DDA is measured, any positive value for DDA indicates the presence of some anisotropic phase. The higher the DDA, the greater the amount of anisotropic phase present in the dope except in the extreme limits with less than about 5 percent of one phase present. This is due partly to the sensitivity of the apparatus. Also when the proportion of anisotropic phase is low and not uniformly distributed or dispersed, small fields of view can be selected which have less than average or even no anisotropic phase. A 100 percent anisotropic dope does not always give a DDA = 100, probably because of irregularities in the texture.

Observation Between Light Polarizing Elements

The T and DDA tests described above, quantitively describe the light transmittance of anisotropic dopes. However, a qualitative determination can also be conveniently made using a light source, analyzer and crossed polarizer (or equivalents thereof) as described in these tests. When such polarizing elements are crossed, a static (relaxed) dope sample placed between the polarizer and analyzer will transmit essentially no light if the dope is isotropic. However, when the sample is anisotropic, light will be transmitted and a relatively bright field will be observed (the intensity of the light being related to the degree of anisotropy of the sample). A more detailed description of the type of field observed in dopes containing anisotropic and/or isotropic phases is set forth in Example 64.

Stir Opalescence

"Stir opalescense" is a term used herein to describe a property characteristic of anisotropic dopes which is visually observed with the naked eye. Many of the dopes of this invention, when observed in bulk in a transparent vessel, appear turbid or hazy and yet they contain no, or practically no, undissolved solid. When the dope, seen under reflected ordinary light, is disturbed by tilting or rolling of the vessel or by only slow stirring, there is produced a characteristic, readily-observed, satin-like sheen or glow which is observed even after the disturbance ceases and which decreases in intensity thereafter. With some compositions there is produced no sense of color while others may have a bluish tone or even a degree of varigated color, which is described by observers as having a pearly or opalescent quality. Extraneous color in the dope, such as yellows from minor impurities or inherent in some polymers, modifies the observation of color developed under shear. Dopes, which are disturbed as described above, often give the appearance of having striations and/or graininess in the surface. These visual effects are observed in anisotropic dopes of this invention. While such effects do not conclusively establish that the dope is anisotropic, such dopes generally are anisotropic or will become anisotropic upon the addition of more polymer (providing solubility limits permit). For the sake of brevity, the visual observation of all variations of the phenomenon outlined above is referred to in the examples as the exhibition of stir opalescense.

Dopes described as anisotropic hereinafter may have shown this stir opalescense effect or may have been shown to be anisotropic by the aforementioned qualitative or quantitative techniques, i.e., the critical concentration point is determined or the sample is observed between light polarizing elements, as in a microscope, to depolarize plane-polarized light, either qualitatively or quantitatively, as described hereinbefore. Any of the above-described qualitative or quantitative techniques suitably indicate anisotropy, although one or more of such techniques may be more convenient and/or accurate for a given dope. The determination of critical concentration point is the preferred test for determining anisotropy because it is conveniently and accurately used for all anisotropic dopes of this invention. The qualitative test (visual observation between light polarizing elements) is preferred for the convenience in testing a large number of samples. The stir opalescence observation is also convenient and generally indicates anisotropy. Among the quantitative tests (other than the critical concentration point determination), the DDA test is preferred for sulfuric acid dopes because it is more sensitive in "borderline" anisotropic measurements in such dopes; the T test is generally preferred for amide or urea dopes. Although the T and DDA tests are generally suitable for all dopes of this invention, since hydrofluoric acid (in HF dopes or generated by the fluoro-sulfonic acid in other dopes) attacks glass, care and/or altered testing procedures may be necessary, (e.g., substituting a strain-free, HF-resistant slide for the glass slide and shielding the microscope lens from HF gas).

UTILITY OF THE DOPES — FIBER PREPARATION

The previously described compositions or dopes of this invention can readily be utilized for the production of fibers, films, fibrids, and coatings.

Dopes of this invention containing at least 5 percent by weight of polymer are preferred in that they are particularly useful in preparing fibers. Although these anisotropic dopes are useful in preparing other shaped articles, the preferred use of these dopes (as well as related isotropic dopes) is in the preparation of fibers by conventional techniques and/or techniques described herein. The term "fibers" is used generically herein to include the numerous conventional fiber structures. For example, the fibers may be of staple or continuous lengths. Similarly, the fiber may consist of a single component or multicomponents (e.g., a bicomponent fiber with the two components consisting of different polyamide compositions of this invention). Furthermore, one or more polyamide compositions of this invention may be in a given fiber (or fiber component) i.e., the filter may contain a single polyamide composition or blends of two or more of such compositions. The fibers may be employed in single strands or multi-fiber bundles (e.g., yarns). All such conventional fiber structures which consist essentially of the polyamide compositions specified herein, having the internal structure and properties specified herein, are contemplated herein.

The compositions or dopes of this invention are extruded into fibers by conventional wet- and dry-spinning techniques and equipment. In wet spinning, an appropriately prepared composition containing the polymer and, e.g., an amide or urea medium, whose temperature may vary from 0 to about 100°C., is extruded into a suitable coagulating bath, e.g., a water bath maintained at 0–90°C., depending on the solvent used in the preparation of the dope. Other useful coagulants include ethylene glycol, glycerol, mixtures of water, methanol and an amide or urea solvent, mixtures of water and alcohol and aqueous salt baths, e.g., maintained at a temperature of about −20 to +90°C. Dry spinning may be accomplished by extruding the compositions or dopes of this invention, into a heated current of gas whereby evaporation occurs and filaments of the polyamide are formed.

After being formed, the fibers may be passed over a finish-application roll and wound up on bobbins. Development of maximum levels of fiber and yarn properties may be assisted by soaking the bobbins in water or in mixtures of water and water-miscible inert organic liquids, (e.g., acetone, ethyl alcohol, glycerol, N,N,N',N'-tetramethylurea, N,N-dimethylacetamide) to remove residual amide liquid and salt or acidic solvents followed by drying. Removal of the residual solvents and/or salts may also be accomplished by passing the fiber or yarn through aqueous baths on the run, by flushing the bobbins with water as yarn is formed, and by washing or soaking skeins, rather than bobbins, of yarn. Dry-spun yarn may be strengthened by washing with even a minor amount of water.

The fibers prepared from the anisotropic compositions or dopes of this invention and related isotropic dopes, are characterized by a unique internal structure and exceptionally high tensile properties, either as extruded or after being heat treated.

This unique internal structure of the fiber is evidenced by its low orientation angle and/or high sonic velocity. The physical meaning of orientation angle is that it establishes an angle (i.e., one half of the orientation angle) about the fiber axis in which a given percentage of crystallites are aligned. In the fiber of the present invention, a high percentage (i.e., greater than about 50 percent, generally about 77 percent) of the crystallites are aligned within this angle (one half of the orientation angle) about the fiber axis; this percentage is determined from an intensity trace of the fiber's diffraction pattern (as described hereinafter). For example, the intensity trace is an esentially Gaussian curve for most of the fibers of this invention (i.e., essentially all of the heat-treated fibers and most of the as-extruded fibers). For such a curve, about 77 percent of the diffraction intensity falls within this angle and this is interpreted as showing that a like percentage of crystallites is aligned within this angle. For the few fibers (e.g., some of the as-extruded fibers) for which the curve may not be Gaussian-like (e.g., the curve may be a composite of several curves exhibiting partially resolved peaks), greater than about 50 percent of the crystallites are aligned within this angle, (see Example 83).

In addition to the orientation angle characterization, fibers of this invention are characterized by sonic velocity. Sonic velocity is a structural parameter relating to the fiber's molecular orientation along the fiber axis. A higher value of sonic velocity is the result of a higher degree of molecular orientation along the fiber axis. Sonic velocity and related parameters are described by Charch and Moseley in the "Textile Research Journal," Vol. XXIX, No. 7, 525–535 (1959) and by Moseley in the "Journal of Applied Polymer Science," Vol. III, No. 9, 266–276 (1960).

Orientation angle and/or sonic velocity demonstrate the unique internal structure of the fiber. These structural parameters each relate to orientation and each evidence the uniqueness thereof. Sonic velocity is a measure of the total molecular orientation as contrasted with crystalline orientation. This total molecular orientation differs from the orientation described by orientation angle, i.e., orientation angle is a measure of crystallite orientation determined by X-ray measurements. The unique internal structure of the fibers of this invention is evidenced by either or both of these orientation parameters; each parameter suitably describes the uniqueness and the parameters are correlated for the fibers of this invention.

The unique internal structure of the fibers of this invention is believed to be responsible for the exceptionally high tensile properties thereof. The relationship between the fiber structural parameters (orientation angle and sonic velocity) and the fiber's tensile properties is illustrated in FIGS. III and IX. These figures, prepared from data given in the following examples, shown that for fibers of this invention as the orientation angle decreases (FIG. VIII) and/or the sonic velocity increases (FIG. IX), the initial modulus increases.

In general, as shown in the examples which follow, fibers of this invention possess these high tensile properties "as-spun" or "as-extruded." As-spun or as-extruded fibers of this invention are defined as those formed in the normal processes of spinning (i.e., forming, shaping, or finishing steps), but which are not submitted to a drawing (elongation) or heat-treating operation which changes the molecular order or arrangement of polymer molecules. However, the fibers may be subjected to washing and drying operations needed to remove solvents or impurities. Other operations which may be carried out without changing the fundamental character of the fibers include (1) application of finishes, dyes, coatings, or adhesives; (2) physically treating the fiber by twisting, crimping, cutting into staple; (3) using the fiber in forming shaped objects, fabrics, papers, resin or rubber composites; etc.

As-extruded fibers of this invention are preferred for particular end uses e.g., tire cord. Although yarn elongations of 3.5 percent are suitable for tire cord, it is generally desirable that, in addition to high modulus and tenacity value, the fiber exhibits elongation of at least about 5 percent. However, post-shaping treatments (e.g., heat treatment) which improve the modulus and tenacity, often do reduce the elongation (e.g., to below 5 percent). Since particular preferred fibers of this invention possess desirably high moduli and tenacities (yarn tenacities of at least 7 gpd) as-extruded, and exhibit elongation values of at leat about 5 percent, these as-extruded fibers are well suited for such end uses.

The as-extruded tensile properties of both the wet- and dry-spun as-extruded fibers can be enhanced by subjecting the undrawn fibers to a heat treatment. Hot air ovens, hot pins, hot slots, hot plates, liquid heating baths are useful for such treatments. The tensile properties of the as-extruded fibers are preferably enhanced by heating the fiber, maintained in a taut state, or drawn in a nitrogen atmosphere maintained at a temperature in the range of about 300–1000°C., preferably 500–600°C., for from 0.1 second to 5 minutes, preferably 0.1–10 seconds as subsequently shown.

The fibers of this invention possess excellent chemical and thermal properties. They retain their tensile properties after being heated and boiled for 0.5 hr. in aqueous hydrochloric acid (1 percent) and caustic (1) solutions. The fibers are essentially essentiall unaffected after being soaked for 1 hr. at 60°C. in commercially used dry cleaning solvents such as perchloroethylene and trichloroethylene. The fibers are self-extinguishing when they are removed from an open flame.

The excellent tensile properties of the fibers of this invention make them especially useful as reinforcing agent for plastics, tire cord, V-belts, etc.

The compositions or dopes of this invention may be formed into films by a conventional wet-extrusion method; such films are usually kept under restraint when they are subsequently dried and washed. Compositions prepared in the above-described manner also may be formed into fibrids by shear-precipitation techniques (e.g., as described in Morgan U.S. Pat. No. 2,999,788), or applied as a liquid coating to a variety of substrates which may be in the form of sheets, papers, wires, screens, fibers, fabrics, foams, solid or microporous objects, etc. The substrates may be glass, ceramics, brick, concrete, metal (e.g., copper, steel, aluminum, brass), wood and other cellulosic materials, wool, polyamides, polyesters, polyacrylonitrile, polyolefins, polyvinylhalides, cured epoxy resins, cured aldehydeurea resins, etc.

Generally, an anisotropic dope can be used to produce an as-extruded fiber of properties superior to those of fibers produced from an otherwise similar dope which is isotropic or less anisotropic (i.e., an emulsion of isotropic and anisotropic phases in which the isotropic phase is predominant). Contrasts of the properties of a fiber from a highly anisotropic dope to those of a fiber prepared from a dope which is slightly anisotropic or isotropic are shown in the examples.

MEASUREMENTS AND TESTS

Inherent Viscosity: Inherent viscosity ($\eta$inh) is defined by the following equation:

$$\eta\text{inh} = [\ln (\eta\text{rel})/C]$$

wherein ($\eta$rel) represents the relative viscosity and $C$ represents a concentration of 0.5 gram of the polpmer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by C, above; flow times are determined at 30°C., using concentrated (95–98 percent) sulfuric acid as a solvent, unless otherwise specified.

Fiber Tensile Properties: Fiber properties of tenacity, elongation, and initial modulus are coded as T/E/Mi and are reported in their conventional units, i.e., grams per denier, percent, and grams per denier, Denier is coded as Den. Such properties are conveniently measured in accordance with ASTM operational specifications, D76–53, (Oct. 1962), utilizing a testing machine, e.g., an Instron tester (product of the Instron Engineering Corp., Canton, Mass.), providing a constant rate of extension. Unless otherwise specified, samples having a break elongation of up to about 8 percent are tested at a rate of extension of 10%/minute; samples of higher break elongation are tested at 60%/minute. Samples are filaments which measure 1 inch (2.54 cm.) in length or yarns having 3 turns/inch which measure 10 inches (25.4 cm.) in length; and testing is done at 21°C. and 65 percent R.H.

Samples are not boiled off (scoured) but generally are conditioned at 21°C. and 65 percent R.H. for at least 16 hours (sometimes expressed herein as "as is"), unless otherwise specified. If boil-off is specified, it consists of boiling the filaments or yarns for 30 minutes in 0.1 percent aqueous sodium lauryl sulfate, rinsing, drying at 40°C. for 1 hr. and conditioning at 21°C. and 65 percent R.H. for at least 16 hours, unless otherwise specified.

Fiber Heat Treatment: Unless otherwise stated in the examples, the post-extrusion heat treatment process applied to the fibers and yarns obtained from fluid compositions and dopes of this invention comprises washing or soaking the as-extruded fiber or yarn in water until essentially free of the spinning media and/or salt, drying them, then heating them in one of the devices described below.

Device A

The device consists of an inner stainless steel tube 32 in. (81.3 cm.) × 0.3125 in. (7.94 mm.) (I.D.) mounted concentrically in a second tube [1.06 in. (2.69 cm.) O.D.], the whole assembly being centered in a 12 in. (30.48 cm.) electric furnace. Nitrogen gas enters through 2 nipples in the outer tube located 10 in. (25.4 cm.) out from either side of the center of the tube, such that the incoming nitrogen passes through the annular space between the two tubes. The nitrogen passes from the annular space into the inner tube through a small hole located in the wall of the inner tube to its center and thence out the ends of the inner tube at such a rate as to change the atmosphere in the 12 in. (30.48 cm.) heated zone of the inner tube at least once a minute. The outer ends of the device which protrude from the furnace are wrapped with asbestos fiber and glass tape to within about 2 in. (5.08 cm.) of each end. The temperature of the furnace is controlled by a thermocouple brazed to the center of the outside wall of the outer tube and connected to Minneapolis-Honeywell "Pyrovane" controller. The heated tube has a temperature profile with the maximum temperature in the center region. The nominal heat-treating temperature is determined by a thermocouple brazed to the outer central surface of the inner tube. In passing fibers through the tube, guides are used to keep the fiber centered and out of contact with the tube walls.

Device B

This is identical with Device A, above, in terms of tube dimensions, furnace type, etc., and is operated in the same general manner. This device differs from A, above, in the amount of insulation wound on the ends and in the fact that the nitrogen inlets are on opposite sides of the outer tube in Devcie A but are on the same side in Device B. Differences in nitrogen flow rates may exist between the two devices.

Device C

The device consists of an inner stainless steel tube 35 in. (89 cm.) × 0.5 in. (1.27 cm.) (I.D.) mounted concentrically in a second tube [i.e., a 1 in. (2.54 cm.) diameter stainless steel pipe, 18 in. (45.7 cm.) long], the whole assembly being centered in a 12-in. (30.48 cm.) electric furnace. Nitrogen gas enters through two nipples attached to the ends of the outer tube (one at each end of the outer tube) such that the incoming nitrogen passes through the annular space between the two tubes. The nitrogen passes from the annular space into the inner tube throug two small holes located in the wall of the inner tube at its center and thence out the ends of the inner tube at such a rate as to change the atmosphere in the 12-in. (30.48 cm.) heated zone of the inner tube at least once a minute. The outer ends of the device which protrude from the furnace are wrapped with glass wool to within about 2 in. (5.08 cm.) of each end. The temperature of the furnace is controlled by a Minneapolis-Honeywell Pyrovane controller, by means of a thermocouple in contact with the center of the outside surface of the inside tube. The heated tube has a temperature profile with the maximum temperature in the center region. The nominal heat-treating temperature is determined by a second thermocouple in contact with the outer central surface of the inner tube. In passing fibers through the tube, guides are used to keep the fiber centered and out of contact with the tube walls.

Device D

The device consists of a stainless steel tube, 0.286 (7,26 mm.) inside diameter and 32 (81.3 cm.) in length. The tube has a hot nitrogen stream piped into its center and out through its ends at a rate which changes the atmosphere inside the tube once per minute. The tube is mounted in a concentric steel pipe through which the nitrogen passes prior to entering the yarn-treating zone. The entire assembly is mounted inside a small 12-inch (0.3 m.) long, combustion furnace. A thermocouple is brazed to the external surface of the steel pipe and is positioned close to the furnace elements. The output of the thermocouple is connected to a Minneapolis-Honeywell Pyrovane controller, which controls the temperature of the furnace and pipe at such a level that a thermocouple brazed to the outside surface of the inner heat treating tube at its center indicates the temperature at that region. Additional heaters are wrapped around the portion of the heat-treating tube which protrudes from the combustion furnace. A typical profile of the temperature in the tube (for a center or "nominal" temperature of 536°C.), obtained by varying the position of a test thermocouple, is given below:

TEMPERATURE PROFILE OF HEAT-TREATING TUBE

| Distance from Entrance, in. (Multiply × 2.54 for distance in cm.) | Temperature, °C. |
| --- | --- |
| 0 | 135 |
| 6 | 179 |
| 10 | 336 |
| 12 | 452 |
| 14 | 515 |
| 15 | 532 |
| 16 | 537 |
| 17 | 536 |
| 18 | 527 |
| 20 | 474 |
| 22 | 368 |
| 24 | 270 |
| 28 | 213 |
| 32 | 184 |

When appropriate in the examples wich follow, the use of Device A, B, C and D in treating fibers is indicated, together with the nominal heat-treating temperature observed for the central section (approximately 1–2 inches) of the inner tube for that device.

Peak Height Ratio: A measure of the relative intensity of the two major equatorial diffraction peaks for pol(p-benzamide) is given by the peak height ratio (PHR). A suitable method for determining the PHR involves the use of a reflection technique to record the intensity trace of the X-ray diffraction pattern with an X-ray diffractometer.

The measurement is made using poly(p-benzamide) isolated as follows. The polymerization mixture is combined slowly with a large excess of polymer non-solvent, e.g., water, vigorously stirred in a suitable blender, and thereby converted to a powder or finely granular form. The powdered polymer is thoroughly washed with water, and optionally with ethanol, by repeated stirring in the blender followed by filtration, and is dried in a vacuum oven at 60°–90°C. before being stored or treated for subsequent processing.

Approximately 0.5 gram of water- and amide- or urea-free polymer is pressed into a sample holder under an applied pressure of 3,125 lb./in.$^2$ (219.8 × 10$^3$g./cm.$^2$). Using CuK$\alpha$ radiation, a trace of the intensity is recorded from 6° to 40°, 2$\theta$, and with 0.5° slits, at a scanning speed of 1°, 2, per minute, a chart speed of 1 inch (2.54cm.) per minute, and a time constant of 2; 2$\theta$ is the angle between the undiffracted beam and the diffracted beam. The full scale deflection of the recorder is set so that the peak with maximum intensity is at least 50 percent of the scale, which is a linear scale. To calculate the PHR, a base line is first established on the diffractometer scan by drawing a straight line between the points on the curve at 8° and 38°, 2$\theta$. Vertical lines (at constant 2$\theta$ values) are drawn from the peaks in the vicinity of 20.3° and 23.4°, 2$\theta$, to the base line, and the height of the peaks, in chart divisions, above the base line is ascertained. The PHR is then calculated from the equation $$PHR = A/B$$

where $A$ = height of the peak, approximately located at 20.3°, 2$\theta$, above the base line in chart divisions, $B$ = height of the peak, approximately located at 23.4°, 2$\theta$, above the base line in chart divisions.

A typical trace of an X-ray diffraction pattern of powdered poly(1,4-benzamide) homopolymer isolated from preparations in amide or urea media appears in FIG. III. A smooth line was drawn as indicated to compensate for instrument noise and the measurements are made therefrom.

Sedimentation Test: To a solution of 1.0 g. of dry lithium chloride in 30 ml. of dry N,N-dimethylacetamide is added 0.5 g. of dry polymer powder and comminuted to a particle size of about 20 $\mu$ or less. The tube is stoppered and its contents, heated at 60–80°C., are subjected to stirring by a mechanical agitator for a period of from 10 min. to 4–5 hrs. If polmer particles remain visible, the contents of the tube are cooled to −70°C. (e.g., by immersion in a bath of solid carbon dioxide and acetone), then are allowed to warm up until stirring can be resumed, and are heated as above. The tube is then allowed to stand upright for a further 24 hours without stirring. After this time, if no polymer residue lies settled on the bottom of the tube, the sample is said to satisfy the Sedimentation Test.

Crystallinity: The degree of crystallinity indicated by the X-ray diffraction patterns is assessed in a qualitative manner by visual examination and use of the following terms:

amorphous: having only diffuse rings or arcs,
trace: much diffuse scatter with some sharpening of the principal spots,
low: moderate degree of sharpness in the spots with appreciable surrounding diffuse scatter,
medium: quite sharp spots but with the retention of some diffuse character,
high: very sharp diffraction spots and essential absence of diffuse scattering.

With increasing crystallinity, the number of diffraction spots usually increases.

It is to be understood that these ratings are only intended as a differentiation of the range of crystallinities observed for species of fibers within this invention and not as a limitation thereof.

Orientation Angle:

The orientation angle of the fiber (filament) is determined by the general method described in Krimm and Tobolsky, Textile Research Journal, Vol. 21, pp. 805–22 (1951). A wide angle X-ray diffraction pattern (transmission pattern) of the fiber is made using a Warhus pin-hole camera. The camera consists of a collimator tube 3 in. (7.6 cm.) long with two lead (Pb) pinholes 25 mils (0.0635 cm.) in diameter at each end, with a sample-to-film distance of 5 cm.; a vacuum is created in the camera during the exposure. The radiation is generated by Philips X-ray unit (Catalog No. 12.45) with a copper fine-focus diffraction tube (Catalog No. 32172) and a nickel beta-filter; the unit is operated at 40 kv. and 16 ma. A fiber-sample holder 20 mils (0.051 cm) thick is filled with the sample; all the filaments that are in the X-ray beam are kept parallel. The diffraction pattern is recorded on Kodak No-Screen medical X-ray film (NS-54T) or equivalent. The film is exposed for a sufficient time to obtain a pattern which is considered acceptable by conventional standards (e.g., a pattern in which the diffraction spot to be measured has a sufficient photographic density, e.g., between 0.2 and 1.0, to be accurately readable). Generally, an exposure time of about 45 minutes is suitable; however, a lesser exposure time may be suitable, and even desirable, for highly crystalline and oriented samples to obtain a more accurately readable pattern. The exposed film is processed at a temperature of 68± 2°F. in Du Pont Cronex X-ray developer for 3 min., in a stop bath (30 ml. of glacial acetic acid in 1 gal. [3.785 l.] of distilled water) for 15 sec., and in General Electric Supermix X-ray fixer and hardener solution for 10 min. The film is washed in running water for 0.5 hr. and is dried.

The arc length in degrees at the half-maximum intensity (angle subtending points of 50 percent of maximum intensity) of the principal equatorial spot is measured and taken as the orientation angle of the sample. The specific arcs used for orientation angle determinations on fibers described in the following examples (in the order presented in the following section) occurred at the following positions, 2$\theta$ (degrees):

| Fiber of Example | 2$\theta$ (Degrees) |
| --- | --- |
| 1 (A-1) | 22.56 |
| 1 (H-1) | 22.41 |
| 1 (A-2) | 22.56 |
| 1 (H-2) | 22.51 |
| 2 (A) | 22.49 |
| 4 (A) | 24.35 |
| 4 (H) | 15.59 |
| 6 (A) | 22.73 |

-Continued

| Fiber of Example | 2θ (Degrees) |
|---|---|
| 7 (A) | 22.44 |
| 7 (H) | 21.45 |
| 8 (A) | 22.10 |
| 8 (H) | 22.19 |
| 9 (A) | 21.20 |
| 9 (H) | 22.00 |
| 10 (A) | 22.32 |
| 10 (H) | 21.82 |
| 11 (A) | 21.55 |
| 11 (H) | 21.78 |
| 13 (A) | 22.39 |
| 13 (H) | 22.22 |
| 14 (A) | 22.34 |
| 14 (H) | 22.12 |
| 15 (A) | 22.44 |
| 15 (H) | 22.46 |
| 16 (A) | 22.44 |
| 16 (H) | 22.32 |
| 17 (A) | 22.93 |
| 17 (H) | 22.59 |
| 18 (A) | 22.51 |
| 18 (H) | 22.15 |
| 19 (A) | 22.68 |
| 19 (H) | 22.29 |
| 20 (A) | 22.17 |
| 20 (H) | 22.15 |
| 21 (A) | 21.60 |
| 21 (H-1) | 21.93 |
| 21 (H-2) | 22.00 |
| 22 (A) | 20.83 |
| 22 (H) | 22.12 |
| 23A (A) | 20.68 |
| 23A (H) | 22.00 |
| 23B (A) | 21.05 |
| 23B (H) | 20.05 |
| 24 (A) | 21.31 |
| 24 (H) | 20.28 |
| 25 (A) | 20.83 |
| 25 (H) | 21.95 |
| 26 (A) | 20.38 |
| 26 (H-1) | 21.95 |
| 26 (H-2) | 22.15 |
| 27 (A) | 22.10 |
| 27 (H) | 21.93 |
| 28 (H) | 21.95 |
| 29 (H) | 22.17 |
| 30 (H) | 22.93 |
| 31 (A) | 22.27 |
| 31 (H) | 22.34 |
| 32 (A) | 21.88 |
| 32 (H) | 22.20 |
| 33 (A) | 21.48 |
| 33 (H) | 22.17 |
| 34 (A) | 20.98 |
| 34 (H) | 22.10 |
| 35 (A) | 21.50 |
| 35 (H) | 22.17 |
| 36 (A) | 21.16 |
| 36 (H) | 22.19 |
| 37 (A) | 22.54 |
| 37 (H) | 22.39 |
| 38 (A) | 22.71 |
| 38 (H) | 22.24 |
| 39 (A) | 22.27 |
| 39 (H) | 22.34 |
| 40 (H) | 23.41 |
| 41 (A) | 23.39 |
| 41 (H) | 23.36 |
| 42 (H) | 21.93 |
| 43 (H) | 21.93 |
| 44 (A) | 22.98 |
| 44 (H) | 22.44 |
| 45 (A) | 23.51 |
| 45 (H) | 22.59 |
| 46 (A) | 23.46 |
| 46 (H) | 22.51 |
| 47 (A) | 22.39 |
| 47 (H) | 22.05 |
| 48 (H) | 22.78 |
| 51 (A) | 22.29 |
| 51 (H) | 20.20 |
| 52 (A) | 22.69 |
| 52 (H) | 22.07 |
| 53 (A) | 23.22 |
| 53 (H) | 22.34 |
| 54 (A) | 25.69 |
| 54 (H) | 19.97 |
| 55 (A-1) | 26.08 |
| 55 (H) | 18.47 |
| 55 (A-2) | 26.06 |
| 56 (A-1) | 22.98 |
| 56 (A-2) | 22.93 |
| 57 (A) | 23.07 |
| 57 (H) | 22.44 |
| 67A (A) | 22.64 |
| 67D (A) | 22.56 |
| 68 (H) | 22.12 |
| 76 (A) | 18.92 |
| 76 (H) | 18.48 |
| 77 (A) | 18.84 |
| 77 (H) | 18.18 |
| 79 (H) | 25.37 |
| 80 (A) | 19.00 |
| 80 (H) | 18.48 |
| 81 (H) | 16.35 |

A = As-extruded fiber
H = Heat-treated fiber
A-1 = First as-extruded fiber in Example
A-2 = Second as-extruded fiber in Example
H-1 = First heat-treated fiber in Example
H-2 = Second heat-treated fiber in Example The orientation angles of fibers of this invention are variously determined by three related densitometer methods (or equivalents thereof) from the X-ray film whose development has been described above.

In one method (Method One) the azimuthal intensity distribution of the diffraction arc is obtained by use of a Joyce-Loebl Automatic Recording Microdensitometer (Model MK III C, having a rotating stage, product of Joyce, Loebl and Co., Gateshead, England). Typical instrument settings used are: lever ratio : 1:1; objective lens: 5/0.10; recorder speed: integrate; slit setting: 187; wedge: 0.087 density units/cm. Variations of these settings, which may be required by the nature of a given diffraction pattern, are made in accordance with the manufacturer's manual for this equipment (dated August, 1963). In operation, the film is placed on the stage, the instrument is focused on the film, and the center of the diffraction pattern is made coincident with the stage center; both these centers are made coincident with the light beam of the instrument. The stage and mounted film are moved to permit the light beam to pass through the most intense area of the diffraction spot, the opposite spot is checked to insure true centering, and after any necessary fine adjustments are made, the recording of the azimuthal intensity trace through a 360° rotation of the film is made on suitable linear scale coordinate paper. There is obtained a curve which has two major peaks. A base line is drawn beneath each peak such that the background density of the film is extended beneath the peak. A perpendicular line is dropped from each peak maximum to the base line. Through the mid-point of each perpendicular line (i.e., the "half-height" point) is drawn a line parallel to the base line which intersects each leg of the respective curves. The leg-to-leg length of each half-height horizontal line is converted to the degrees of arc as follows. The horizontal distance (i.e., parallel to the base line) between the two peak maxima is measured and represents 180° of arc. By direct proportion to this peak-to-peak distance, the half-height leg-to-leg distance is converted to a degree value. The values for the two arcs are averaged and this is the orientation angle referred to herein.

The percentage of crystallites aligned with respect to the fiber axis within one-half of the angle calculated by the above-described method is determined as follows. For each peak of the above-described trace, perpendicular lines are dropped to the base line from the points of contact on the peak of the leg-to-leg half-height horizontal line. This establishes a rectangle bounded by the base line, the two perpendicular lines, and the half-height horizontal line. By use of a planimeter, the relative area of the rectangle plus the area of the peak under the curve and above the half-height horizontal line is determined (total = Area 1). The total area under the peak above the base line is then determined by the planimeter (Area 2). The percent of crystallites aligned within the orientation angle equals:

(Area 1)/(Area 2) × 100.

A second method (Method Two) used to determine orientation angles in the filaments of the instant invention employs an improved version of the "flying-spot" densitometer described by Owens and Statton in "Acta Cryst." (1957) 10, 560–562. The equipment used is similar to that described by Owens and Statton in their FIG. 1, with the following differences:
1. The Sola Constant Voltage Transformer No. 80808 is replaced by catalog No. 23-22-112, and this unit is connected only in series between the master switch of the 500 Volt Regulated Supply.
2. The Dumont No. 304 A Display Oscilloscope and the adjacent Calibrating Signal Generator are replaced by a Tektronix 532 Display Oscilloscope combined with a Tektronix Type 53/54 K Preamplifier. The combined units are connected in series only between the Main Switch and the Photomultiplier.
3. The Flying Spot Oscilloscope (Dumont No. 304 A) and its Cathode-Ray Tube are replaced by a Tektronix 536 Oscilloscope having a 536 P 5 Cathode-Ray Tube.
4. The 500 Volt Regulated Supply is connected to the Photomultiplier and also to the Circle Generator (a type of device designated by Owens and Statton as a Scanning Frequency Generator).
5. The Circle Generator is connected at one point through a Tektronix Type 53/54 K Horizontal Preamplifier and at a second point through a line-circle switch and a Tektronix Type 53/54 K Vertical Preamplifier to the Tektronix 536 Oscilloscope.

Operation of this device follows the instructions given by Owens and Statton, except that the calibration with a square wave from a signal generator is not necessary. As described in the article, a metal block conveniently establishes the infinite density level of the display diagram. A clear portion of the film provides a reference for zero density.

As noted by the authors, the "flying-spot" densitometer provides a rapid measure of the orientation angle and the photographic density (optical density).

A third method (Method Three) by which orientation angles of the fibers of this invention are determined comprises a Leeds & Northrup Microphotometer (Catalogue No. 6700-P1) whose electronic components have been replaced by a Keithley 410 Micro-Microammeter (Keithley Instruments Inc., Cleveland, Ohio). The output of this apparatus is fed to a Leeds & Northrup Speedomax Recorder, Type G. From the curve traced by this apparatus on, e.g., semi-log chart paper, the orientation angle and the crystallite alignment may be obtained by procedures comparable to those employed with the Joyce-Loebl equipment described above.

Of the above three methods or instrument systems, Method One and Method Three described above, provide the most accurate determinations of the orientation angle. The precision of the flying-spot method is about ±1.5° of angle value reported. The orientation angles reported in the following examples are determined using Method Two (the flying-spot apparatus), unless otherwise indicated, since it provided speed and convenience of measurement for the large number of fibers analyzed.

Sonic Velocity: In the following examples, the velocity of sound in fibers of this invention, identified as the sonic velocity (SV) of the fiber, is determined by using (in a conventional manner, according to the manufacturer's directions) a KLH dynamic modulus tester PPM-5 (product of the KLH Research and Development Corp., Cambridge, Mass.), hereinafter identified as "PPM-5", in conjunction with a Speedomax Type G potentiometric recorder (product of the Leeds & Northrup Co., Philadelphia, Pa.), hereinafter identified as "recorder". The latter instrument is operated as a 10 millivolt recorder. These instruments permit measurements to be made as plots of sound propagation time as a function of distance.

The procedure by which the sonic velocity measurements herein are determined may be summarized as follows, with all measurements being taken in an air atmosphere maintained at 70°F. and 65 percent relative humidity, (R.H.). The yarns are exposed to the latter conditions for a minimum of 16 hours prior to the SV determination.

The range switch of the modular unit of the PPM-5 is set at 100, thus causing the recorder to read 100 microseconds on a full scale deflection basis, or 10 microseconds for each inch across the paper perpendicular to the paper direction. The recorder is adjusted to advance the chart paper (no. 690489, Leeds & Northrup Co.) at the rate of 0.688 inch/min.

The yarn sample is mounted in the scanner unit of the PPM-5 and is properly weighted to effect a tension on the yarn of 0.1 g./den. The power switch, zero control, and threshold adjustment are activated (in a conventional manner, according to the manufacturer's directions). Then, while the movable transducer (or yarn probe) of the PPM-5 scanner cyclicly moves away from and toward the stationary transducer (yarn probe) at the rate of 3 in./min., a sonic pulse signal of 10,000 cycles/sec. is applied to the yarn. As the probe moves along the yarn, on the chart paper is recorded a diagonal line which traverses the paper from side-to-side. The stylus of the recorder reverses direction when the probes are at the points of maximum and minimum separation from each other.

Since the chart paper is advanced at the rate of 0.688 in./min., the probe speed along the yarn is faster than the chart advancement speed by a ratio of 3/0.688 or 4.36/1 [i.e., for each 1 inch of chart movement, the moving probe has covered 4.36 inches (11.05 cm.) along the yarn].

The velocity of sound between two points in the yarn (sonic velocity, SV) is then determined by multiplying the slope of the recorded chart line by 11.05 km./sec. as follows:

$$SV = \frac{\text{vertical distance in inches between 2 points on chart line}}{\text{horizontal distance in inches between 2 points on chart line}} \times 11.05 \frac{\text{km.}}{\text{sec.}}$$

The factor, 11.05 km./sec., results from the combination of chart and probe speeds and the unit conversion requirements as shown in the calculation below.

$$\frac{4.36 \text{ inch}/1 \text{ inch vertical (chart)}}{10 \text{ microseconds}/1 \text{ inch horizontal (chart)}} \times \frac{2.54 \frac{\text{cm.}}{\text{inch}} \times 10^{-5} \frac{\text{km.}}{\text{cm.}}}{10^{-6} \frac{\text{sec.}}{\text{microsecond}}} = 11.05 \frac{\text{km.}}{\text{sec.}}$$

Sonic velocity values reported herein are based on a measurement of the slope of the chart line established as the two probes separate (i.e., as the moving probe travels away from the yarn tension weight). Usually, the slope value which is multiplied by 11.05 km./sec. is the average of three separate slope determinations made for three separate diagonal chart lines.

EXAMPLES

The following nonlimiting examples are illustrative of the practice of this invention.

EXAMPLE 1

This example illustrates (1) the preparation of poly(p-phenylene terephthalamide), (2) the preparation of anisotropic and isotropic oleum dopes thereof, and (3) fibers thereof.

Polymer Preparation: Powdered terephthaloyl chloride (71.1 g., 0.35 mole) is added at once to a solution of p-phenylenediamine (37.8 g., 0.35 mole) in a mixture of hexamethylphosphoramide (420 ml.) and N-methyl-2-pyrrolidone (210 ml.) contained in a 1-liter resin-making kettle equipped with an air-driven stirrer and a calcium chloride drying tube. The temperature of the reaction mixture is moderated with a water bath at room temperature. A solid mass is obtained within minutes and allowed to stand at room temperature for 4 hrs. The mass is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The inherent viscosity, measured as a solution of 125 mg. polymer in 25.0 ml. of 95–98 percent (by weight) sulfuric acid, is 2.64.

Anisotropic Dope Preparation: A mixture of 36.0 g. of the above polymer and 264 g. of fuming (3 percent free $SO_3$) sulfuric acid is mixed anhydrously with an air-driven disc-type stirrer in a 500 ml. resin-making kettle while cooling with an ice/water bath. The mixture is stirred overnight and is allowed to stand for 15 days at room temperature. The resulting dope exhibits stir-opalescence and depolarizes plane polarized light.

Fiber Preparation by Wet Spinning Anisotropic Dope: A portion of the spin dope prepared above is centrifuged to remove entrapped air. It is then extruded by means of a mechanically drive syringe through a 0.010 in. (0.254 cm.) thick precious metal spinneret having 20 holes of 0.003 in. (0.076 mm.) diameter into an aqueous coagulating bath at 41°C. The bath is about 2 in. (5.1 cm.) wide and about 1 in. (2.54 cm.) deep. After passing through the bath for about 2 ft. (0.61 m.) the yarn is snubbed out of the water at about a 45° angle to an electrically driven wind-up device. The yarn is collected on a perforated bobbin at 65 ft./min. (19.8 m./min.). It is then washed in cool running water for several (i.e., 3 hr.) hours and dried in air at room temperature. The filaments exhibit low crystallinity and an orientation angle of 34° and a sonic velocity of 4.56 km./sec. Filaments (boiled off) exhibit the following T/E/Mi/Den. values: 5.3/10.4/171/5.0.

Heat Treatment of Fibers from Anisotropic Dope: The above yarn is passed at 25 ft./min. (7.63 m./min.) through a tube [Device A] heated to 600°C. and collected at 27.5 ft./min. (8.34 m./min.). The resulting fibers exhibit high crystallinity, an orientation angle of 15°, and a sonic velocity of 8.37 km./sec. Filaments (boiled off) exhibit the following T/E/Mi/Den. values: 12.8/1.9/817/4.84.

Isotropic Dope Preparation: A mixture of 9.0 g. of the above polymer and 111.0 g. of fuming (2 percent free $SO_3$) sulfuric acid is mixed anhydrously with an air-driven disc-type stirrer in a 500-ml. resin-making kettle while cooling with an ice/water bath. The mixture is stirred overnight or until a clear viscous dope is obtained during which time the cooling bath is allowed to warm to room temperature.

Fiber Preparation by Wet Spinning the Isotropic Dope: A portion of the clear spin dope prepared above is centrifuged to remove entrapped air. It is then extruded by means of a mechanically driven syringe through a 0.010 in. (0.0254 cm.) thick precious metal spinneret having 20 holes of 0.003 in. (0.076 mm.) diameter into an aqueous coagulating bath at room temperature. The bath is about 2 in. (5.1 cm.) wide and about 1 in. (2.54 cm.) deep. After passing through the bath for about 2 ft. (0.61m.) the yarn is snubbed out of the water at about a 45° angle to an electrically driven wind-up device. The yarn is collected on a perforated bobbin at 37 ft./min. (11.3 m./min.). It is then washed in cool running water for several hours (i.e., 3 hr.) and dried in air at room temperature. The filaments exhibit low crystallinity and an orientation angle of about 50° as measured from a wide angle x-ray pattern. Filaments (boiled off) exhibit the following T/E/Mi/Den. values: 3.1/20.8/106/7.0.

Heat Treatment of Fibers from the Isotropic Dope: The above yarn is passed at 25 ft./min. (7.63 m./min.) through a tube [Device A] heated to 550°C. and collected at 27.5 ft./min.). The resulting fibers exhibit high crystallinity and an orientation angle of 19°. Filaments (boiled off) exhibit the following T/E/Mi/Den. values: 5.3/1.4/401/5.7.

EXAMPLE 2

This example illustrates (1) the preparation of poly(p-phenylene terephthalamide), (2) an anistropic oleum dope thereof, and (3) high modulus fibers thereof.

Polymer Preparation: Powdered terephthaloyl chloride (101.55 g., 0.5 mole) is added to a solution of p-phenylenediamine (54.0g., 0.5 mole) in a mixture of hexamethylphosphoramide (600 ml.) and N-methyl-2-pyrrolidone (300 ml.) and stirred at high speeds in a blender. A solid mass is obtained within minutes. After 20 min., the mass is combined with water and stirred at high speeds in a gallon-size (3.785 liter) blender. The polymer is washed four times with water, once with alcohol, and finally with acetone by being stirred in a blender and isolated by being filtered on a Buchner funnel. The polymer is dried overnight in a vacuum oven at about 100°C. The yield of polymer is 116 g. (97.5 percent of theoretical). The inherent viscosity, measured as a solution of 125 mg. polymer in 25.0 ml. of 95-98 percent (by weight) sulfuric acid, is 3.8.

Anisotropic Dope Preparation: A mixture of 50.0 g. of the above polymer and 450.0 g. of fuming (0.8 percent free $SO_3$) sulfuric acid is mixed anhydrously with an air-driven disc-type stirrer in a 500-ml. resin-making kettle while cooling with an ice/water bath. The mixture is stirred overnight during which time the cooling bath is allowed to warm to room temperature. The resulting dope exhibits stir-opalescence and depolarizes plane polarized light. It exhibits a solution viscosity at room temperature of 5000 poise, measured by a Brookfield (model RVF) viscometer employing a No. 7 spindle, at a spindle rate of 2 r.p.m.; at a rate of 20 r.p.m. the dope exhibits a solution viscosity of only 1660 poise.

Fiber Preparation by Wet Spinning: The spin dope prepared above is centrifuged to remove entrapped air. It is then extruded at the rate of about 0.8 ml./min. under a pressure of 370 lb./in.$^2$ (26 $_{Kg}$/cm.$^2$) through a 0.025 in. )0.064 cm.) thick precious metal spinneret having 20 holes of 0.002 in. (0.0051 cm.) diameter into an aqueous coagulating bath maintained at 43°C. The bath is about 16 in. (40 cm.) wide, 5.5 in. (14 cm.) deep and 37 in. (94 cm.) long with stainless steel rollers placed about 2 ft. (0.61 m.) from each other. The yarn is drawn through the bath and around the rollers such that it makes three passes through the water bath. It is then snubbed out of the bath at about a 45° angle to an electrically driven wind-up device. The yarn is collected on a perforated bobbin at 27 ft./min. (8.24 m./min.) while being wetted on the bobbin by passing through a water reservoir located at the lower portion of the collection bobbin. It is then washed in cool running water overnight and a portion is removed for heat treatment. The remainder is dried on the bobbin in air at room temperature. The dry filaments exhibit low crystallinity and an orientation angle of 31° and a sonic velocity of 5.00 km./sec. Filaments exhibit the following T/E/M$_i$Den. values: 7.0/9.1/173/1.93 (10 percent rate of extension).

Heat Treatment of Wet Fibers: The wet (washed) yarn prepared above is passed at 25 ft./min. (7.63 m./min.) through a tube [Device B] heated to 500°C. and collected at 26.5 ft./min. (8.09 m./min.). The resulting filaments exhibit high crystallinity and an orientation angle of 11° as measured from a wide angle x-ray pattern. Filaments exhibit the following T/E/M$_i$/Den. values: 13.7/1.6/888/3.23.

EXAMPLE 3

This example illustrates the preparation of poly(2-methyl-p-phenylene 2,6-naphthalamide) and an anisotropic dope thereof.

Polymer Preparation: 2,6-Naphthaloyl chloride (12.65 g., 0.05 mole) is added at once to a slurry of 2-methyl-p-phenylenediamine dihydrochloride (9.75 g., 0.05 mole) in N,N-dimethyl-acetamide (120 ml., distilled from $CaH_2$ at reduced pressure and stored over 5A molecular sieves) contained in a 500 ml. resin-making kettle equipped with an air-driven stirrer and a calcium chloride drying tube. The temperature of the reaction mixture is moderated with a water bath at room temperature. A paste-like mass is obtained within minutes and is allowed to stand overnight at room temperature, whereupon the paste becomes a hard stiff mass. Lithium oxide (3.0 g., 0.1 mole) is then mixed in with a spatula and the resulting mixture combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The yield of polymer is 13.9 g. (92.2 percent of theoretical). The inherent viscosity, measured as solution of 125 mg. polymer in 25.0 ml. of 95-98 percent (by weight) sulfuric acid, is 2.08.

Anisotropic Dope Preparation: A mixture of 7.5 g. of the above polymer and 45.0 g. of 99.5 percent (by weight) sulfuric acid is mixed anhydrously with a mechanically driven paddle-type stirrer in a 200 ml. round-bottom flask while cooling with an ice/water bath. The mixture is stirred overnight during which time the cooling bath is allowed to warm to room temperature. The resulting fluid dope exhibits stiropalescence and depolarizes plane polarized light.

EXAMPLE 4

This example illustrates the preparation of poly(2,6-dichloro-p-phenylene 2,6-naphthalamide) and the direct preparation of fibers from the anisotropic N,N-dimethylacetamide/lithium chloride reaction mixture.

Polymer and Spin Dope Preparation: 2,6-Naphthaloyl chloride (12.65 g., 0.05 mole) is added at once to a solution of 2,6-dichloro-p-phenylenediamine (8.85 g., 0.05 mole; sublimed) in N,N-dimethylacetamide (120 ml., distilled from $CaH_2$ at reduced pressure and stored over 5A molecular sieves) contained in a 500 ml. resin-making kettle equipped with an air-driven stirrer and a calcium chloride drying tube. The mixture is stirred vigorously and the temperature is moderated with a cool (i.e., 20°C.) water bath. After being stirred about 35 min., a stiff mass is obtained and is allowed to stand overnight at room temperature. Lithium oxide (1.50 g., 0.053 mole) is added to the stiff mass and is mixed in with a spatula. A fluid dope is obtained within a few minutes. This dope exhibits stir-opalescence and depolarizes plane polarized light. A small portion of the dope is combined with water and stirred at high speeds in a quart-size (0.946 liter) blender. The polymer is washed three times with water by being stirred in a blender and isolated by being filtered on a sintered-glass coarse-pore Buchner funnel. The polymer is dried overnight in a vacuum oven at about 70°C. The inherent viscosity, measured as a solution of 125 mg. of polymer in 25.0 ml. of 95-98 percent (by weight) sulfuric acid, is 1.99.

Fiber Preparation by Wet Spinning: The dope described above is centrifuged to remove entrapped gases. It is then extruded at the rate of about 3.5 ml./min. under a pressure of 50 lb./in.$^2$ (3.52 $_{Kg}$/cm.$^2$) through a 0.010 in. (0.0254 cm.) thick precious metal spinneret having 100 holes of 0.003 in. (0.076 mm.) diameter into an aqueous coagulating bath maintained at about 51°C. The bath is about 16 in. (40 cm.) wide, 5.5 in. (14 cm.) deep and 37 in. (94 cm.) long with stainless steel rollers placed about 2 ft. (0.61 m.) from each other. The yarn is drawn through the bath and around the rollers such that it makes three passes through the water bath. It is then snubbed out of the bath at about a 45° angle to an electrically driven windup device. The yarn is collected on a perforated bobbin at 39 ft./min. (11.9 m./min.). It is then washed in cool running water for 3 hr. and dried in air at room temperature. The filaments exhibit low crystallinity and an orientation angle of about 50° as measured from a wide angle x-ray pattern. Filaments exhibit the following T/E/$M_i$/Den. values: 8.7/8.6/222/3.75.

Heat Treatment of Fibers: The yarn prepared as above is passed at 25 ft./min. (7.63 m./min.) through a tube [Device B] heated to 500°C. and collected at 27.5 ft./min. (8.49 m./min.). The resulting filaments exhibit medium crystallinity and an orientation angle of 10° as measured from a wide angle x-ray pattern. Filaments exhibit the following T/E/$M_i$/Den. values: 10.5/2.2/518/3.43.

EXAMPLE 5

This example illustrates (1) the preparation of poly(p-phenylene 2,6-naphthalamide), (2) an anisotropic sulfuric acid dope thereof, and (3) fibers thereof.

Polymer Preparation: 2,6-Naphthaloyl chloride (25.3 g., 0.10 mole) is added to a solution of p-phenylenediamine (10.80 g. 0.10 mole; sublimed through silica gel) in a mixture of hexamethylphosphoramide (120 ml., distilled from $CaH_2$ and stored over 5A molecular sieves) and N-methyl-2-pyrrolidone (80 ml., distilled from $CaH_2$ and stored over 5A molecular sieves) contained in a 500 ml. resin-making kettle equipped with an air-driven stirrer and a calcium chloride drying tube. The mixture is stirred vigorously and the temperature is moderated with a cool (i.e., 20°C.) water bath. After several minutes (i.e., 3min.) a small amount (i.e., less than 0.10 g.) of 2,6-naphthaloyl chloride is added to the hazy solution. A stiff mass is obtained within seconds and is allowed to stand overnight at room temperature. (In another similar but different run, a stiff mass is obtained within 1 min. without requiring the addition of extra 2,6-naphthaloyl chloride). The solid mass is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The yield of poly(p-phenylene 2,6-naphthalamide) is 27.6 g. (95.7 percent of theoretical). The inherent viscosity, measured as a solution of 125 mg. of polymer in 25.0 ml. of 95–98 percent (by weight) sulfuric acid, is 2.48.

Dope Preparation: A mixture of 7.5 g. of the above polymer and 67.5 g. of 98.7% by weight sulfuric acid is mixed anhydrously with a mechanically driven paddle-type stirrer in a 200-ml. round-bottom flask while cooling with an ice/water bath. The mixture is stirred overnight during which time the cooling bath is allowed to warm to room temperature. The resulting fluid dope exhibits stir-opalescence and depolarizes plane polarized light.

Fiber Preparation by Wet Spinning: The spin dope prepared above is centrifuged to remove entrapped gases. It is then extruded by means of a mechanically driven syringe through a 0.025 inch (0.064 cm.) thick precious metal spinneret having 20 holes of 0.003 inch (0.076 mm.) diameter into an aqueous coagulating bath at 25°C. The water bath is about 2 in. (5.1 cm.) wide and about 1 in. (2.54 cm.) deep. After passing through the bath for about 2 ft. (0.61 m.), the yarn is snubbed out of the water at about a 45° angle to an electrically driven wind-up device. The yarn is collected on a perforated bobbin at 22 ft./min. (6.7 m./min.) while being wetted on the bobbin by passing through a water reservoir located at the lower portion of the collection bobbin. It is then washed in cool running water overnight and is dried in air at room temperature. Filaments exhibit the following T/E/$M_i$/Den. values: 3.9/6.3/195/3.20.

Heat Treatment of Fibers: The above yarn is passed at 25 ft./min. (7.63 m./min.) through a tube [Device B] heated to 533°C. and collected at 28 ft./min. (8.59 m./min.). The resulting filaments exhibit the following T/E/$M_i$Den. values: 7.6/1.7/540/6.50.

EXAMPLE 6

This example illustrates (1) the preparation of a random copolymer comprised of 54.7 percent by weight poly(p-phenylene 2,6-naphthalamide) and 44.3 percent by weight poly(p-phenylene terephthalamide), (2) an anisotropic dope thereof, and (3) fibers thereof.

Polymer Preparation: Powdered terephthaloyl chloride (5.08 g., 0.025 mole; sublimed) is added at once to a solution of p-phenylene diamine (5.40 g., 0.050 mole; sublimed through silica gel) in a mixture of hexamethylphosphoramide (60 ml., distilled from $CaH_2$ at reduced pressure and stored over 5A molecular sieves) and N-methyl-2-pyrrolidone (40 ml., distilled from $CaH_2$ at reduced pressure and stored over 5A molecular sieves) contained in a 500 ml. resin-making kettle equipped with an air-driven stirrer and a calcium chloride drying tube. After mixing for about 5 min., 2,6-naphthaloyl chloride (6.33 g., 0.025 mole) is added at once. The mixture is stirred vigorously while the temperature is moderated with a cool (i.e., 20°C.) water bath. After about 4 min. a crumb-like mass is obtained and is allowed to stand overnight at room temperature. It is then combined with water and stirred at high speeds in a gallon-size (3.785 liter) blender. The polymer is washed three times with water by being stirred in a blender and isolated by being filtered on a sintered-glass coarse-pore Buchner funnel.

The inherent viscosity, measured as a solution of 125 mg. of polymer in 25.0 ml. of 95–98 percent (by weight) sulfuric acid, is 5.51.

Dope Preparation: A mixture of 7.5 g. of the above polymer and 67.5 g. of 99.2 percent (by weight) sulfuric acid is mixed anhydrously with a mechanically driven paddle-type stirrer in a 200-ml. round-bottom flask, while cooling with an ice/water bath. The mixture is stirred overnight during which time the cooling bath is allowed to warm to room temperature. The resulting dope is extremely viscous, exhibits stir-opalescence and depolarizes plane polarized light.

Fiber Preparation by Wet Spinning: The spin dope prepared above is centrifuged to remove entrapped gases. It is then extruded by means of a mechanically driven syringe through a 0.025 in. (0.064 cm.) thick precious metal spinneret having 20 holes of 0.003 in. (0.076 mm.) diameter into an aqueous coagulating bath at 25°C. The water bath is about 2 in. (5.1 cm.) wide and about 1 in. (2.54 cm.) deep. After passing through the bath for about 2 ft. (0.61 m.) the yarn is snubbed out of the water at about a 45° angle onto an electrically driven wind-up device. The yarn is collected on a perforated bobbin at 20 ft./min. (6.1 m./min.) while being wetted on the bobbin by passing through a water reservoir located at the bottom of the collection bobbin. It is then washed in cool running water overnight and a portion removed for heat treatment. The remainder is dried on the bobbin in air at room temperature. The dry filaments exhibit trace crystallinity and an orientation angle of 37° and a sonic velocity of 5.92 km./sec. Filaments exhibit the following T/E/$M_i$/Den. values: 8.7/8.4/327/4.79 (10 percent rate of extension).

Heat Treatment of Wet and Dry Fibers: The above wet as-spun (washed) yarn is passed at 25 ft./min. (7.63 m./min.) through a tube [Device B] heated to 547°C. and collected at 29.0 ft./min. (8.84 m./min.). The resulting fibers exhibit high crystallinity and an orientation angle of 11° as measured from a wide angle x-ray pattern. The yarn exhibits the following T/E/$M_i$/Den. values: 12.7/1.8/895/87.3. In addition, the dry as-extruded yarn from above is passed at 25 ft./min. (7.62 m./min.) through the nitrogen filled tube assembly heated to 535°C. and collected at 28.0 ft./min. (8.54 m./min.). Filaments exhibit the following T/E/$M_i$/Den. values: 9.5/1.8/633/4.67.

EXAMPLE 7

This example illustrates (1) the preparation of a copyolyamide comprised of repeating units selected from the group of

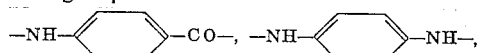
and
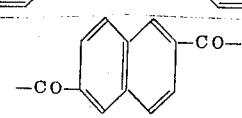

(relative molar ratio of 1:1:1, respectively), (2) an anisotropic dope of the copolyamide, and (3) fibers of the copolyamide.

Polymer Preparation: p-Aminobenzoyl chloride hydrochloride (14.4 g., 0.075 mole) is weighed into a polyethylene bag in a dry-box, i.e., a chamber maintained under anhydrous conditions. The open end of the bag is secured to a glass tube of about 3 in. (7.6 cm.) long on one end of which is a 29/26 ᵍ inner joint. The bag assembly is removed from the dry-box and attached via the ᵍ joint to a 1,000 ml. resin-making kettle equipped wqth a stirrer and calcium chloride drying tube. The contents of the bag are emptied as rapidly as possible into a solution of p-phenylenediamine (8.10 g., 0.075 mole) in a mixture of hexamethylphosphoramide (405 ml., distilled from $CaH_2$ at reduced pressure and stored over 5A molecular sieves) and N-mehyl-2-pyrrolidone (135 ml., distilled from $CaH_2$ at reduced pressure and stored over 5A molecular sieves). After mixing 5 min. 2,6-naphthaloyl chloride (19.18 g., 0.075 mole) is added at once with vigorous stirring. The temperature of the reaction mixture is moderated with a cool (i.e., 20°C.) water bath. Less than 0.1 g. of 2,6-naphthaloyl chloride is added after a further 8 min. The mixture sets up to an unstirrable mass in 1 hr. and is allowed to stand overnight at room temperature. The mixture is then combined with water and stirred at high speeds in a gallon-size (3.785 liter) blender. The solid is washed three times with water by being stirred in a blender and isolated by being filtered on a sintered-glass coarse-pore Buchner funnel. The solid is dried overnight in a vacuum oven at about 70°C. The yield of polymer is 30.5 g. (99.6 percent of theoretical). Th inherent viscosity, measured as a solution of 125 mg. of polymer in 25.0 ml. of 95–98 percent (by weight) sulfuric acid, is 3.22.

Dope Preparation: A mixture of 7.5 g. of the above polymer and 67.5 g. of 99.2 percent (by weight) sulfuric acid is mixed anhydrously with a mechanically driven paddle-type stirrer in a 200 ml. round-bottom flask while cooling with an ice/water bath. The mixture is stirred overnight during which time the cooling bath is allowed to warm to room temperature. The resulting fluid dope exhibits stir-opalescence and depolarizes plane polarized light.

Fiber Preparation by Wet Spinning: The spin dope prepared above is centrifuged to remove entrapped air. It is then extruded by means of a mechanically-driven syringe through 0.025 in (0.064 cm.) thick precious metal spinneret having 20 holes of 0.003 in. (0.076 mm.) diameter into an aqueous coagulating bath at 25°C. The bath is about 2 in. (5.1 cm.) wide and about 1 in. (2.54 cm.) deep. After passing through the bath for about 2 ft. (0.61 m.), the yarn is snubbed out of the water at about a 45° angle to an electrically driven wind-up device. The yarn is collected on a perforated bobbin at 30 ft./min. (9.15m./min.). It is then washed in cool running water overnight and a portion removed for heat treatment. The remainder is dried in air at room temperature. The dry filaments exhibit trace crystallinity and an orientation angle of about 40° as measured from a wide angle x-ray pattern. Filaments exhibit the following T/E/$M_i$/Den. values: 6.6/9.4/215/3.99.

Heat Treatment of Wet Fibers: The above wet (washed yarn is passed at 25 ft./min. (7.63 m./min.) through a tube [Device B] heated to 438° C. and collected at 27.5 ft./min. (8.34 m./min.). The resulting fibers exhibit high crystallinity, an orientation angle of 13°. and a sonic velocity of 8.70 km./sec. Filaments exhibit the following T/E/Mi/Den. values: 10.0/2.2/580/2.93.

DDA Determination: When a different sample of the above-described polymer (prepared in a manner similar to that above: $\eta$inh = 1.3) is combined with 99.2 percent (by weight) sulfuric acid to form a dope containing 12 percent by weight polymer, the DDA value observed for the resulting dope is 32.2.

EXAMPLE 8

This example illustrates the preparation of (1) poly[p-phenylene bis(iminocarbonyl-p-phenylene) terephthalamide], (2) an anisotropic oleum dope thereof, and (3) fibers thereof.

Polymer Preparation: Powdered terephthaloyl chloride (5.0 g., 0.0246 mole) is added to a slurry of N,N'-bis(p-aminobenzoyl)-p-phenylenediamine (17.3 g., 0.05 mole) in hexamethyl phosphoramide (280 ml.) contained in a 500 ml. resin-making kettle equipped with an air-driven split-disc stirrer and a calcium chloride drying tube, while cooling with an ice/water bath. The diamine goes into solution as the reaction continues; after 10 min. more terephthaloyl chloride (5.15 g., 0.0254 mole) is added at once. The reaction mixture is stirred at high speeds in a gallon-size (3.785 liter) blender. The solid obtained is washed three times with water, once with alcohol, and finally with acetone by being stirred in a blender and isolated by being filtered on a sintered-glass coarse-pore Buchner funnel. The solid is dried for 72 hr. in a vacuum oven at about 70°C. The yield is essentially quantitative. The inherent viscosity, measured as a solution of 125 mg. of polymer in 25.0 ml. of 95–98 percent H₂SO4 (by weight) sulfuric acid, is 2.4.

Anisotropic Dope Preparation: A mixture of 5.0 g. of the above polymer and 45.0 g. of fuming (0.8 percent free SO$_3$) sulfuric acid is mixed anhydrously with a mechanically driven paddle-type stirrer in a 200 ml. round-bottom flask while cooling with an ice/water bath. The mixture is stirred overnight or until no solid particles can be visually observed, during which time the cooling bath is allowed to warm to room temperature. The resulting dope is fluid and exhibits stir-opalescence and depolarises plane polarized light.

Fiber Preparation by Wet Spinning

The spin dope prepared above is centrifuged to remove entrapped gases. It is then extruded through a 0.025 in. (0.064 cm.) thick stainless steel spinneret having 20 holes of 0.003 in. (0.0076 cm.) diameter into an aqueous coagulating bath at 27°C. The bath is about 2 in. (5.1 cm.) wide and about 1 in. (2.54 cm.) deep. After passing through the bath for about 2 ft. (0.61 m.), the yarn is snubbed out of the water at about a 45° angle on to an electrically driven wind-up device. The yarn is collected on a perforated bobbin at 35 ft./min. (10.7 m./min.). It is then washed in cool running water for several (i.e., 3 hr.) hours and dried in air at room temperature. The filaments exhibit medium crystallinity, an orientation angle of about 40° and a sonic velocity of 4.22 km./sec. as measured from a wide angle X-ray pattern. Filaments exhibit the following T/E/Mi/Den. values: 4.8/12.4/167/6.06.

Heat Treatment of Fibers

Fiber prepared in a similar manner to that of the above yarn is passed at 25 ft./min.(7.62 m./min.) through a tube [Device A] heated to 550° and collected at 28 ft./min. (8.54 m./min.). The resulting fibers exhibit high crystallinity and an orientation angle of 10° as measured from a wide angle X-ray pattern. Filaments exhibit the following T/E/Mi/Den. values: 5.4/0.9/583/6.3.

EXAMPLE 9

This example illustrates the preparation of a random terpolymer comprised of 34.3 percent by weight poly(p-phenylene 2,6naphthalamide), 28.3 percent by weight poly(p-phenylene terephthalamide), and 37.4 percent by weight poly(p-phenylene p,p'-biphenyldicarboxamide). Preparations of an anisotropic dope and of fibers of this terpolymer are shown, as well as preparation of films of the terpolymer from a hexamethylphosphoramide/N-methyl-pyrrolidone-2/lithium chloride dope.

Terpolymer Preparation 4,4'-Bibenzoyl chloride (6.98 g., 0.025 mole) is added at once to a solution of p-phenylenediamine (8.10 g., 0.075 mole) in a mixture of hexamethylphosphoramide (80 ml., distilled from CaH₂ at reduced pressure and stored over 5A molecular sieves) and N-methyl-2-pyrrolidone (80 ml., distilled from CaH₂ at reduced pressure and stored over 5A molecular sieves) contained in a 500-ml. resin-making kettle equipped with an air-driven stirrer and a calcium chloride drying tube, while cooling with a water bath at about 20°C. After mixing for 2 min., a mixture of terephthaloyl chloride (5.08 g., 0.025 mole; sublimed) and 2,6-napthaloyl chloride (6.43 g., 0.025 mole) is added at once. The mixture is stirred vigorously and after about 7 min. and unstirrable, rubber-like mass is obtained and allowed to stand overnight at room temperature. It is then combined with water and stirred at high speeds in a gallon-size (3.785 liter) blender. The solid is washed three times with water by being stirred in a blender and isolated by being filtered on a sintered-glass coarse-pore Buchner funnel. The polymer is dried overnight in a vacuum oven at about 70°C. The resulting solid (25.0 g.) is ground in a Wiley mill until it passes through a 20-mesh screen. It is then triturated with hot formic acid for about 6 hr. The acid is removed by filtering through a sintered-glass coarse-pore Buchner funnel and the polymer washed with several portions of distilled water. The polymer is then dried in a vacuum oven at about 70°C. The yield of polymer is 20.2 g. (96 percent of theoretical). The inherent viscosity, measured as a solution of 125 mg. of polymer in 25.0 ml. of 95–98 percent (by weight) sulfuric acid, is 2.88.

Film Preparation

A mixture of the above polymer (0.20 g.) and 8.0 ml. of a solvent prepared from 3.0 g. of lithium chloride, 66-2/3 ml. of hexamethylphosphoramide and 33⅓ml. of N-methyl-2-pyrrolidone, is agitated in a test-tube with a spatula at room temperature. Mixing is continued until there results a clear dope which is then spread onto a glass plate with a 0.005 in. (0.0127 cm.) knife. The plate is then submerged in cold water. As the dope is coagulated, the resulting film separates from the glass plate and is dried by pressing between absorbent paper towels at 70°C. in a vacuum oven. The dry film is clear, tough, and flexible.

Dope Preparation

A mixture of 5.0 g. of the above polymer and 45.0 g. of 99.2 percent (by weight) sulfuric acid is mixed anhydrously with a mechanically driven paddle-type stirrer in a 200-ml. round-bottom flask while cooling with an ice/water bath. The mixture is stirred overnight. The resulting dope exhibits stir-opalescence and depolarizes plane polarized light.

Fiber Preparation by Wet Spinning

The spin dope prepared above is centrifuged to remove entrapped gases. It is then extruded by means of a mechanically driven syringe through a 0.025 in (0.064 cm.) thick precious metal spinneret having 20 holes of 0.003 in. (0.076 mm.) diameter into an aqueous bath at 25°C. The bath is about 2 in. (5.1 cm.) wide and about 1 in. (2.54 cm.) deep. After passing through the bath for about 2.5 ft. (0.76 m.), the yarn is snubbed out of the water at about a 45° angle to an electrically driven wind-up device. The yarn is collected on a perforated bobbin at 45 ft./min. (13.7 m./min.). It is then washed in cool running water overnight and is dried in air at room temperature. The filaments are amorphous, and have an orientation angle of 38° as measured from a wide angle X-ray pattern. Filaments exhibit the following T/E/Mi/Den. values: 6.0/9.6/192/3.66 (10 percent rate of extension).

Heat Treatment of Fibers

The above yarn is passed at 25 ft./min. (7.63 m./min.) through a tube [Device B] heated to 400°C. and collected at 28.0 ft./min. (8.54 m./min.). The resulting fibers exhibit medium crystallinity and have an orientation angle of 14°. Filaments exhibit the following T/E/Mi/Den. values: 12.2/2.8/517/3.07; sonic velocity is 8.66 km./sec.

EXAMPLE 10

This example illustrates the preparation of copolyamide comprised of repeating units selected from the group of

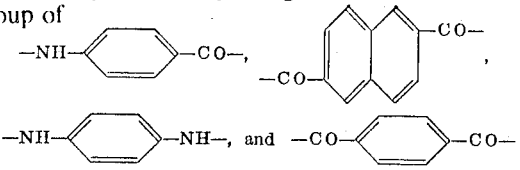

(relative molar ratio of 1:1:2:1, respectively), (2) an anisotropic dope of the copolyamide, and (3) fibers of the copolyamide. Also shown is preparation of a film of the copolyamide from a N-methylpyrrolidone-2/lithium chloride dope.

Polymer Preparation p-Aminobenzoyl chloride hydrochloride (4.8 g., 0.025 mole) is weighed into a polyethylene bag in a dry-box, i.e., a chamber maintained under anhydrous conditions. The open end of the bag is secured to a glass tube of about 3 in. (7.6 cm.) long on one end of which is a 29/26 inner joint. The bag assembly is removed from the dry-box and attached via the joint to a 500 ml. resin-making kettle equipped with a stirrer and calcium chloride drying tube. The contents of the bag are emptied as rapidly as possible into a solution of p-phenylendiamine (5.40 g., 0.050 mole) in a mixture of hexamethylphosphoramide (55 ml., distilled from $CaH_2$ at reduced pressure and stored over 5A molecular sieves) and N-methyl-2-pyrrolidone (55 ml., distilled from $CaH_2$ at reduced pressure and stored over 5A molecular sieves). After being mixed for 5 min., a mixture of powdered terephthaloyl chloride (5.08 g., 0.025 mole) and 2,6-napthaloyl chloride (6.43 g., 0.025 mole) is added at once while cooling with a 20°C. water bath. The mixture sets up to a clear, rubber-like mass in 2 min. and is allowed to stand overnight at room temperature. It is then combined with water and stirred at high speeds in a gallon-size (3.785 liter) blender. The solid is washed three times with water by being stirred in a blender and isolated by being filtered on a sintered-glass coarse-pore Buchner funnel. The solid is dried overnight in a vacuum oven at about 70°C. The resulting solid (21.0g.) is ground in a Wiley Mill until it passes through a 20 mesh screen. It is then triturated with hot formic acid for about 6 hr. The acid is removed by filtering through a sintered-glass coarse-pore Buchner funnel and the polymer washed with several portions of distilled water. The polymer is dried in a vacuum oven at about 70°C. The yield of polymer is 15.2 g. (93.7 percent of theoretical). The inherent viscosity, measured as a solution of 125 mg. of polymer in 25.0 ml. of 85–98 percent (by weight) sulfuric acid, is 3.90.

Film Preparation

A mixture of the above polymer (0.20 g.) and 8.0 ml. of a solvent, prepared from 4.0 g. lithium chloride and 96 ml. of N-methyl-2-pyrrolidone, is agitated in a test-tube with a spatula at room temperature. Mixing is continued (i.e., 24 hr.) until a clear fluid solution is obtained. The solution is then spread on to a glass plate with a 5 mil. (0.0127 cm.) knife. The plate is then submerged in cold water. As the dope is coagulated, the resulting film separates from the glass plate and is dried by being pressed between absorbent paper towels at 70°C. in a vacuum oven for about 6 hr. The dry film is clear, tough, and flexible.

Anisotropic Dope Preparation

A mixture of 5.0 g. of the above polymer and 45.0 g. of 99.2 percent (by weight) sulfuric acid is mixed anhydrously with a mechanically driven paddle-type stirrer in a 200 ml. roundbottom flask while cooling with an ice/water bath. The mixture is stirred overnight. The resulting fluid dope exhibits stir-opalesence and depolarizes polarized light.

Fiber Prepared by Wet Spinning

The spin dope prepared above is centrifuged to remove entrapped gases. It is then extruded by means of a mechanically driven syringe through a 0.025 in. (0.064 cm.) thick precious metal spinneret having 20 holes of 0.003 in. (0.0076 cm.) diameter into an aqueous bath at 25°C. The bath is about 2 in. (5.1 cm.) wide and about 1 in. (2.54 cm.) deep. After passing through the bath for about 2.5 ft. (0.76 m.), the yarn is snubbed out of the water at about a 45° angle to an electrically driven wind-up device. The yarn is collected on a perforated bobbin at 30 ft./min. (9.15 m./min.). It is then washed in cool running water overnight and a portion removed for heat-treatment, the remainder is dried on the bobbin in air at room temperature. The dry filaments are amorphous and have an orientation angle of 38° as measured from a wide agle X-ray pattern. Filaments exhibit the following T/E/Mi/Den. values: 5.5/7.8/222/5.64.

Heat Treatment of Wet Yarn

The wet (washed) yarn prepared above is passed at 25 ft./min. (7.63 m./min.) through a tube [Device B] heated to 510°C. and collected at 29 ft./min (8.84 m./min.). The fibers exhibit an orientation angle of 11°, and the following tensile properties (yarn): T/E/Mi/Den.: 8.5/2.3/480/73.8.

EXAMPLE 11

This example illustrates the preparation of copolyamide comprised of repeating units selected from the group of

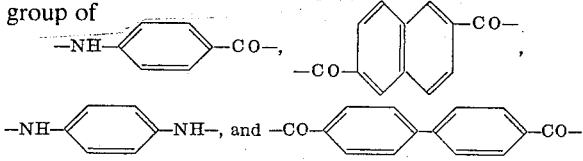

(relative molar ratio of 1:1:2:1, respectively), (2) an anisotropic dope of the copolyamide, and (3) fibers of the copolyamide. Also shown is preparation of a film of the copolyamide from a N,N-dimethylacetamide.

Terpolymer Preparation: p-Aminobenzoyl chloride hydrochloride (4.8 g., 0.025 mole) is weighed into a polyethylene bag in a dry-box, i.e., a chamber maintained under anhydrous conditions. The open end of the bag is secured to a glass tube of about 3 in. (7.6 cm.) long on one end of which is a 29/26 inner joint. The bag assembly is removed from the dry-box and attached via the joint to a 500 ml. resin-making kettle equipped with a stirrer and calcium chloride drying tube. The contents of the bag are emptied as rapidly as possible into a solution of p-phenylenediamine (5.40 g., 0.050 mole; sublimed through silica gel) in a mixture of hexamethyl phosphoramide (55 ml., distilled from $CaH_2$ at reduced pressure and stored over 5A molecular sieves) and N-methyl-2-pyrrolidone (55 ml., distilled from $CaH_2$ at reduced pressure and stored over 5A molecular sieves). After mixing for 5 min., 4,4'-bibenzoyl chloride (6.93 g., 0.025 mole) is added at once. After a further 2 min. of mixing, 2,6-napthaloyl chloride (6.43 g., 0.025 mole) is added at once while cooling with a cool (i.e., 20°C.) water bath. The mixture sets up to a clear, rubber-like mass in 7 min. and is allowed to stand overnight at room temperature. It is then combined with water and stirred at high speeds in a gallon-size (3.785 liter) blender. The solid is washed three times with water by being stirred in a blender and isolated by being filtered on a sintered-glass course-pore Buchner funnel. The polymer is dried overnight in a vacuum oven at about 70°C. The yield is 17.3 g. (94.8 percent of theoretical), $\eta_{inh} = 3.1$.

Film Preparation: A mixture of the above polymer (0.20 g.) and 8.0 ml. of a solvent prepared from 2.4 g. lithium chloride and 100 ml. of N,N-dimethylacetamide, is agitated in a test tube with a spatula at room temperature. Mixing is continued (i.e., 24 hr.) until a clear fluid solution is obtained and is then spread onto a glass plate with a 0.005 inch (0.0127 cm.) knife. The plate is then submerged in cold water. As the dope is coagulated, the resulting film separates from the glass plate and is dried by being pressed between absorbent paper towels at 70°C. in a vacuum oven. The dry film is clear, tough, and flexible.

Anisotropic Dope Preparation: A mixture of 5.0 g. of the above polymer and 45.0 g. of 99.2 percent (by weight) sulfuric acid is mixed anhydrously with a mechanically driven paddle-type stirrer in a 200 ml. round-bottom flask while cooling with an ice/water bath. The mixture is stirred overnight. The resulting dope exhibits stir-opalescence and depolarizes polarized light.

Fiber Preparation by Wet Spinning: The spin dope prepared above is centrifuged to remove entrapped gases. It is then extruded by means of a mechanically driven syringe through a 0.025 in. (0.064 cm.) thick precious metal spinneret having 20 holes of 0.003 in. (0.0076 cm.) diameter into an aqueous bath at 25°C. The bath is about 2 in. (5.1 cm.) wide and about 1 in. (2.54 cm.) deep. After passing through the bath for about 2.5 ft. (0.76 m.), the yarn is snubbed out of the water at about a 45° angle onto an electrically driven wind-up device. The yarn is collected on a perforated bobbin at 38 ft./min. (11.6 m./min.). It is then washed in cool running water overnight and is dried in air at room temperature. The filaments are amorphous and have an orientation angle of 38° as measured from a wide angle X-ray pattern. Filaments exhibit the following T/E/Mi/Den. values: 5.5/10.2/163/4.01 (10 percent rate of extension).

Heat Treatment of Fibers: The above yarn is passed at 25 ft./min. (7.62 m/min.) through a tube (Device B) heated to 400°C. and collected at 27.5 ft./min. (8.39 m/min.). The resulting fibers exhibit medium crystallinity and have an orientation angle of 15°. Filaments exhibit the following T/E/Mi/Den. values: 10.3/2.3/567/2.46.

EXAMPLE 12

This example illustrates the preparation (1) of a random copolyamide comprised of repeating units selected from the group of

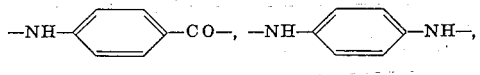

and

(relative molar ratio of 1:3:3, respectively), (2) an anisotropic oleum dope of the copolyamide, and (3) fibers of the copolyamide.

Polymer Preparation:

p-Aminobenzoyl chloride hydrochloride (4.8 g., 0.025 mole) is weighed into a polyethylene bag in a drybox, i.e., a chamber maintained under anhydrous conditions. The open end of the bag is secured to a glass tube of about 3 in. (7.61 cm.) length on one end of which is a 29/26 ₮ inner joint. The bag assembly is removed from the drybox and attached via the ₮ joint to a 500 ml. resin-making kettle equipped with a stirrer and calcium chloride drying tube. The contents of the bag are emptied as rapidly as possible into a solution of p-phenylenediamine (8.10 g., 0.075 mole; sublimed through silica gel) in a mixture of hexamethylphosphoramide (130 ml., distilled from $CaH_2$ at reduced pressure and stored over 5A molecular sieves) and N-methyl-2-pyroolidone (140 ml., distilled from $CaH_2$ at reduced pressure and stored over 5A molecular sieves). After mixing 5 min. powdered terephthaloyl chloride (15.23 g., 0.075 mole) is added at once with vigorous stirring. The temperature of the reaction mixture is moderated with a cool (i.e., 20°C.) water bath. The mixture becomes a rubber-like mass in 5 min. and is allowed to stand overnight at room temperature. The mixture is then combined with water and stirred at high speeds in a gallon-size (3.785 liter) blender. The solid is washed three times with water by being stirred in a blender and isolated by being filtered on a sintered-glass coarse-pore Buchner funnel. The solid is dried overnight in a vacuum oven at about 70°C. The resulting solid yellow beads (25.6 g.) are ground in a Wiley mill until they pass through a 20-mesh screen. They are then triturated in hot 98 percent formic acid for several hours. The acid is removed by filtering and the solid washed with several portions of water and then dried overnight at about 70°C. in a vacuum oven. The yield of polymer is 19.0 g. (91 percent of theoretical). The inherent viscosity, measured as a solution of 125 mg. of polymer in 25.0 ml. of 95–98 percent (by weight) sulfuric acid, is 6.22.

Dope Preparation:

A mixture of 7.5 g. of the above polymer and 67.5 g. of fuming (0.8 percent free $SO_3$) sulfuric acid is mixed anhydrously with a mechanically driven paddel-type stirrer in a 200 ml. round-bottom flask while cooling with an ice/water bath. The mixture is stirred for several hours until no solid particles can be visually observed, during which time the cooling bath is allowed to warm to room temperature. The resulting dope exhibits stir-opalescene and depolarizes plane polarized light.

Fiber Preparation by Wet spinning:

The spin dope prepared as above is centrifuged to remove entrapped gases. It is then extruded by means of a mechanically driven syringe through a 0.025 inch (0.064 cm.) thick precious metal spinneret having 20 holes of 0.002 inch (0.005 cm.) diameter into a water coagulating bath at 27°C. The water bath is about 2 in. (5.1 cm.) wide and about 1 in. (2.54 cm.) deep. After passing through the bath for about 2 ft. (0.61 m.), the yarn is snubbed out of the water at about a 45° angle to an electrically driven wind-up device. The yarn is collected on a perforated bobbin at 31 ft./min. (9.45 m./min.). It is then washed in cool running water for several (i.e., 3 hr.) hours and a portion dried in air on a bobbin at room temperature. The dry filaments exhibit low crystallinity and an orientation angle of 28° as measured from a wide angle X-ray pattern. Filaments exhibit the following T/E/Mi/Den. values: 9.2/10.1/268/3.41.

Heat Treatment of Wet Fibers:

The above wet (washed) yarn is passed at 25 ft./min. through a tube (Device B) heated to 610°C. and collected at 26.5 ft./min. (8.1 m./min.). The resulting fibers exhibit high crystallinity and an orientation angle of 10° as measured from a wide angle X-ray pattern. Filaments exhibit the following T/E/Mi/Den values: 20.1/2.0/1069/2.78.

EXAMPLE 13

This example illustrates the preparation (1) of a random copolyamide comprised of repeating units selected from the group of

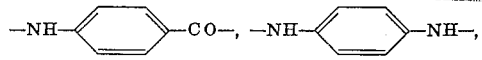

and

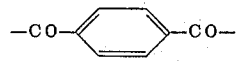

(relative molar ratio of 1:1:1, respectively), (2) an anisotropic oleum dope of the copolyamide, and (3) fibers of the copolyamide.

Polymer Preparation:

p-Aminobenzoyl chloride hydrochloride (14.4 g., 0.075 mole) is weighed into a polyethylene bag in a drybox, i.e., a chamber maintained under anhydrous conditions. The open end of the bag is secured to a glass tube of about 3 in. (7.6 cm.) length and 1 in. (2.54 cm.) inner diameter on one end of which is a 29/26 ⊤ inner joint. The bag assembly is removed from the drybox and attached via the ⊤ joint to a one-liter resin-making kettle equipped with a stirrer and calcium chloride drying tube, and cooled with an ice/water bath. The contents of the bag are emptied as rapidly as possible (generally, within 3 minutes) into a solution of p-phenylenediamine (8.10 g., 0.075 mole; sublimed through silica gel) in a mixture of hexamethylphosphoramide (160 ml., distilled from $CaH_2$ at reduced pressure and stored over 5A molecular sieves) and N-methyl-2-pyrrolidone (100 ml., distilled from $CaH_2$ at reduced pressure and stored over 5A molecular sieves). After the above ingredients are mixed for five minutes, powdered terephthaloyl chloride (15.23 g., 0.075 mole) is added at once with vigorous stirring and continued cooling with an ice/water bath. A clear gel is obtained after about 20 min. and is allowed to stand overnight at room temperature. The clear gel is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The resulting yellow beads (37.1 g.) are triturated with hot 98 percent formic acid for several hours. The acid is removed by filtering through a sintered-glass coarse-pore Buchner funnel. The polymer is washed twice with water in a blender as described above and finally with acetone. It is dried in a vacuum oven overnight at about 70°C. The yield of polymer is 24.0 g. (90.8 percent). The inherent viscosity, measured as a solution of 125 mg. polymer in 25.0 ml. of 95–98 percent (by weight) sulfuric acid, is 3.73.

Dope Preparation:

A mixture of 5.0 g. of the above polymer and 45.0 g. of fuming (0.8 percent free $SO_3$) sulfuric acid is mixed anhydrously with a mechanically driven paddle-type stirrer in a 200 ml. round bottom flask while cooling with an ice/water bath. The mixture is allowed to stir for several hours at which time no solid particles can be observed. The resulting dope exhibits stir-opalescence and depolarizes plane polarized light.

Fiber Preparation by Wet Spinning:

The spin dope prepared as above is centrifuged to remove entrapped gases. It is then extruded by means of a mechanically driven syringe through a 0.010 in. (0.025 cm.) thick stainless steel spinneret having 20 holes of 0.003 inch (0.0076 cm.) diameter into a water bath at 27°C. The water bath is about 2 in. (5.1 cm.) wide and about 1 in. (2.54 cm.) deep. After passing through the bath for about 2 ft. (0.61 m.), the yarn is snubbed out of the water at about a 45° angle to an electrically driven windup device. The yarn is collected on a perforated bobbin at 42 ft./min. (12.8 m./min.). It is then washed in cool running water for several (i.e., 3 hr.) hours and dried in air at room temperature. The filaments exhibit low crystallinity, an orientation angle of 32° and a sonic velocity of 4.72 km./sec. Filaments exhibit the following T/E/Mi/Den. values: 8.6/10.8/205/5.89.

Heat Treatment of Fibers:

The yarn prepared as above is passed at 25 ft./min (7.63 m./min.) through a tube (Device A) heated to 600°C. and collected at 27 ft./min. (8.24 m./min.). The resulting filaments exhibit high crystallinity and an orientation angle of 10°. a sonic velocity of 9.29 kg./sec. and exhibit the following T/E/Mi/Den. values: 10.7/1.2/821/5.39.

Film:

The above polymer (0.20 g.) is placed in a test tube with 4.0 ml. of a solvent, prepared by dissolving 3.0 g. of lithium chloride in a mixture of 66 2/3 ml. of hexamethylphosphoramide and 33 ⅓ ml. of N-methyl-2-pyrrolidone, the mixture is agitated with a spatula at room temperature until a fluid clear solution is obtained. More solvent (4.0 ml.) is added and the resulting clear solution spread out on the surface of a glass plate with a 0.005 inch (0.0127 cm.) knife. The plate is then placed in cold water. As the dope is coagulated, the resulting film separates from the glass plate and is dried by being pressed between absorbent paper towels at 70°C. in a vacuum oven. The dry film is tough and has a slight haze.

EXAMPLE 14

This example illustrates the preparation (1) of a random copolyamide comprised of repeating units selected from the group of

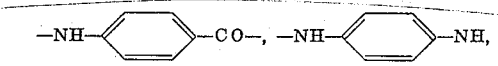

and

(relative molar ratio of 3:1:1, respectively), (2) an anisotropic dope of the copolyamide, and (3) fibers of the copolyamide.

Polymer Preparation:

p-Aminobenzoyl chloride hydrochloride (57.6 g., 0.30 mole) is weighed into a polyethylene bag in a drybox, i.e., a chamber maintained under anhydrous conditions. The open end of the bag is secured to a glass tube of about 3 in. (7.6 cm.) length on one end of which is a 29/26 ⊤ inner joint. The bag assembly is removed from the drybox and attached via the T joint to a one-liter resin-making kettle equipped with a stirrer and calcium chloride drying tube. The contents of the bag are emptied as rapidly as possible into a solution of p-phenylenediamine (10.8 g., 0.10 mole; sublimed through silica gel) in a mixture of hexamethylphosphoramide (260 ml., distilled from $CaH_2$ at reduced pressure and stored over 5A molecular sieves) and N-methyl-2-pyrrolidone (280 ml., distilled from $CaH_2$ at reduced pressure and stored over 5A molecular sieves). After mixing three minutes powdered terephthaloyl chloride (20.30 g., 0.10 mole; sublimed) is added with vigorous stirring. The temperature of the mixture is moderated with a water bath at room temperature. The mixture rapidly becomes viscous and a solid mass is obtained within about 10 minutes. This solid mass is allowed to stand for two days. The solid mass is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The yield of polymer is 58.0 g. (97.5 percent of theoretical). The inherent viscosity, measured as a solution of 125 mg. polymer in 25.0 ml. of 95–98 percent (by weight) sulfuric acid, is 3.77.

Dope Preparation:

A mixture of 40.0 g. of the above polymer and 360 g. of 99.5 percent (by weight) sulfuric acid is mixed anhydrously with a mechanically driven stainless steel stirrer in a 500 ml. resin-making kettle while cooling with an ice/water bath. The mixture is stirred overnight during which time the cooling bath is allowed to warm to room temperature. The resulting dope exhibits stir-opalescence and depolarizes plane polarized light.

Fiber Preparation by Wet Spinning:

The spin dope prepared above is centrifuged to remove entrapped gases and any solid particles. It is then extruded at the rate of about 0.8 ml./min. under a pressure of 380 lb./in.$^2$ (26.6 kg./cm.$^2$) through a 0.025 in. (0.064 cm.) thick precious metal spinneret having 20 holes of 0.002 inch (0.005 cm.) diameter into an aqueous bath maintained at 16°C. The bath is about 16 in. (40 cm.) wide, 5.5 in. (14 cm.) deep and 37 in. (94 cm.) long with stainless steel rollers placed about 2 ft. (0.61 m.) apart. The yarn is drawn through the bath and around the rollers such that it makes three passes through the water bath. It is then snubbed by means of a pig-tail guide at about a 45° angle to an electrically driven wind-up device. The arm is collected on a perforated bobbin at 33 ft./min. (10.1 m./min.). It is then washed in cool running water for several hours (i.e. 3 hr.) and dried in air at room temperature. The filaments exhibit medium crystallinity and an orientation angle of 28°. Filaments exhibit the following T/E/Mi/Den. values: 10.2/7.8/264/2.13.

Heat Treatment of Fibers:

The yarn prepared as above is passed at 25 ft./min. (7.6 m./min.) through a tube (Device B) heated to 586° and wound up at 25.8 ft./min. (7.86 m./min.). The resulting fibers exhibit high crystallinity, an orientation angle of 10° and a sonic velocity of 11.51 km./sec. Filaments exhibit the following T/E/Mi/Den. values: 15.6/1.8/838/2.00.

EXAMPLES 15–17

The following three examples illustrate the preparation of anisotropic oleum dopes comprising mixtures of poly(p-benzamide) and poly(p-phenylene terephthalamide) and the preparation of fibers from these dopes. Preparations of poly(p-benzamide) and poly(p-benzamide) and poly(p-phenylene terephthalamide) are separately shown.

Poly(p-benzamide) Preparation:

p-Aminobenzoyl chloride hydrochloride (120 g., 0.625 mole) is weighed into a polyethylene bag in a drybox, i.e., a chamber maintained under anhydrous conditions. The open end of the bag is secured to a glass tube of about 3 in. (7.6 cm.) in length on one end of which is a 29/26 T inner joint. The bag assembly is removed from the drybox and attached via the T joint to a one-liter resin-making kettle equipped with an air driven stirrer and calcium chloride drying tube. The contents of the bag are emptied as rapidly as possible into a mixture of hexamethylphosphoramide (360 ml., distilled from $CaH_2$ at reduced pressure and stored over 5A molecular sieves) and N-methyl-2-pyrrolidone (180 ml., distilled from $CaH_2$ at reduced pressure and stored over 5A molecular sieves) with vigorous stirring and cooling with an ice/water bath. The mixture becomes solid mass in 13 min. It is allowed to stand overnight at room temperature.

The solid mass is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The yield of polymer is 70.0 g. (94.3 percent of theoretical). The inherent viscosity, measured as a solution of 125 mg. polymer in 25.0 ml. of 95–98 percent (by weight) sulfuric acid is 2.83.

Poly(p-phenylene Terephthalamide) Preparation:

Powdered terephthaloyl chloride (20.31 g., 0.10 mole) is added to a solution of p-phenylenediamine (10.80 g., 0.10 mole) and N-methyl-2-pyrrolidone (60 ml.) and stirred at high speeds in a one-quart blender. A stiff mass is obtained within minutes. After 20 min. the mass is combined with water and stirred at high speeds in a quart-size (0.946 liter) blender. The polymer is washed four times with water, once with alcohol, and finally with acetone by being stirred in a blender and is isolated by being filtered. The polymer is dried overnight in a vacuum oven at about 100°C. The yield of polymer is 23.0 g. (96.7 percent of theoretical). The inherent viscosity, measured as a solution of 125 mg. polymer in 25.0 ml. of 95–98 percent (by weight) sulfuric acid, is 3.67.

Anisotropic Dope Preparation:

Poly-1,4-benzamide and poly(p-phenylene terephthalamide), prepared as above, in the quantities listed in Table I are mixed together with 45.0 g. of fuming (0.8 percent free $SO_3$) sulfuric acid in a 200 ml. round-bottom flask equipped with a mechanically driven paddle-type stirrer while cooling with an ice/water bath. The mixture is stirred overnight during which time the cooling bath is allowed to warm to room temperature. The dopes are fluid and exhibit stir-opalescence.

TABLE I — DOPES

| Dope: Example | Poly(p-benzamide) | Poly(p-phenylene terephthalamide) |
|---|---|---|
| 15 | 2.5 g. | 2.5 g. |
| 16 | 1.25 g. | 3.75 g. |
| 17 | 3.75 g. | 1.25 g. |

Fiber Preparation by Wet Spinning:

Each spin dope, prepared as above, is centrifuged to remove entrapped gases and is then extruded by means of a mechanically driven piston through a 0.025 in. (0.064 cm.) thick precious metal spinneret having 20 holes of 0.003 inch (0.0076 cm.) diameter into a coagulating water bath at 25°C. The water bath is about 2 in. (5.1 cm.) wide and about 1 in. (2.54 cm.) deep. After passing through the bath for about 2.5 ft. (0.76 m.) the yarn is snubbed out of the water at about a 45° angle to an electrically driven wind-up device. The yarn is collected on a perforated bobbin at the rate listed in Table II. It is then washed in cool running water for several (i.e., 3 hrs.) hours and a portion removed for heat treatment. The remainder is dried in air at room temperature. The filaments exhibit the orientation angles (O.A) and T/E/Mi/Den. values listed in Table II (all at 10 percent rate of extension).

TABLE II — AS-EXTRUDED FIBER

| Dope Example | Fiber Collection Rate | Fiber Properties | | | | |
|---|---|---|---|---|---|---|
| | | T | E | Mi | Den. | O.A. |
| | ft./min. | | | | | |
| 15 | 30 | 5.8 | 9.6 | 165 | 4.98 | 28° |
| 16 | 35 | 7.1 | 10.0 | 220 | 4.11 | 25° |
| 17 | 35 | 4.8 | 10.8 | 161 | 5.42 | 31° |

Heat Treatment of Wet Fibers:

The above wet as-extruded (washed) yarn is passed at 25 ft./min. (7.64 m./min.) through a tube (Device B) heated to 640° and collected at the rates tabulated in Table III. The resulting fibers exhibit orientation angles and T/E/Mi/Den. values as tabulated in Table III. The dry yarn spun from dope 15 (Table II) is passed at 25 ft./min. (7.63 m./min.) through the nitrogen filled tube assembly heated to 600° and collected at 26.5 ft./min. (8.1 m./min.). The resulting fibers exhibit high crystallinity and an orientation angle of 12° as measured from a wide angle X-ray pattern. Filaments exhibit the following T/E/$M_i$/Den. values: 11.8/1.3/889/4.80.

TABLE III — HEAT TREATED FIBER

| Fiber From Dope | Fiber Collection Rate | Fiber Properties | | | | |
|---|---|---|---|---|---|---|
| | | T | E | Mi | O.A. | Den. |
| | ft./min. | | | | | |
| 15 | 28.5 | 15.9 | 1.8 | 946 | 8° | 5.98 |
| 16 | 27.0 | 14.3 | 1.4 | 1056 | 9° | 3.58 |
| 17 | 27.5 | 10.2 | 1.4 | 805 | 10° | 3.76 |

EXAMPLE 18

This example illustrates the preparation of (1) a random copolyamide comprised of repeating units selected from the group of

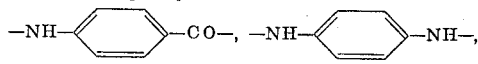

and

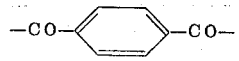

(relative molar ratio of 9:1:1, respectively), (2) an anisotropic urea dope of the copolyamide, and (3) fibers of the copolyamide.

Polymer Preparation:

A 1-liter resin-making kettle equipped with an air-driven Carpenter 20 stainless steel shear-disc stirrer, nitrogen-inlet tube and calcium chloride drying tube is flamed with a Bunsen burner and simultaneously flushed with nitrogen. The kettle is sealed and placed in a dry-box, i.e., a chamber maintained under anhydrous conditions. Tetramethylurea (352 ml.) is poured in the dry-box into an Erlenmeyer flask which is then sealed and cooled in ice. p-Phenylenediamine (3.888 g., 0.036 mole) and terephthaloyl chloride (7.308 g., 0.036 mole) are weighed in the drybox, ground together with a pestle in a mortar and transferred to an Erlenmeyer flask which is then sealed. p-Aminobenzoyl chloride hydrochloride (62.200 g., 0.324 mole) is weighed out in the dry-box and transferred to the "resin kettle". The kettle is removed from the dry-box, reconnected with the stirring motor and nitrogen line, and cooled in an ice-bath.

Tetramethylurea is poured rapidly into the p-aminobenzoyl chloride hydrochloride which is being stirred at high speed. Immediately, the mixture of p-phenylenediamine and terephthaloyl chloride is added to the above reaction solution. The latter is stirred 15 min. with cooling in an ice-bath for 2.25 hour at about 25°C. The solution is combined with water in a blender, stirred at high speed for 5 min., and the resulting precipitate is filtered. The precipitate is washed three times with water and once with alcohol by stirring in a blender (3–5 min.). It is filtered after each wash on a sintered-glass medium-pore Buchner funnel. The product is dried for 16 hr. at 90°C. in a vacuum oven with a nitrogen bleed. The yield of polymer is 99.6 percent and the $\eta_{inh} = 1.40$.

Dope Preparation:

Into a 500 ml. resin-making kettle equipped with an air-driven shear-disc stirrer, condenser, and calcium chloride drying-tube are placed 30 g. of the above polymer and 270 g. of tetramethylurea/lithium chloride solution containing 6.54 percent by weight of the salt. The resulting mixture is cooled for 2 hr. in solid carbon dioxide and is then stirred at 125°C. (oil bath temperature) for 2 hr. At 45 min. liquification begins. The mixture is cooled for 2 hr. in solid carbon dioxide and then stirred at 125°C. (oil-bath temperature) for 15 hr. The forming dope is again cooled for 2 hr. in solid carbon dioxide and then stirred at 130°C. (oil-bath temperature) for 5 hr. and at 120°C. (oil bath temperature) for 15 hr. Sufficient tetramethylurea is evaporated to make a spinning dope with 13 percent solids by weight. The dope as a thin layer depolarizes plane polarized light.

Fiber Preparation by Dry Spinning:

The dope prepared as above is heated to about 110°C. and extruded at a rate of about 2.34 ml./min. under a pressure of 80–85 lb./in.$^2$ (5625–5976 g./cm.$^2$), through a heated (125°C.) protrusion-type spinneret having 6 holes of 0.004 inch (0.01 cm.) diameter, into a drying column whose walls are kept within the range of 198–207°C. The column is swept with a cocurrent flow (4 3/4 ft.$^3$/min.; 0.1344 m.$^3$/min.) of dry nitrogen which enters the column at 235°C. The emerging filaments are passed over a small guide roll bearing a finish solution and are wound up on a bobbin at the rate of 152 yd./min. (139 m./min.). This constitutes a spin stretch factor of 2.91. These opaque extruded filaments become lustrous upon being soaked in changes of water (25°C.) to remove residual solvent and salt. The inherent viscosity of the polymer in the filaments is 1.48. The water-leached, air-dried (70°F. 65 percent R.H.) filaments exhibit medium crystallinity and an orientation angle of 27°. Filaments that have been boiled-off display the following $T/E/M_i/Den.$ values: 8.5/2.8/443/3.01.

Heat Treatment of Fibers:

The filaments prepared above are passed taut over a 3-inch (7.62 cm.) plate maintained at 530°C. under a cover of nitrogen in a single stage operation so as to increase their length by 0–1 percent. Residence time over the hot plate is about 2 seconds. The resulting fibers exhibit high crystallinity and have an orientation angle of 12°. Filaments have the following $T/E/M_i/Den.$ properties (boiled-off fiber): 12.9/1.4/915/2.94.

EXAMPLE 19

This example is similar to Example 18, except that the cited repeating units of the copolyamide are in the molar ratio of 2:1:1, respectively, with stated differences in equipment and procedure.

Polymer Preparation:

The equipment and procedure are the same as described in Example 18 with the following exceptions The intermediates are p-phenylenediamine (8.110 g., 0.075 mole), terephthaloyl chloride (15.227 g., 0.075 mole), p-aminobenzoyl chloride hydrochloride (28.805 g., 0.150 mole) and hexamethylphosphoramide (300 ml.).

The reaction solution is stirred for 0.5 hr. at approximately 0°C. and 1.5 hr. at about 25°C.

The yield of polymer is 99.4 percent and the $\nu_{inh} = 1.16$.

Dope Preparation:

Into a 500-ml. resin-making kettle equipped with an air-driven shear-disc stirrer, condenser and calcium chloride drying tube are placed 30 g. of the above polymer and 270 g. of tetramethylurea/lithium chloride solution containing 6.54 percent by weight of the salt. Repeated cooling in solid carbon dioxide and stirring at 125°C. (oil bath temperature) does not bring about complete disintegration of solid material but an additional two coolings in solid carbon dioxide for 3 hr. and stirrings at 100°C. for 4 hr. yields a dope which contains 10 percent polymer by weight.

Fiber Preparation by Dry-spinning:

The dope prepared as above is heated to 90°C. and extruded at the rate of about 3.5 ml./min. under a pressure of 140 lb./in.² (9843 g./cm.²) through a heated (116°C.) spinneret having 9 holes of 0.005 inch (0.0127 cm.) diameter, each, into a drying column whose walls are kept within the range of 197–207°C. The column is swept with a cocurrent flow (4.5 ft.³/min., 0.1274 m.³/min.) of dry nitrogen which enters the column at 264°C. The emerging filaments are passed over a small guide roll bearing a finish solution and are wound up on a bobbin at the rate of 152 yd./min. (139 m./min.). This constitutes a spin stretch factor of 4.6. These extruded filaments are soaked in changes of water (25°C.) to remove residual solvent and salt. The water-leached, air-dried (70°F., 65 percent R.H.) filaments exhibit medium crystallinity and an orientation angle of 35°. Filaments that have been boiled-off display the following $T/E/M_i/Den.$ values: 3.4/2.5/216/3.34.

Heat Treatment of Fibers:

The equipment and procedure are the same as described in Example 18. The resulting fibers exhibit high crystallinity and have an orientation angle of 15°. Filaments have the following $T/E/M_i/Den.$ properties (boiled-off fiber): 7.2/0.7/886/1.68.

EXAMPLE 20

This example illustrates the preparation of (1) copoly(p-phenylene p,p'-biphenyldicarboxamide/isophthalamide) 90/10), (2) an anisotropic oleum dope thereof, and (3) fibers thereof.

Polymer Preparation:

A 500 ml. resin-making kettle equipped with a stainless steel egg-beater type stirrer, nitrogen-inlet tube and calcium chloride drying tube is flamed with a Bunsen burner and simultaneously flushed with nitrogen. The kettle is sealed and placed in dry-box. p-Phenylenediamine (9.733 g., 0.09 m.) is weighed in the dry-box and placed in the resin kettle. Hexamethylphosphoramide (192 ml.) and N- methyl-2-pyrrolidone (48 ml.) are measured in the dry-box and poured into the kettle. The kettle is removed from the dry-box, reconnected with the stirring motor and nitrogen line. The mixture is stirred until solution of the diamine occurs and then the kettle is cooled in an ice-bath.

Isophthaloyl chloride (1.827 g., 0.009 mole) and 4,4'-dibenzoyl chloride (22.609 g., 0.081 mole) are weighed in the dry-box, combined and added at once to the diamine solution. Rapid stirring and ice-cooling are continued for 2 hr. About this time the reaction mixture sets up into a galatinous mass which is no longer stirrable. The latter is allowed to stand at about 25°C. for about 64 hr. The gelatinous mass is combined with water in a blender, the mixture stirred at high speed, and the resulting precipitate is filtered on a sintered-glass medium-pore Buchner funnel. The precipitate is washed three times with water and twice with alcohol by stirring in a blender and filtering after each wash. The product is dried 16 hr. at 80°C. in a vacuum oven with a nitrogen bleed. The yield of polymer is about 100 percent and the $\eta_{inh} = 2.51$.

Dope Preparation:

In a centrifuge bottle equipped with a stirrer are combined 25.812 g. of the above polymer and 146.27 g. of 100.72 percent sulfuric acid (3.2 percent free $SO_3$). The mixture is stirred at about 25°C. to form an anisotropic dope containing 15 percent by weight of the copolymer. The DDA value of a 15 percent by weight dope in 100.81 percent sulfuric acid is 98.2.

Fiber Preparation by Wet-Spinning:

The dope, at 25°C. and prepared as above, is placed in a Carpenter 20 stainless steel cell and extruded through a spinneret with 20 holes of 0.003 inch (0.076 mm.) diameter into 10 percent sulfuric acid (by weight) at 25°C. The coagulated filaments are wound up on a bobbin, with water dripping over it, at a rate of 43 ft./min. (13 m./min.). These filaments are soaked in changes of water (25°C.) until the latter is no longer acidic. The water-leached, air-dried (70°F., 65 percent R.H.) filaments exhibit low crystallinity with an orientation angle of 28° and a sonic velocity of 6.10 km./sec. Filaments (as is) have the following $T/E/M_i/Den.$ values: 5.2/4.7/273/10.72.

Heat Treatment of Fibers: The dry fibers prepared above are passed through a tube at 600°C. at a rate of 25 ft./min. (7.62 m./min.) (Device A). The fibers which are drawn 1.04X exhibit high crystallinity and have an orientation angle of 12°. Filaments have the following T/E/M$_i$/Den. properties (boiled-off fiber): 8.8/1.4/706/12.26.

EXAMPLE 21

This example illustrates the preparation of (1) a random copolyamide comprised of repeating units selected from the group of

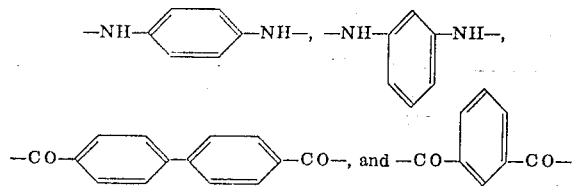

relative ratio of 95:5:95:5, respectively), (2) an anisotropic oleum dope of the copolyamide, and (3) fibers of the copolyamide.

Polymer Preparation:

A 500-ml. resin-making kettle equipped with a stainless steel egg-beater type stirrer, nitrogen-inlet tube, and calcium chloride drying tube is flamed with a Bunsen burner and simultaneously flushed with nitrogen. The kettle is sealed and placed in a dry-box. p-Phenylenediamine (9.246 g., 0.0855 mole) and m-phenylenediamine (0.487 g., 0.0045 mole) are weighed in the dry-box and placed in the resin kettle. Hexamethylphosphoramide (192 ml.) and N-methyl-2-pyrrolidone (48 ml.) are measured in the dry-box and poured into the kettle. The kettle is removed from the dry-box and reconnected with the stirring motor and nitrogen line. When solution of the diamines occurs, the kettle is cooled in an ice-bath.

Isophthaloyl chloride (0.914 g., 0.0045 mole) and 4,4'-dibenzoyl chloride (23.865 g., 0.0855 mole) are weighed in the dry-box, combined and added at once to the above solution which is being rapidly stirred. The reaction is stirred for 18 hr. with cooling. The viscous gel is combined with water, stirred in a blender and the precipitate is filtered. The precipitate is washed three times with water and once with alcohol by stirring in a blender and filtering. The product is dried 16 hr. at 80°C. in a vacuum oven with a nitrogen bleed. The yield is 100 percent and the $\eta_{inh} = 2.79$.

Dope Preparation:

In a centrifuge bottle equipped with a stirrer are combined 28.41 g. of the above polymer and 161.0 g. of 100.72 percent sulfuric acid (3.2 percent free SO$_3$). The mixture is stirred at about 25°C. until a smooth anisotropic dope (contains 15 percent by weight copolymer) is formed. The DDA value of a 15 percent by weight dope in 100.81 percent sulfuric acid is 95.4.

Fiber Preparation by Wet-Spinning:

The above anisotropic dope is placed in a Carpenter 20 stainless steel cell and is extruded through a spinneret with 20 holes of 0.003 inch (0.076 mm.) diameter into 10 percent sulfuric acid (by weight) at about 19.5°C. The coagulated filaments pass over a guide onto a wind-up bobbin immersed in water at a rate of 37.5 ft./min. (11.4 m./min.). These filaments are soaked in changes of water (25°C.) until the latter is no longer acidic. The water-leached, air-dried (70°F., 65 percent R.H.) filaments exhibit low crystallinity with an orientation angle of 27°. and a sonic velocity of 5.97 km./sec. Filaments (as is) have the following. T/E/Mi/Den. values: 5.6/5.3/297/8.98.

Heat Treatment of Fibers

Dry and wet fibers (never allowed to dry) are passed through a tube at 600°C. at a rate of 25 ft./min. (7.62 m./min.) (Device A). Wet fibers which are drawn 1.04X exhibit high crystallinity and an orientation angle of 9°. The filaments (as is) have T/E/M$_i$/Den. values = 12.3/1.6/837/7.997. Dry fibers which are drawn 1.04X have high crystallinity and an orientation angle of 9° and a sonic velocity of 8.84 km./sec. The filaments (as is) have the following T/E/Mi/Den. values: 12.8/1.8/817/7.95.

EXAMPLE 22

This example illustrates the preparation of (1) a random copolyamide comprised of repeating units selected from the group of

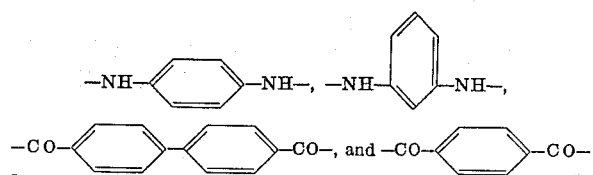

(relative molar ratio of 9:1:9:1, respectively), (2) an anisotropic oleum dope of the copolyamide, and (3) fibers of the copolyamide.

Polymer Preparation:

The equipment and procedure are the same as described in Example 21 with the following exceptions The intermediates are p-phenylenediamine (8.760 g., 0.081 mole), m-phenylenediamine (0.973 g., 0.009 mole), hexamethylphosphoramide (192 ml.), N-methyl-2-pyrrolidone (48 ml.), terephthaloyl chloride (1.827 g., 0.009 mole) and 4,4'-dibenzoyl chloride (22.609 g., 0.081 mole).

The polymerization mixture is stirred for 2 hr. and cooled in an ice-bath. The polymer system gradually forms a viscous, non-stirrable gel. This mass is allowed to stand for 16 hr.

The product is dried 16 hr. at 90°C. in a vacuum oven with a nitrogen bleed. The yield is 100 percent and the $\eta_{inh} = 2.26$.

Dope Preparation:

In a centrifuge bottle equipped with a stirrer are combined 27.864 g. of the above polymer and 157.90 g. of 100.72 percent sulfuric acid (3.2 percent free SO$_3$). This mixture is stirred at about 25°C. for 8 hr. to form an anisotropic dope containing 15 percent by weight copolymer. The DDA value of a 15 percent by weight dope in 100.81 percent sulfuric acid is 52.3.

Fiber Preparation by Wet-Spinning:

The above anisotropic dope, at about 25°C., is placed in a Carpenter 20 spinning cell and is extruded through a spinneret containing 20 holes of 0.003 inch (0.076 mm.) diameter into 10 sulfuric acid (by weight) at 23°C. The fibers are passed over a guide onto a wind-up bobbin (with water dripping over it) at a rate of 46 ft./min.(14 m./min.). The extruded filaments are soaked in changes of water (25°C.) until the latter is no longer acidic. The water-leached, air-dried (70°F., 65 percent R.H.) filaments exhibit trace crystallinity with an orientation angle of about 36° and a sonic velocity of 5.59 km.sec. Filaments (as is) have the following T/E/Mi/Den. values: 5.8/7.2/236/12.00 (60 percent rate of extension).

Heat Treatment of Fibers: The dry filaments prepared above are passed at 25 ft./min. (7.62 m./min.) through a tube at 600°C. (Device A). Fibers drawn 1.04X exhibit medium crystallinity, an orientation angle of 14° and a sonic velocity of 7.81 km./sec. Filaments have the following T/E/Mi/Den. properties (as is fiber): 10.3/2.2/596/8.85.

EXAMPLE 23

This example illustrates the preparation of (1) copoly(p-phenylene p,p'-biphenyldicarboxamide/terephthalamide) (75/25 in Part A, 60/40 in Part B), (2) anisotropic oleum dopes thereof, and (3) fibers thereof.

PART A

Polymer Preparation: A 1-liter resin-making kettle equipped with a stainless steel egg-beater type stirrer, nitrogen-inlet tube, and calcium chloride drying-tube is flamed with a Bunsen burner and simultaneously flushed with nitrogen. The kettle is sealed and placed in a dry-box. p-Phenylenediamine (8.652 g., 0.08 mole) is weighed in the dry-box and placed in the resin kettle. Hexamethylphosphoramide (171 ml.) and N-methyl-2-pyrrolidone (43 ml.) are measured in the dry-box, reconnected with the stirring motor and nitrogen line. When solution of the diamine has occurred, the kettle is cooled in an ice-bath.

4,4'-Dibenzoyl chloride (16.7473 g., 0.06 mole) and terephthaloyl chloride (4.0604 g., 0.02 mole) (both finely ground) are weighed in the dry-box, combined, and added at once to the rapidly stirring diamine solution. The reaction mixture is stirred and cooled with an ice-bath for 1 hr. It sets up into a viscous gel. It is stirred 16 hr. at 25°C. The gel is combined with water, stirred in a blender, and the resulting precipitate is filtered. The product is washed three times with water and once with alcohol by stirring in a blender and then filtering. It is dried 16 hr. at 80°c. in a vacuum oven with a nitrogen bleed. The yield is 100 percent and $\eta_{inh}$ = 4.17, 4.13.

Dope Preparation:

In a centrifuge bottle equipped with a stirrer, are combined 169.3 g. of 100.70 percent sulfuric acid (3.1 percent free $SO_3$) and 22.0 g. of the above polymer. This mixture is stirred at about 25°C. until a smooth anisotropic dope, containing 11.5 percent by weight polymer, forms. The DDA values of an 11.5 percent (weight) dope in 100.81 percent sulfuric acid is 97.2.

Fiber Preparation by Wet Spinning:

The above anisotropic solution is placed in a Carpenter 20 stainless steel spinning cell and extruded through a spinneret containing 20 holes of 0.003 inch (0.076 mm.) diameter into 10 percent sulfuric acid (by weight) at 25°C. The filaments pass over a guide and to a wind-up bobbin at a rate of 67 ft./min. (20.4 m./min.). These extruded filaments are soaked in changes of water (25°C.) until the latter is no longer acidic. The water-leached, air-dried (70°F., 65 percent R.H.) filaments exhibit trace crystallinity with an orientation angle of 31° and a sonic velocity of 5.14 km./sec. Filaments (boiled off sample) have the following T/E/Mi/Den. values: 7.8/6.6/239/10.10.

Heat Treatment of Fibers:

Wet fibers (never dried) are passed at 25 ft./min. (7.62 m./min.) through a tube with the center at 600°C. (Device A). Wet fibers which are drawn 1.07X display high crystallinity with an orientation angle of 11° and a sonic velocity of 8.95 km./sec. The filaments (as is) have the following T/E/Mi/Den. values: 17.5/2.2/744/7.57.

PART B

Polymer Preparation:

The equipment and procedure are the same as described in Part A with the following exceptions The resin-making kettle is the 500 ml. size.

A shear disc stirrer is used.

The intermediates are p-phenylenediamine (4.866 g., 0.045 mole), hexamethylphosphoramide (75 ml.), N-methyl-2-pyrrolidone (75 ml.), 4,4'-dibenzoyl chloride (7.536 g., 0.0270 mole) and terephthaloyl chloride (3.654 g., 0.0180 mole).

The reaction solution is stirred and cooled for 2 hrs. with an ice-bath.

The polymer is dried 18 hours at 80°C. in a vacuum oven with a nitrogen bleed.

The yield is 100 percent and $\eta$inh (0.1 percent conc.) = 5.71.

The dried polymer is stirred and soaked in a 5 percent sodium bicarbonate solution. It is washed with water and dried 16 hours at 80°C. in a vacuum oven with a nitrogen bleed.

The $\eta$inh (0.1 g. of polymer in 100 ml. of solvent 95–98 percent conc. sulfuric acid) is 5.48.

Dope Preparation:

The above polymer (11.0 g.) is combined with 62.33 g. of 100.65 percent sulfuric acid in a centrifuge bottle equipped with a stirrer. The mixture is stirred at about 20°C., the anisotropic dope which results (contains 15 percent by weight of the copolyamide) is stir opalescent.

Fiber Preparation by Wet Spinning

The above anisotropic solution is placed in a Carpenter 20 stainless steel spinning cell and extruded through a spinneret containing 20 holes of 0.003 inch (0.076 mm.) diameter into a water bath at 23°C. The filaments pass over a guide and onto a wind-up bobbin at a rate of 47.5 ft./min. (14.5 m./min.) These extruded filaments are soaked in changes of water (25°C.) until the latter is no longer acidic. The water-leached, air dried (70°F., 65 percent R.H.) filaments (as is) exhibit low crystallinity with an orientation angle of 29° and a sonic velocity of 6.24 km./sec. Filaments (as is) have the following T/E/Mi/Den. values: 11.9/6.4/274/8.45.

Heat Treatment of Fibers:

Fibers are passed at 25 ft./min. (7.62 m./min.) through a tube with the center at 550°C. (Device A). Fibers which are drawn 1.06X display medium crystallinity with an orientation angle of 12° and a sonic velocity of 7.18 km./sec. The filaments (as is) have the following T/E/Mi/Den. values: 16.5/4.4/639/7.64.

EXAMPLE 24

This example illustrates the preparation of (1) copoly(p-phenylene p,p'-biphenyldicarboxamide/terephthalamide) (55/45), (2) an anisotropic oleum dope thereof, and (3) fibers thereof.

Polymer Preparation:

The equipment and procedure are the same as described in Example 23A with the following exceptions The resin-making kettle is the 500 ml. size.

The intermediates are p-phenylenediamine (9.733 g., 0.09 mole), hexamethylphosphoramide (192 ml.), N-methyl-2-pyrrolidone (48 ml.), 4,4'-dibenzoyl chloride (13.817 g., 0.0495 mole) and terephthaloyl chloride (8.223 g., 0.0405 mole).

The polymeric gel is stirred 16 hr. with cooling in tap water.

The yield is 100 percent and the $\eta_{inh} = 6.39, 6.54$.

Dope Preparation:

The above polymer (24.80 g.) is combined with 223.2 g. of 100.70 percent sulfuric acid in a centrifuge bottle equipped with a stirrer. The mixture is stirred at about 25°C. until there results an anisotropic dope which contains 10 percent by weight of the copolyamide. THE DDA value of a 10.0 percent (by weight) dope in 100.81 percent sulfuric acid is 100.

Fiber Preparation by Wet-Spinning:

The above anisotropic dope, at about 25°C., is placed in a Carpenter 20 stainless steel cell and extruded through a spinneret containing 20 holes of 0.003 inch (0.076 mm.) diameter into 10 percent sulfuric acid (by weight) at 29°C. The filaments pass over a guide and onto a wind-up roll at a rate of 100 ft./min. (30.5 m./min.). These extruded filaments are soaked in changes of water (25°C.) until the latter is no longer acidic. The water-leached, air-dried (70°F., 65 percent R.H.) filaments are amorphous and have an orientation angle of about 40°. Filaments (as is) have the following T/E/M$_i$/Den. values: 9.7/8.7/256/3.42.

Heat Treatment of Fibers:

The above dried fiber is passed at 25 ft./min. (7.62 m./min.) into a tube whose center is at 600°C. (Device A).

Fibers which are drawn 1.07X display low crystallinity with an orientation angle of 18°. The filaments (as is) have the following T/E/M$_i$/Den. values: 22.5/3.2/668/2.77.

EXAMPLE 25

This example illustrates the preparation of a random copolyamide comprised of repating units selected from the group of

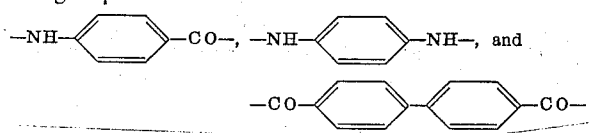

(relative molar ratio of 1:3:3, respectively), (2) an anisotropic oleum dope of the copolyamide, and (3) fibers of the copolyamide.

Polymer Preparation:

A 500-ml. resin-making kettle equipped with a stainless steel egg-beater type stirrer, nitrogen-inlet tube, and calcium chloride drying-tube is flamed with a Bunsen burner and simultaneously flushed with nitrogen. The kettle is sealed and placed in a dry-box. p-Phenylenediamine (7.300 g., 0.0675 mole) is weighed in the dry-box and placed in the kettle. Hexamethylphosphoramide (192 ml.) and N-methyl-2-pyrrolidone (48 ml.) are measured in the dry-box and poured into the kettle. The kettle is removed from the dry-box, reconnected with the stirring motor and nitrogen line. When solution of the diamine has occurred, the kettle is cooled in an ice-bath.

p-Aminobenzoyl chloride hydrochloride (4.321 g., 0.0225 mole) and 4,4'-dibenzoyl chloride (18.841 g., 0.0675 mole) are weighed in the dry-box, combined, and added at once to the rapidly stirring diamine solution. The reaction mixture is stirred and cooled in an ice-bath for 1 hr. and then stirred 16 hr. at about 25°C. The gel is combined with water, stirred in a blender and the precipitate is filtered. The precipitate is washed three times with water and once with alcohol by stirring in a blender and filtering. The product is dried at 80°C. for 16 hr. in a vacuum oven with a nitrogen bleed. The yield is 100 percent and $\eta_{inh} = 4.92, 4.81$.

Dope Preparation:

In a centrifuge bottle equipped with a stirrer are combined 177 g. of 100.70 percent sulfuric acid and 23.0 g. of the above polymer. The mixture is stirred at 25°C. until a smooth anisotropic dope which contains 11.5 percent by weight copolymer results. The DDA value of an 11.5% (by weight) dope in 100.81 percent sulfuric acid is 95.4.

Fiber Preparation by Wet-Spinning:

The above anisotropic dope, at 25°C., is placed in a Carpenter 20 stainless steel spinning cell and extruded through a spinneret containing 20 holes of 0.003 inch (0.076 mm.) diameter into 10 percent sulfuric acid (by weight) at 23°C. The filaments are wound up at a rate of 72 ft./min. (22 m./min.). These filaments are soaked in changes of water (25°C.) until the latter is no longer acidic. The water-leached, air-dried (70°F., 65 percent R.H.) filaments exhibit trace crystallinity with an orientation angle of 32°. and a sonic velocity of 5.67 km./sec. Filaments (boiled-off) have the following T/E/Mi/Den. values: 8.3/7.1/183/4.86.

Heat Treatment of Fibers:

The above dried fibers are passed at 25 ft./min. (7.62 m./min.) through a tube heated at the center to 600°C. (Device A). Fibers which are drawn 1.14X display high crystallinity, have an orientation angle of 12°, and a sonic velocity of 8.80 km./sec. The filaments (as is) have the following T/E/Mi/Den. values: 17.9/2.1/858/4.58.

EXAMPLE 26

This example is similar to Example 25, above, except that the cited repeating units of the copolyamide are in the molar ratio of 2:3:3, respectively.

Polymer Preparation:

The equipment and procedure are the same as described in Example 25 with the following exceptions The intermediates are p-phenylenediamine (6.489 g., 0.06 mole), hexamethylphosphoramide (214 ml.), N-methyl-2-pyrrolidone (53 ml.), p-aminobenzoyl chloride hydrochloride (7.682 g., 0.04 mole) and 4,4'-dibenzoyl chloride (16.747 g., 0.06 mole).

The polymer remains in solution during the entire reaction period. A film was wet-cast directly. It was yellow, transparent, flexible and tough.

The yield of polymer is 100% and the $\eta_{inh} = 4.80, 4.88$.

Dope Preparation:

In a centrifuge bottle equipped with a stirrer are combined 182.0 g. of 100.70 percent sulfuric acid and 22.5 g. of the above polymer. This mixture is stirred at 25°C. until there results a smooth anisotropic dope which contains 11 percent by weight of copolymer. The DDA value of an 11.0 percent dope in 100.81 percent sulfuric acid is 100.

Fiber Preparation by Wet-Spinning:

The above anisotropic dope, at 25°C., is placed in a Carpenter 20 stainless steel spinning cell and extruded through a spinneret containing 20 holes of 0.003 inch (0.076 mm.) diameter into 10 percent sulfuric acid (by weight) at 27°C. The coagulated filaments are wound-up on a bobbin immersed in water at a rate of 65 ft./min. (19.8 m./min.). These filaments are soaked in 5 changes of water (25°C.) until the latter is no longer acidic. The water-leached, air-dried (70°F., 65 percent R.H.) filaments exhibit trace crystallinity with an orientation angle of about 60°. and a sonic velocity of 4.47 km./sec. Filaments (boiled-off) have the following T/E/Mi/Den. values: 8.5/9.6/194/6.31.

Heat Treatment of Fibers:

Wet fibers (no drying at any time) of the above spin are passed at 25 ft./min. (7.62 m./min.) through a tube heated at the center to 600°F. (Device A). These fibers drawn 1.08X display high crystallinity with an orientation angle of 9° and have T/E/$M_i$/Den. values of 12.7/2.0/622/4.43 (as is filaments). Dry fibers with the same heat treatment but a draw ratio of 1.09X display high crystallinity with a 12° orientation angle. and a sonic velocity of 7.08 km./sec. Filaments (as is) have T/E/Mi/Den. values of 14.3/2.4/645/5.46

EXAMPLE 27

This example illustrates the preparation of (1) poly(p-phenylene p,p'- biphenyldicarboxamide), (2) an anisotropic oleum dope thereof, and (3) fibers thereof.

Polymer Preparation:

A 500-ml. resin-making kettle equipped with a stainless steel egg-beater type stirrer, nitrogen inlet tube and calcium chloride drying-tube is flamed with a Bunsen burner and simultaneously flushed with nitrogen. The kettle is sealed and placed in a dry-box. p-Phenylenediamine (6.488 g., 0.06 mole) is weighed in the dry-box and placed in the kettle. Hexamethylphosphoramide (128 ml.) and N-methyl-2-pyrrolidone (32 ml.) are measured in the dry-box and poured into the kettle. The kettle is removed from the dry-box, reconnected with the stirring motor and nitrogen line. When the diamine has dissolved, the kettle is cooled in an ice-bath.

4,4'-Dibenzoyl chloride (16.748 g., 0.06 mole, finely ground) is added at once to the rapidly stirring diamine solution. This mixture is stirred and cooled in an ice-bath for one-half hr. It is stirred for 16 hr. at about 25°C. The gel is combined with water and stirred in a blender after which the precipitate is filtered. It is washed three times with water and once with alcohol by stirring in a blender and filtering. After the alcohol wash, ether is poured over the polymer and filtered. The polymer is dried 16 hr. at 80°C. in a vacuum oven with a nitrogen bleed. The yield is 100 percent and $\eta_{inh}$ = 2.28.

A second similar preparation gave a 100 percent yield and an $\eta_{inh}$ = 2.00.

Dope Preparation:

In a centrifuge bottle equipped with a stirrer are combined approximately equal amounts (37.08 g., total) of the above two polymers and 303 g. of 100.25 percent sulfuric acid. This mixture is stirred with cooling in an ice-bath until there results a smooth anisotropic dope which contains 10.9 percent by weight copolyamide and is stir opalescent.

Fiber Preparation by Wet-Spinning:

The above anisotropic dope, at 25°C., is placed in a Carpenter 20 stainless steel cell and extruded through a spinneret containing 20 holes of 0.003 inch (0,076 mm.) diameter into 16.4 percent sulfuric acid (by weight) at 19°C. The fibers are wound-up on a bobbin immersed in water at a rate of 55 ft./min. (16.8 m./min.). The water-leached, air-dried (70°F., 65 percent R.H.) fibers exhibit low crystallinity with an orientation angle of 37°. Filaments (boiled-off) have the following T/E/$M_d$/Den. values: 2,2/3.5/120/6.92; sonic velocity is 4.51 km./sec.

Heat Treatment of Fibers:

The above dried fibers are passed at 25 ft./min. through a tube whose center is at 600°C. (Device A). Fibers drawn 1.05X exhibit medium crystallinity with an orientation angle of 16°. and a sonic velocity of 8.19 km./sec. The filaments (boiled-off) have T/E/Mi/Den. values of 3.2/0.8/293/6.46.

DDA Determination:

When a sample of poly(p-phenylene p,p'-biphenyldicarboxamide) of $\eta_{inh}$ = 1.86 (prepared in a manner similar to that above) is dissolved in 100.8 percent sulfuric acid to form anisotropic dopes containing 10 percent and 15 percent by weight polymer, the DDA values determined for these dopes are 30.4 and 100, respectively.

EXAMPLE 28

This example illustrates the preparation of (1) poly(p,p'-phenylenebenzamide), (2) an anisotropic dope thereof, and (3) fibers thereof. Preparations of intermediate compounds are also shown.

Preparation of 4-(4'-Thionylaminophenyl)benzoyl Chloride

A solution of 48 g. of 4-(4'-aminophenyl)benzoic acid and 3 drops of N,N-dimethylformamide in 300 ml. of thionyl chloride is refluxed on a steam bath for 1.5 hours. Excess thionyl chloride is removed under reduced pressure. Toluene (50 ml.) is added to the flask and the suspension is concentrated under reduced pressure. This step is repeated with 100 ml. of toluene. Toluene (≈100 ml.) is added to the flask to suspend the yellow solid which is filtered onto a sintered glass funnel under a nitrogen atmosphere. The solid is washed with toluene or petroleum ether (30–60°) and then dried in a vacuum dessicator over phosphorus pentoxide and paraffin shavings. The 4-(4'-thionylaminophenyl)benzoyl chloride melts at 145–146.5°C.

Preparation of 4-(4'-Aminophenyl)benzoyl Chloride Hydrochloride 4-(4'-Thionylaminophenyl) benzoyl chloride (24 g.) is suspended in 500 ml. of methylene chloride in a flame dried three-necked round bottom flask equipped with a mechanical stirrer and a gas inlet and outlet tube. The mixture is saturated with hydrogen chloride for 2 hours. The solid is filtered with function onto a sintered glass funnel and washed with 100 ml. of methylene chloride under an atmosphere of nitrogen. The solid is suspended in 250 ml. of anhydrous ether and stirred by means of a magnetic stirrer for 1 hour. The solid is filtered under nitrogen and then dried in a vacuum dessicator for two days. The yield of 4-(4'-aminophenyl)benzoyl chloride hydrochloride is 88 percent.

Polmer Preparation:

A one-liter resin-making kettle equipped with an egg beater stirrer, nitrogen inlet tube and calcium chloride drying tube is flamed with a burner and simultaneously flushed with nitrogen. Hexamethylphosphoramide (210 ml., distilled from calcium hydride at reduced pressure and stored over molecular sieves) and N-methylpyrrolidone-2 (210 ml., distilled from calcium hydride at reduced pressure and stored over molecular sieves) are filtered in the dry-box into a graduated cylinder. The cylinder is removed from the dry-box and the contents are poured into the resin-kettle which is cooled in an ice-water bath. 4-(4'-aminophenyl)benzoyl chloride hydrochloride (46.6 g., 0.174 mole) is weighed out in the dry-box into a polyethylene bag and then transferred rapidly, with moderate stirring, into the resin-kettle. The resulting mixture is stirred for 30 minutes at which time the ice-water bath is removed. The reaction mixture is stirred for an additional 2 hours and 15 minutes. Lithium carbonate (12.9 g., 0.175 mole) is added to the resin-kettle and the mixture is stirred for another 35 minutes. After standing overnight, the polymeric mass is combined with water and stirred in a blender wherein it is converted to a fine powder. The polymer is washed three times with water and once with alcohol by means of stirring in the blender and filtration on a sintered glass Buchner funnel. The polymer is dried overnight in a vacuum oven at 60°C. The yield of poly(p.p'-phenylenebenzamide) is 96.4 percent ($\eta_{inh} = 1.99$ in 99.8 percent sulfuric acid).

Dope Preparation:

Into a three-necked polymer dope bottle equipped with a stirrer and placed in an ice-water bath is added 46 g. of 99.83 percent sulfuric acid. Five grams of the polymer are introduced into the bottle and the resulting mixture is stirred overnight during which time an anisotropic dope is obtained. The dope exhibits opalescence on stirring and is spinnable.

Fiber Preparation by Wet Spinning:

The spin dope prepared above is placed in a Teflon TFE fluorocarbon lined stainless steel cylinder and the unit is centrifuged to remove air bubbles. The polymer dope is then extruded by means of a mechanically driven syringe through a platinum spinneret having 20 holes of 0.003 in. (0.076 mm.) diameter into a water bath at a temperature of 20–30°C. After passing through the water for a distance of 2 feet (61 cm.), the filaments are wound up on a bobbin at a rate of about 26 ft./min. (7.93 m./min.). The dried filaments that have not been boiled off display the following T/E/-$M_i$/Den. values: 2.24/3.9/145.4/4.90 and a sonic velocity of 4.06 km./sec.

Heat Treatment of Fibers:

The filaments prepared above are passed through a hot tube (Device A) 32 in. (81.3 cm.) in length whose inside wall temperature at the center is 600°C. The fiber is drawn by a factor of 1.1 times and is passed into the hot tube at a rate of 25 ft./min (7.62 m./min.). The resulting fibers exhibit high crystallinity and have an orientation angle of 27°. and a sonic velocity of 5.82 km./sec. Filaments have the following T/E/Mi/Den. values (non-boiled off fiber): 4.17/1.6/288.2/4.80.

EXAMPLE 29

This example illustrates the preparation of (1) a copolymer comprised of equimolar amounts of randomly repeating units of poly(p,p'-phenylenebenzamide) and poly(p-benzamide). (2) an anisotropic oleum dope thereof, and (3) fibers thereof.

Polymer Preparation:

A 1-liter resin-making kettle equipped with an egg-beater stirrer, nitrogen inlet tube and calcium chloride drying tube is flamed with a burner and simultaneously flushed with nitrogen. Hexamethylphosphoramide and N-methylpyrrolidone-2 (200 ml. of each, distilled from calcium hydride at reduced pressure and stored over molecular sieves) are filtered in the dry-box into a graduated cylinder. The cylinder is removed from the dry-box and the contents are poured into the resin-kettle. 4-(4'-Aminophenyl)benzoyl chloride hydrochloride (22.6 g., 0.0843 mole) and p-aminobenzoyl chloride hydrochloride (17.04 g., 0.0843 mole of monomer containing about 5 percent inert, solvent impurity) are weighed in the dry-box into a polyethylene bag. The solids are mixed together in the bag and then transferred rapidly, with moderate stirring, into the resin-kettle. Within 2 hours the contents of the flask formed a "rubbery" mass. After standing over the weekend, lithium carbonate (12.55 g., 0.17 mole) in 100 ml. of N-methylpyrrolidone-2 is added to the bulky mass. The mixture is stirred for 10 min. and then allowed to stand for 4 hours. The polymeric mass is combined with water and stirred in the blender wherein it is converted to rather fibrous particles. The polymer is washed five times with water and three times with alcohol by means of stirring in the blender and filtration on a sintered-glass Buchner funnel. The polymer is dried overnight in the vacuum oven at 60°C. The yield of the copolymer is 98.2 percent ($\eta_{inh} = 3.03$ in 99.5 percent sulfuric acid).

Dope Preparation:

Into a three-necked polymer dope bottle equipped with a stirrer and placed in an ice-water bath is added 25 ml. of 100.7 percent sulfuric acid. Six grams of the polymer are added into the bottle and the resulting mixture is stirred overnight during which time an anisotropic dope which exhibits stir opalescence is obtained.

Fiber Preparation by Wet Spinning:

The spin dope prepared above is placed into a Teflon TFE fluorocarbon lined stainless steel cylinder and the unit is centrifuged to remove air bubbles. The dope is then extruded by means of a mechanically driven syringe through a platinum spinneret having 20 holes of 0.003 in. (0.076 mm.) diameter into a water bath at a temperature of 20–30°C. After passing through the water for a distance of 2 feet (0.16 m.), the filaments are wound up on a wet bobbin at a rate of about 26 ft./min (7.93 m./min.), are soaked in fresh water for about 4 hr. before being dried. Filaments that have not been boiled off display the following T/E/$M_i$/Den. values: 4.6/7.3/188/2.66 and a sonic velocity of 3.45 km./sec.

Heat Treatment of Fibers:

The filaments prepared above are passed through a hot tube(Device A) 32 inches (81.3 cm.) in length whose inside wall temperature at the tube center is 450°C. The fiber is drawn by a factor of 1.1 times and is passed into the tube at a rate of 25 ft./min. (7.63 m./min.). The resulting fibers exhibit medium crystallinity and have an orientation angle of 22'. and a sonic velocity of 7.37 km./sec. Filaments have the following T/E/Mi/Den. values (non-boiled off fibers): 6.9/1.5/530/6.93.

EXAMPLE 30

This example illustrates the preparation of (1) a copolymer comprised of randomly repeating units of poly(p,p'-phenylene benzamide) (2) an anisotropic dope thereof, and (3) fibers thereof.

Polymer Preparation

A one-liter resin making kettle equipped with an egg-beater stirrer, nitrogen inlet tube and calcium chloride drying tube is flamed with a burner and simultaneously flushed with nitrogen. Hexamethylphosphoramide (230 ml.) and N-methylpyrrolidone-2 (230 ml.) are filtered in the dry-box into a graduated cylinder. The cylinder is removed from the dry box and the contents are poured into the resin-kettle which is cooled in an ice-water bath. 4-(4'-Aminophenyl)benzoyl hydrochloride (15.7 g., 0.0570 mole of monomer containing about 2.5 percent of inert solvent impurity) and p-aminobenzoyl chloride hydrochloride (34.9 g., 0.01728 mole of monomer containing about 5 percent inert solvent impurity) are weighed out in the dry-box into a polyethylene bag. The solids are mixed together in the bag and then transferred rapidly, with moderate stirring, into the resin kettle. Within 1 hour the contents of the flask form a rubbery mass. The polymeric substance is allowed to stand for 4 days and then combined with water and stirred in a blender wherein it is converted into rather fibrous particles. The polymer is washed three times with water and twice with alcohol by means of stirring in the blender and filtration on a sintered-glass Buchner funnel. The polymer is dried in the vacuum oven at 70°C., pulverized in a ball mill and then placed in the vacuum oven again until dry. The yield of polymer is 91.5 percent ($\eta$inh = 3.83 in 100.2 percent sulfuric acid).

Dope Preparation

Into a three-necked polymer dope bottle equipped with a stirrer and placed in an ice-water bath is added 45.0 g. of 99.8 percent sulfuric acid. Five grams of the polymer are added and the mixture is stirred overnight during which time an anisotropic dope which exhibits stir opalescence is obtained.

Fiber Preparation by Wet Spinning

The spin dope prepared above is placed into a Teflon TFE fluorocarbon lined stainless steel cylinder and the unit is centrifuged to remove air bubbles. The dope is then extruded by means of a mechanically driven syringe through a platinum spinneret having 20 holes of 0.003 inch (0.076 mm.) diameter into a water bath at a temperature of 20–30°C. After passing through the water for a distance of 2 feet (61 cm.), the filaments are wound up on a bobbin at a rate of about 30 ft./min. (9.19 m./min.). The bobbin is soaked in water overnight and then air dried. Filaments that have not been boiled off display the following T/E/$M_i$/Den. values: 6.73/7.7/229/3.42 and a sonic velocity of 4.24 km./sec.

Heat Treatment of Fibers

The filaments prepared above are passed through a hot tube (Device A) 32 inches (81.3 cm.) in length whose inside wall temperature at the tube center is 400°C. The fiber is drawn by a factor of 1.1 times and is passed into the tube at a rate of 25 ft./min. (7.62 m./min.). The resulting fibers exhibit medium crystallinity, have an orientation angle of 19° and a sonic velocity of 7.73 km./sec. Filaments that have not been boiled off display the following T/E/Mi/Den. values: 11.84/2.6/541/2.70.

DDA Determination; Fiber Preparation

When the polymer, described above ($\eta$inh 3.83), is dissolved in 100.2 percent sulfuric acid to form an 11 percent dope by weight, an anisotropic system is formed which has a DDA value of 100. A 7 percent dope of the same materials is isotropic and the DDA value is 0. The 11 percent dope is spun in the manner also described above, and the as-extruded, washed and dried filaments have T/E/$M_i$/Den. of 6.58/9.1/183/2.85. After heat treatment at 450°C. (Device A) the T/E/$M_i$/Den. values are 11.9/2.4/614/4.92, the orientation angle is 15°.

EXAMPLES 31–35

The following examples illustrate the preparation of (1) ordered and semi-ordered p-oriented aromatic copolyamides from p,p'-diaminobenzanilide, terephthaloyl chloride (X), and p,p'-bibenzoyl chloride (Y), (2) anisotropic dopes of the copolyamides, and (3) high tenacity, high modulus fibers of the copolyamides.

Copolymer Preparation

The copolymers listed in the following Table IV are prepared in an identical manner using the proper ratio of diacid chlorides for the composition under consideration. All glassware is dried at least 2 hours in a 120°C. oven; weighings and measurements are carried out in a drybox; and the reactions are run under a blanket of nitrogen.

The diamine is dissolved in a blender in a 2:1 by volume mixture of hexamethylphosphoramide and N-methylpyrrolidone-2 in an amount to give a 10–13 percent concentration (weight per total weight) of final polymer. An equivalent amount of diacid chloride is added very rapidly with the fastest possible stirring. In one minute the polymer sets up to a rubbery gel which cannot be stirred. This is left undisturbed for at least 1 hour. The polymer is isolated in water, is washed in the blender four times with water and once each with acetone and alcohol, and is dried overnight at 100°C. under vacuum. The polymer may be purified further by first grinding it in a mill to reduce the particle size and then treating it with formic acid on the steam bath for 1 hour. After thorough washing with water the polymer is again dried.

Polymers 32–35 in Table IV are prepared in this manner. Polymer 31 is prepared in hexamethylphosphoramide alone, although similar results should be obtained in a mixed solvent system.

Dope Preparation

The spin dopes are prepared by combining appropriate amounts of polymer and solvent and stirring at room temperature in a closed system. Anisotropic dopes, which are stir-opalescent, are obtained. The dopes are centrifuged before wet spinning.

Wet Spinning

Wet spinning is done with a motor driven hypodermic syringe which is fitted with a heavy face spinneret having twenty 0.003 inch (0.076 mm.) holes. The filaments are coagulated in room temperature water. The length of immersion is 24–32 in. (60.9–81.3 cm.). The filaments are wound up at maximum possible speed (see Table) while the bobbin is rotated in a pan of water. The fiber is then soaked in distilled water 16–24 hours.

Fiber Heat Treatment

The extracted, wet fibers are drawn and/or annealed through a hot tube (Device A). The input rate is 12–25 ft./min. (3.66–7.62 m./min.). Draw ratios, temperatures, and filament properties are shown in the Table.

The copolyamides whose fibers are described in Table IV are comprised of repeating units selected from the group of:

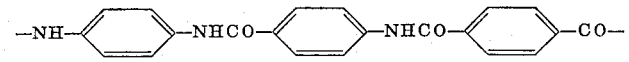
and
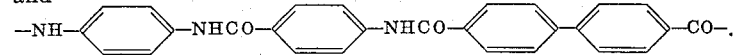

20 percent fuming sulfuric acid. Initially a stiff gel results which on standing for six days becomes a fluid, but viscous, stir opalescent dope.

Spinning and As-extruded Properties

Wet spinning is done with a motor-drive hypodermic syringe fitted with a heavy face spinneret having 20

TABLE IV
COPOLYMERS OF p,p'-DIAMINOBENZANILIDE WITH TEREPHTHALOYL AND p,p'-BIBENZOYL CHLORIDES

| | Copolymer | | Dope Preparation | | Spinning | | | Fiber Properties | | | | | | |
|---|---|---|---|---|---|---|---|---|---|---|---|---|---|---|
| | | | | | | | | As-Extruded | | | | Heat-Treated | | |
| Example | X/Y Ratio | ηinh | Percent H₂SO₄ | Wt. percent polymer | W.U.-Sp. ft./min. | Heat treatment. Drawn at °C. | T/E/Mi/Den. | Crystallinity | O.A.° | S.V. (Km/sec) | T/E/Mi/Den. | Crystallinity | O.A.° | S.V. (Km/sec) |
| 31[1] | 1/0 | 3.6 | 100.7 | 10 | 28.5 | 1.16× 597 | 6.4/11/173/6.7 | Low | 36 | 4.96 | 10/1.2/827/4.2 | High | 14 | |
| 32 | .75/.25 | 4.5 | 100.7 | 10 | 41 | 1.08× 600 1.00× 580 | 4.9/12/145/5.4 | Trace | ~45 | 4.14 | 14/2.4/622/5.1 | Med. | 14 | 7.47 |
| 33[2] | .5/.5 | 3.7 | 99.2 | 10 | 42 | 1.07× 600 1.01× 550 | 8.8/8/259/5.1 | Trace | 38 | 5.73 | 13/2.1/554/4.5 | Med. | 12 | |
| 34 | .25/.75 | 5.9 | 99.2 | 10 | 42 | 1.07× 600 | 9.6/9.6/257/5.5 | Trace | ~45 | 5.88 | 18/2.5/800/5.8 | High | 10 | 9.21 |
| 35[1] | 0/1 | 2.4 | 99.2 | 11 | 43 | 1.08× 600 | 5.6/9/216/7.2 | Low | 35 | 5.55 | 13/2.4/707/6.6 | High | 11 | 8.19 |

[1] As-extruded tensile data determined at 10% rate of extension.
[2] As-extruded tensile data determined at 60% rate of extension.
DDA Determination: When another sample of the polymer of Example 35 is combined with 99.2% sulfuric acid to form a dope containing 11% by weight polymer, the DDA value observed for the resulting dope is 100.

EXAMPLE 36

This example illustrates (1) the preparation of a random, multi-component, p-oriented aromatic copolyamide, (2) an anisotropic dope thereof, and (3) high tenacity, high modulus fibers thereof.

The copolyamide is comprised of equimolar amounts of random repeating units represented by the following structures:

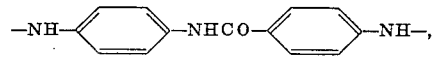

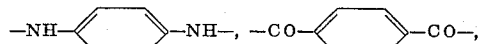
and
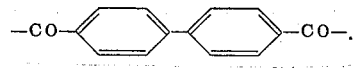

Polymer Preparation

A solution of 4.55 g. (0.02 mole) p,p'-diaminobenzanilide and 2.16 g. (0.02 mole) of p-phenylenediamine in a mixture of 90 ml. of hexamethylphosphoramide and 45 ml. of N-methylpyrrolidone-2 is prepared in the drybox. It is transferred into a blender jar, blanketed with nitrogen and a mixture of 4.06 g. (0.02 mole) of terephthaloyl chloride and 5.58 g. (0.02 mole) of bibenzoyl chloride is added quickly with very rapid stirring. The system sets up to a rubbery gel in 2 minutes. After 2.5 hours the polymer is worked up in water. It is washed in the blender three times with water and once each with acetone and alcohol, and is dried in a 100°C. vacuum oven. The yield is quantitative and the inherent viscosity is 5.4.

Dope Preparation

An anisotropic dope is prepared from the above polymer by combining at room temperature 5.5 g. of polymer, 45 g. of 100.7 percent sulfuric acid and 5.0 g. of holes of 0.003 in. (0.076 mm.) diameter. The filaments are coagulated in room temperature water. The length of immersion is 32 in. (71.3 cm.). The filaments are wound up at 43 ft./min. (13.1 m./min.) while the bobbin is rotated in a pan of water. The fiber is then soaked in distilled water 16 hours. As-extruded filament properties are T/E/Mi/Den.: 6.3/13.1/149/4.04. The yarn has trace crystallinity, an orientation angle of ≈ 45°and a sonic velocity of 4.42 km./sec.

Fiber Heat Treatment and Properties

The wet fiber from above is drawn 1.1X through a hot tube (Device A) at 550°C. with an input speed of 12.5 ft./min. (3.81 m./min.). The drawn yarn has the following properties: T/E/Mi/Den.: 12.4/2.3/629/67.8. It has low crysallinity with low perfection, an orientation angle of 17° and a sonic velocity of 7.84 km./sec.

The following Examples 37–39 illustrate the preparation of random co(polyamide)-ureas comprised of repeating units selected from the group of

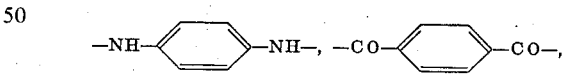
and

together with dopes and fibers of these random copolymers. It will be observed that the anisotropic dopes of Examples 37–38 yield stronger fibers (e.g., of higher tenacity and modulus) than does the isotropic dope of Example 39. Relative ratios of the above-described randomly repeating units (in the order given above) are shown for each of Examples 37–39.

EXAMPLE 37

Polymer Preparation

A quart-size (946 ml.) glass blender jar is dried by heating the inside surface with hot air at 150°C. The blender jar is allowed to cool to room temperature inside a dry box, i.e., a chamber maintained under anhydrous conditions. Hexamethylphosphoramide (180 ml., distilled from calcium hydride at reduced pressure and stored in the dry box over molecular sieves), N-methylpyrrolidone (90 ml., distilled from calcium hydride at reduced pressure and stored in the dry box over molecular sieves), and lithium chloride (7.5 g., dried in a vacuum oven at 200°C. and stored in the dry box) are transferred to the blender jar. A plastic cover for the blender jar is wrapped in aluminum foil and placed on the blender. The blender jar is removed from the dry box. A flow of dried nitrogen gas is introduced into the blender jar through a hole in the plastic cover and aluminum foil. The mixture is stirred at a moderate speed until all the lithium chloride has dissolved. Sublimed p-phenylenediamine (16.22 g., 0.150 mole) is weighed out in the dry box and transferred to the blender jar. The mixture is stirred at a moderate speed until all the p-phenylenediamine has dissolved.

p-Phenylene diisocyanate (2.40 g., 0.015 mole) is weighed out in the dry box and transferred to the blender jar. The mixture is stirred at a moderate speed for 12 minutes. Sublimed terephthaloyl chloride (27.41 g., 0.135 mole) is weighed out in the dry box. The solution in the blender jar is stirred very rapidly as the terephthaloyl chloride is added. The solution gels to a solid mass in less than 10 seconds after addition of the terephthaloyl chloride. This gel is allowed to stand for five hours, and is then added to water in a gallon-size (3.79 l.) ) blender and stirred at high speed. The precipitated polymer is filtered on a coarse, sintered-glass Buchner funnel. The polymer is washed three additional times with water, and one time with acetone, filtering the polymer after each washing. The polymer is dried in a vacuum oven at 80–100°C. The yield of polymer is 35.9 g. (99 percent). The polymer has an inherent viscosity of 1.83. Ratio of units is 9:9:1.

Dope Preparation

A 500-ml. resin kettle equipped with a stainless steel egg-beater type stirrer is dried in a vacuum oven and allowed to cool to room temperature in a dry box. In the resin kettle are placed 34 g. of polymer and 145 ml. concentrated sulfuric acid (100.54 percent by titration). The resin kettle is removed from the dry box and connected to an air driven stirrer motor. The mixture is stirred overnight, moderating the temperature by a water bath at room temperature. A smooth, hazy dope containing 13 percent polymer by weight is formed. The dope depolarizes light when observed as a thin layer between crossed polarizers Fiber Preparation and Fiber Properties As Extruded The polymer dope prepared above is placed in a stainless steel spinning cell and extruded at a pressure of 400 lb./in$^2$ (28.12 Kg/cm$^2$) through a platinum spinneret having 20 holes of 0.003 inches (0.076 mm) diameter into a water bath at 10–20°C. The fibers are guided out of the water bath and the yarn is wound up at the rate of 12 ft/min. (3.66 m/min). The bobbins containing the yarn are allowed to stand in distilled water overnight, and then dried in air. The inherent viscosity of the polymer in the yarn is 1.75 determined in concentrated sulfuric acid. The fibers have low crystallinity, an orientation angle of approximately 45° and a sonic velocity of 4.40 km./sec. The average tensile properties are T/E/Mi/Den. = 3.52/16.5/119/4.01.

Fiber Heat Treatment And Properties

The fiber is heat treated by passing the yarn (20 filaments) through a heated tube (Device A). The wall of the tube in the center is maintained at 599°C. The fiber input speed is 25 ft./min. (7.62 m./min.), and the yarn is increased in length by 10 percent on passing through the tube. The resulting yarn has high crystallinity, an orientation angle of 14°, a sonic velocity of 8.47 km./sec. and the following average filament tensile properties: T/E/Mi/Den. = 8.41/1.5/581/3.47.

EXAMPLE 38

Polymer Preparation

A quart-size (946 ml.) glass blender jar is dried by heating the inside surface with hot air at 150°C. The blender is allowed to cool to room temperature inside a dry box, i.e., a chamber maintained under anhydrous conditions. Hexamethylphosphoramide (120 ml., distilled from calcium hydride at reduced pressure and stored in the dry box over molecular sieves), N-methylpyrrolidone (60 ml., distilled from calcium hydride at reduced pressure and stored in the dry box over molecular sieves), lithium chloride (5.0 g., dried in a vacuum oven at 200°C. and stired in the dry box), and sublimed p-phenylenediamine (10.81 g., 0.10 mole) are transferred to the blender jar. A plastic cover for the blender jar is wrapped in aluminum foil and placed on the blender jar. The blender jar is removed from the dry box. A flow of dried nitrogen gas is introduced into the blender jar through a hole in the plastic cover and aluminum foil. The mixture is stirred at a moderate speed until all the solids have dissolved.

p-Phenylene diisocyanate (0.80 g., 0.005 mole) is weighed out in the dry box and transferred to the blender jar. The mixture is stirred at a moderate speed for 5 minutes. Sublimed terephthaloyl chloride (19.29 g., 0.095 mole) is weighed out in the dry box. The solution in the blender jar is stirred very rapidly as the terephthaloyl chloride is added. The solution gels to a stiff mass in about 15 seconds. The gelled solution is allowed to stand overnight, after which it is added to water in a gallon-size (3.79 l.) blender and stirred at high speed. The polymer is filtered on a coarse sintered-glass Buchner funnel. The polymer is washed three additional times with water and one time with acetone in the blender and filtered after each washing. After the final filtration the polymer is dried in a vacuum oven at 80–100°C. The yield of polymer is 25.1 g. (92 percent yield). The polymer has an inherent viscosity of 2.87. Ratio of units is 95:95:9.

Dope Preparation

A 100 ml. round-bottom flask is dried in a vacuum oven and cooled to room temperature in a dry box. (The flask is equipped with a Teflon TFE-fluorocarbon stirrer.) In the flask are placed 15 g. of the polymer and 65 ml. concentrated sulfuric acid (100.44 percent by titration). The mixture is stirred, moderating the temperature by means of a water bath at room temperature. Stirring soon becomes difficult, and additional acid (10 ml.) is added. Cooling with an ice-water bath also helps in the preparation of the dope. After stirring for the necessary period, the mixture becomes a smooth, hazy dope. This dope depolarizes light when observed as a thin layer between crossed polarizers.

Fiber Preparation and Fiber Properties As Extruded

The polymer dope prepared above is placed in a Teflon TFE-fluorocarbon lined, mechanically driven, stainless steel syringe and extruded through a platinum spinneret having 20 holes of 0.003 in. (0.076 mm) diameter into a water bath at 10–20°C. The fibers are guided out of the water bath and wound up at the rate of 10.5 ft./min. (3.2 m/min.). The bobbins containing the fiber are allowed to stand in distilled water overnight, then dried in air. The inherent viscosity of the polymer in the fiber is 2.84. The average tensile properties of the filaments are (70°F., 65 percent R.H.) T/E/$M_i$/Den = 5.55/10.7/181/3.00. The fibers have medium crystallinity, an orientation angle of 45° and a sonic velocity of 4.44 km./sec.

Fiber Heat Treatment and Properties

Yarn from a second bobbin of the above spinning experiment, having average filament tensile properties T/E/$M_i$/Den = 5.24/14.8/168/8.55 is heat-treated by passing the fibers through a heated tube (Device A). The wall of the tube in the center is maintained at 599°C. The fiber input speed is 25 ft./min. (7.62 m./min.), and the fiber is increased in length by 10 percent on passing through the tube. The resulting fiber has high crystallinity, an orientation angle of 11°, a sonic velocity of 8.98 km./sec. and the following average filament tensile properties: T/E/Mi/Den. = 9.96/1.1/847/4.60.

EXAMPLE 39

Polymer Preparation

A quart-size (946 ml.) glass blender jar is dried by heating the inside surface with hot air at 150°C. The blender jar is allowed to cool to room temperature inside a dry box, i.e., a chamber maintained under anhydrous conditions. Hexamethylphosphoramide (90 ml., distilled from calcium hydride at reduced pressure and stored in the dry box over molecular sieves), N-methylpyrrolidone (45 ml., distilled from calcium hydride at reduced pressure and stored in the dry box over molecular sieves), lithium chloride (3.75 g., dried in a vacuum oven at 200°C. and stored in the dry box), and sublimed p-phenylenediamine (4.05 g., 0.0375 mole) are transferred to the blender jar. A plastic cover for the blender jar is wrapped in aluminum foil and placed on the blender jar. The blender jar is removed from the dry box. A flow of dried nitrogen gas is introduced into the blender jar through a hole in the plastic cover and aluminum foil. The mixture is stirred at a moderate speed until the solids have dissolved.

p-Phenylene diisocyanate (1.20 g., 0.0075 mole) is weighed out in the dry box and transferred to the blender jar. The mixture is stirred at a moderate speed for five minutes. Sublimed terephthaloyl chloride (6.09 g., 0.030 mole) is weighed out in the dry box. The solution in the blender jar is stirred very rapidly as the terephthaloyl chloride is added. The solution gels to a stiff mass in 30 seconds. The gel is allowed to stand overnight, and is then added to water in a gallon-size (3.79 l.) blender and stirred at a high speed. The precipitated polymer is filtered on a coarse sintered-glass Buchner funnel. The polymer is washed three times with water and one time with acetone, filtering the polymer after each washing. After the final filtration, the polymer is dried in a vacuum oven at 80–100°C. The yield of the polymer is 9.2 g. (100 percent). The polymer has an inherent viscosity of 2.82. Ratio of units is 4:4:1.

Dope Preparation

In a 100 ml. round-bottom flask equipped with a Teflon TFE-fluorocarbon stirring blade is placed 5.0 g. polymer and 35 ml. of 100.7 percent (by titration) sulfuric acid. The mixture is stirred, moderating the temperature by means of a water bath at room temperature. The polymer dissolves to a clear, very viscous solution. Additional acid (15 ml.) is added so that after mixing a clear, viscous spinnable solution is formed. This dope does not depolarize plane polarized light.

Fiber Preparation and Fiber Properties As Extruded

The polymer dope prepared above is placed in a Teflon TFE fluorocarbon lined mechanically-driven, stainless steel syringe and extruded through a platinum spinneret having 20 holes of 0.003 inches (0.076 mm.) diameter into a water bath at 10–20°C. The fibers are guided out of the water bath and wound up at the rate of 13 ft./min. (3.96 m/min.). The bobbins containing the fiber are allowed to stand in distilled water overnight, and then dried in air. The fibers have trace crystallinity, an orientation angle of 65°, a sonic velocity of 3.21 km./sec. and the following average filament tensile properties: T/E/Mi/Den. = 2.40/41.1/79/4.85.

Fiber Heat Treatment and Properties

The fibers prepared above are heat treated by passing the yarn through a heated tube (Device A) while increasing the length of the fiber by 10 percent. The input speed of the fibers is 25 ft./min. (8.2 m./min.), and the wall of the tube is maintained at 554°C. near the center of the length of the tube. The resulting fiber has high crystallinity, an orientation angle of 18°, and average filament tensile properties T/E/Mi/Den. = 3.93/1.3/300/4.34.

The following Examples 40–48 illustrate the preparation of hydrogen fluoride (HF) dopes, both anisotropic and isotropic, comprising poly(p-benzamide), poly(p-phenylene terephthalamide), and a copoly[(p-benzamide)/(p-phenylene terephthalamide)]. It will be observed that the anisotropic HF dopes yield stronger as-extruded fibers (e.g., of higher tenacity and modulus) than do comparable isotropic dopes.

EXAMPLE 40

This example illustrates the dry spinning of an anisotropic, HF dope comprising poly(p-benzamide).

Poly(p-benzamide) (20 g., $\eta$ inh = 3.04, prepared in N,N-dimethylacetamide, with lithium carbonate as an acid acceptor, by general procedures shown herein) and 105 ml. of anhydrous HF are placed in a polyethylene screw-cap bottle (180 ml. volume) and stirred for 2–4 hr. with a Hastelloy stirrer, the shaft of which protrudes through a hole in the bottle cap. The bottle is cooled externally by an ice/water bath. A stir opalescent, anisotropic dope containing 16 percent by weight polymer is formed (a similar 18 percent dope is birefringent when viewed between crossed polarizers). The 16 percent dope, having about the viscosity of glycerine, is poured into an externally cooled (to about 10°C.) Inconel cell and pressure is applied to a piston above the solution to cause a filament to jet from a 0.006 in. × 0.003 in. (dia. × length) (0.0152 cm. × 0.0076 cm.) platinum spinneret hole into a 3 ft. long (0.9 m.) "Lucite" column, 6 in. (15.2 cm.) sq., heated to about 70°C. by a warm stream of nitrogen directed countercurrent to the direction of the threadline. The pressure applied is about 25 lb./in.$^2$ (1.8 Kg./cm.$^2$) and the windup speed is 470 ft./min. (140 m./min.) The bobbin of fiber is boiled off for 15–30 min. in water, after which samples of fibers are removed and dried prior to testing. The dry sample exhibits the following filament tensile properties: T/E/Mi/Den.: 4.7/2.8/276/3.2; the fiber exhibits medium crystallinity and an orientation angle of 23°. After the fiber is subjected to successive one to two second exposures across a hot bar (350°C., air atmosphere, taut, 1.008X draw) and in a hot tube (Device A, no drawing) at 540°C., the following filament tensile properties are exhibited: T/E/Mi: 5.6/1.7/396; the fiber has high crystallinity and an orientation angle of 25°.

EXAMPLE 41

This example illustrates the dry spinning of an isotropic, HF dope comprising poly(p-benzamide).

Poly(p-benzamide) (15 g., $\eta$inh = 2.8, prepared by general procedures shown herein) is combined with 90 ml. of anhydrous HF as in Example 40 to form a viscous, isotropic dope containing 14 percent by weight of the polyamide. This dope is extruded from the spinning cell described in Example 40, using a pressure on the piston of 78 lb./in.$^2$ (5.5 Kg./cm.$^2$) and a windup speed of 175 ft./min. (53 m./min.). After this filament is thoroughly extracted in water and dried, it exhibits the folloiwng filament tensile properties: T/E/Mi: 2.1/27/73; it exhibits low crystallinity and an orientation angle of 50°. This fiber is passed successively through a tube (Device A) whose center is heated to 300°C. (1.3X draw; contact time of about 2 seconds) and a similar tube heated to 535°C. (1.05X draw; contact time of 2 seconds). After this treatment, the filament exhibits the following tensile properties: T/E/Mi: 4.6/2.3/283; the fiber has medium crystallinity and an orientation angle of 33°.

EXAMPLE 42

This example illustrates the dry spinning of an isotropic, HF dope comprising poly(p-phenyleneterephthalamide).

Poly(p-phenyleneterephthalamide) (10 g., $\eta$inh = 3.6, prepared by general procedures shown herein) is combined with 85–90 ml. of anhydrous HF as in Example 40; 0.9 g. of methylene chloride is added dropwise to form a viscous, isotropic, clear dope containing 10 percent by weight polyamide. This dope is extruded from the cell described in Example 40, with a pressure on the piston of 50–60 lb./in.$^2$ (3.5–4.2 Kg./cm.$^2$) and a slow product windup speed of about 20 ft./min. (6.9 m./min.); a 0.007 in. × 0.006 in. (diameter/length) (0.018 cm. × 0.015 cm.) platinum spinneret is used. After the filament collected is boiled off in water and dried, it exhibits the following tensile properties: T/E/Mi: 3.4/55/79. After this filament is drawn 2.0X at the rate of 12 ft./min. (3.7 m./min.) through a tube (Device A) heated in its center 2 in. (5 cm.) portion to 535°C., the filament exhibits the following tensile properties: T/E/Mi: 11/1.8/698; the filament has high crystallinity and an orientation angle of 13°, whereas the as-extruded filament has low crystallinity and only trace orientation.

EXAMPLE 43

This example illustrates the wet spinning of an isotropic HF dope comprising poly(p-phenyleneterephthalamide).

Poly(p-phenyleneterephthalamide) (10 g., $\eta$inh = 3.6, prepared by the general procedures shown herein but a different sample from that in Example 42) is combined with 120 ml. of anhydrous HF as in Example 40 to form an isotropic dope containing 7.7 percent by weight of the polymer. This dope is placed in the cell described in Example 40 and extruded through a nickel spinneret attached to the cell by a stainless steel gooseneck tube bent at an angle of 90° so that the dope is jetted horizontally and at 90° to the axis of the spinning cell. The spinneret has about 175 round holes of 0.001 in. (0.025 mm.) diameter, each. The filaments are extruded through about 70 cm. of a water bath (cooled to 0–4°C.) after which they are wound up at about 24 ft./min. (7.3 m./min.). The pressure on the piston in the cell is 300 lb./in.$^2$ (21 Kg./cm.$^2$). After the filaments are boiled off in distilled water for two successive 15-min. intervals and dried, they exhibit the following filament tensile properties: T/E/Mi: 3.2/63/77; sonic velocity is 2.59 km./sec. After these filaments are drawn 1.6X at 50 ft./min. (15 m./min.) through a heated tube (Device D) in which the central 2 in. portion (5.08 cm.) is at a temperature of 705°C., the following filament tensile properties are exhibited: T/E/Mi/Den.: 8.0/1.2/800/0.55; the filaments have high crystallinity and an orientation angle of 13°.

EXAMPLE 44

This example illustrates the wet spinning of an anisotropic HF dope comprising poly(p-phenyleneterephthalamide).

Poly(p-phenyleneterephthalamide) (28 g., $\eta$inh = 4.0, prepared by the general procedures shown herein) is combined with 110 ml. of anhydrous HF as in Example 40 to form an anisotropic, stir opalescent dope containing 20 percent by weight of the polymer. This dope is placed in the cell described in Example 40 and is extruded as in Example 43 through a 100-hole spinneret, each hole being 0.0025 in. (0.063 mm.) in diameter. The filaments are guided through a water bath (6°C.) for a distance of 210 cm. after which they are wound up at 232 ft./min. (71 m./min.). Pressure on the piston in the cell is 130–136 lb./in$^2$. (9.1–9.6 kg./cm.$^2$). After the filaments are washed overnight in running water and dried, they exhibit the following filament tensile properties: T/E/Mi/Den. 8.7/5.4/260/1.72; the filaments exhibit medium crystallinity and an orientation angle of 21°; sonic velocity is 6.35 km./sec. After these filaments are drawn 1.05X at 50 ft./min. (15 m./min.) through a nitrogen-filled, heated tube (Device C) in which the central 2-in. portion (5 cm.) is at a temperature of 562°C. the following filament tensile properties are exhibited: T/E/Mi: 17.1/2.2/817; the filaments have high crystallinity and an orientation angle of 11°.

EXAMPLE 45

This example illustrates the wet spinning of an anisotropic, HF dope comprising poly(p-benzamide).

Poly(p-benzamide) (28 g., $\eta$inh = 2.9, prepared by the general procedures shown herein) is combined with 110 ml. of anhydrous HF as in Example 40 to form an anisotropic stir opalescent dope. This dope is placed in the cell described in Example 40, modified for wet spinning as in Example 43. The dope is extruded through a 100-hole spinneret, each hole being 0.0025 in. (0.063 mm.) diameter, into a water bath (6°C.). The filaments are guided through the bath for 210 cm. and wound up at 265 ft./min. (80.8 m./min.). Pressure on the piston in the spinning cell is 100 lb./in.$^2$ (7.03 Kg./cm.$^2$). After these filaments are washed over the weekend in running water and dried, they exhibit the following filament tensile properties: T/E/Mi: 6.2/4.7/304; filaments exhibit medium crystallinity, and an orientation angle of 20°; sonic velocity is 6.37 km./sec. These filaments are then immersed in water and drawn at the rate of 50 ft./min. (15.2 m./min.) through a tube (Device C) heated in its central 2 in. (5.8 cm.) portion to a temperature of 580°C.; draw ratio is 1.06X. The filaments exhibit the following tensile properties: T/E/Mi: 14.2/2.4/802; the filaments have high crystallinity, and an orientation angle of 11°; sonic velocity is 9.32 km./sec.

EXAMPLE 46

This example illustrates the wet spinning an an anisotropic, HF dope comprising poly(p-benzamide).

Poly(p-benzamide) (28g., ηinh = 3.7, prepared by general procedures shown herein) is combined with 110 ml. of anhydrous HF as in Example 40 to give an anisotropic, stir opalescent dope containing 20 percent by weight polymer. This solution is placed in the cell described in Example 40, modified for wet spinning as shown in Example 43. The dope is extruded as in Example 45 and the resultant filaments wound up at 300 ft./min. (91.4 m./min.). The pressure on the piston in the spinning cell is about 138 lb./in.$^2$ (9.7 kg./cm.$^2$). After the filaments are washed overnight in running water and dried, they exhibit the following filament tensile properties: T/E/Mi/Den.: 7.2/3.2/350/1.45; they exhibit medium crystallinity and an orientation angle of 27°. The filaments are drawn 1.03X at 50 ft./min. (15.2 m./min.) through a heated tube (Device C) in which the central 2-in. portion (5 cm.) is at a temperature of 560°C.; the filaments exhibit the following tensile properties: T/E/Mi: 14.0/2.4/626; they exhibit high crystallinity and an orientation angle of 17°.

EXAMPLE 47

This example illustrates the wet spinning of an anisotropic, HF dope comprising copoly [(p-benzamide)/p-phenylene terephthalamide)] (90/10).

The above-described copolyamide (30.0 g., ηinh = 3.7 prepared by general procedures shown herein) is combined with 110 ml. of anhydrous HF to form an anisotropic, stir opalescent dope containing 21 percent by weight of the copolyamide. This dope is extruded as in Example 43 (water bath cooled to 2°C. and contains 0.05 percent by wt. detergent) with the extruded filaments being snubbed on a pigtail guide and twisted 90° with respect to the threadline direction at a 3-in. (7.62 cm.) distance from the spinneret. Pressure on the spinning cell is 96 lb./in.$^2$ (6.75 kg./cm.$^2$) and the filament are wound up at 265–315 ft./min. (80.8–96 m./min.). After these filaments are washed and dried they exhibit the following tensile properties: T/E/Mi/Den.: 11.6/3.0/410/1.24; the filaments exhibit medium crystallinity and an orientation angle of 22°. After these filaments are drawn 1.03X at the rate of 16 ft./min. (4.88 m./min.) through a heated tube (Device C) whose central 2-in. (5 cm.) portion is at 544°C., they exhibit the following tensile properties: T/E/Mi: 12.2/2.0/600; the filaments exhibit high crystallinity and an orientation angle of 12°.

EXAMPLE 48

This example illustrates the wet spinning of an isotropic HF dope comprising poly(p-benzamide).

Poly(p-benzamide) (10 g., ηinh = 2.9, prepared by general procedures shown herein) is comined with 90 ml. of anhydrous HF as in Example 40 to form a viscous, clear, isotropic dope containing 10 percent polymer by weight. This dope is placed in the cell described in Example 40 and is extruded through a water bath (0–6°C.) as in Example 43 through a 60-hole platinum spinneret, each hole being 0.003 in. (0.076 mm.) diameter. The threadline is guided around on rollers such that the path length in the bath is 210 cm. The pressure on the piston in the cell is 220 lb./in.$^2$ (15.5 kg./cm.$^2$) and the yarn is wound up at 44 ft./min. (13.4 m./min.). After the yarn is rinsed in running water for 1 hr. and dried, it exhibits the following filament tensile properties; T/E/Mi/Den.: 2.8/28/83/2.4 and a sonic velocity of 3.33 km./sec. After a sample of the rinsed as-extruded wet yarn is drawn at the rate of 48 ft./min. (14.6 m./min.) through a heated tube (Device C) whose central 2 in. (5.08 cm.) portion is at a temperature of 593° C. (draw ratio is 1.37X), the yarn exhibits the following filament tensile properties: T/E/Mi: 8.8/1.8/621; the filaments are highly crystalline and exhibit an orientation angle of 17°

EXAMPLE 49

This example illustrates the preparation of poly(p,p'-biphenylene terephthalamide) and an anisotropic oleum dope thereof.

Polymer Preparation: In a flamed-out 100 ml. tubular flask (equipped with a stirrer and openings for flushing with nitrogen and introduction of materials) are placed 25 ml. of hexamethylphosphoramide, 25 ml. of N-methylpyrrolidone-2, and 1.84 g. of benzidine. The mixture is stirred until a solution forms; the solution then is cooled with solid carbon dioxide and terephthaloyl chloride (2.03 g.) dissolved in 10 ml. of dry tetrahydrofuran is added quickly with stirring. In one minute the mixture becomes highly viscous and unstirrable. The mixture is allowed to stand 16 hrs. at room temperature, after which the polymer is precipitated by being agitated with water in a blender with alternate filtration and then washed one time each with alcohol and ether. The vacuum dried polymer weighs 2.96 g. and has an inherent viscosity of 1.45.

Depe Preparation: The polymer (1.9 g.) is stirred mechanically in a closed testtube with 7.0 ml. of 100.95 percent sulfuric acid. The dissolving polymer at first forms a clear viscous dope; but as dissolution continues, the dope becomes hazy and smooth. The dope exhibits stir opalescence and depolarizes planepolarized light as a thin layer under a cover glass on a microscope slide.

EXAMPLE 50

This example illustrates the preparation of poly(1,5-naphthylene terephthalamide) and an anisotropic oleum dope thereof.

Polymer Preparation

Terephthaloyl chloride (10.15 g., 0.05 mole) is added at once to a warm (i.e., 35°C.) slurry of 1,5-naphthalenediamine (7.90 g., 0.05 mole; sublimed) in a mixture of hexamethylphosphoramide (60 ml.) and N-methyl-2-pyrrolidone (30 ml.) contained in a 500 ml. resin-making kettle equipped with an air-driven stirrer and a calcium chloride drying tube. A stiff mass is obtained in 45 sec. and is allowed to stand overnight at room temperature. The mass is then combined with water and stirred at high speeds in a gallon-size (3.785 liter) blender. The polymer is collected, washed three times with water by being stirred in a blender, and isolated by being filtered on a sintered-glass coarse-pore Buchner funner, and is dried overnight in a vacuum oven at about 70°C. The yield of polymer is 13.60 g. (94.5 percent of theoretical). The inherent viscosity, measured as a solution of 125 mg. of polymer in 25.0 ml. of 95–98 percent (by weight) sulfuric acid, is 2.22.

Anisotropic Dope Preparation

A mixture of 2.5 g. of the above polymer and 22.5 g. of fuming (1.3 percent free $SO_3$) sulfuric acid is mixed anhydrously with a mechanically driven paddel-type stirrer in a 200 ml. deep-well flask while cooling with an ice/water bath. The mixture is stirred for several hours (i.e., 4 hr.) during which time the cooling bath is allowed to warm to room temperature. The resulting fluid dope exhibits stir-opalescence and depolarizes plane-polarized light.

EXAMPLE 51

This example illustrates (1) the preparation of a random copolyamide comprised of equimolar amounts of random repeating units selected from the group of

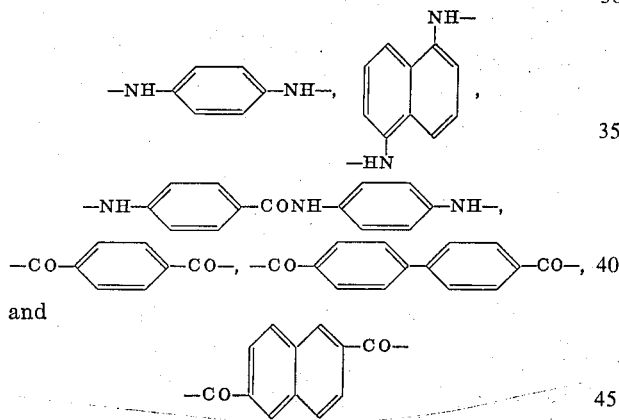

(2) an anisotropic dope of the copolyamide, and (3) fibers of the copolyamide.

Polymer Preparation

A solution of 1.08 g. (0.01 mole) p-phenylenediamine, 1.58 g. (0.01 mole) 1,5-naphthalenediamine and 2.27 g. (0.01 mole) p,p'-diaminobenzanilide in a mixture of 60 ml. of hexamethylphosphoramide and 30 ml. of N-methylpyrrolidone-2 is prepared in a blender jar in a drybox. A mixture of 2.03 g. (0.01 mole) terephthaloyl chloride, 2.79 g. (0.01 mole) 4,4'-bibenzoyl dichloride and 2.53 g. (0.01 mole) 2,6-naphthoyl dichloride is added quickly with very rapid stirring. The resulting very viscous clear solution is stirred for 15 min. and is then left undisturbed for 16 hrs. The polymer is worked up in water; it is washed in a blender four times with water, one time each with acetone and alcohol, and is dried in a 100°C. vacuum oven. The yeild is 9.5 g. (94 percent); ηinh is 2.93.

Dope Preparation

A spin dope is prepared from the above polymer by combining at room temperature 4 g. of polymer and 36 g. of 99.2 percent $H_2SO_4$. A very viscous dope results which depolarizes plane-polarized light.

Spinning and As-Extruded Properties

Wet spinning is done from a motor-driven syringe fitted with a spinneret. Because of the high viscosity of the dope a specially constructed heavy face spinneret is used having twenty holes of 0.003 inch (0.076 mm.) diameter each. The filaments are coagulated in room temperature water contained in a metal trough. The length of immersion is 33 in. (83.8 cm.). The filaments are wound up at 47 ft./min. (14.3 m./min.) while the bobbin is rotated with the lower face in a pan of water. The yarn is then soaked in water 16 hrs. and dired. As-extruded yarn properties are: T/E/Mi/Den. 3.2/9.7/132/97. The yarn is amorphous and has an orientation angle of ≈50° and a sonic velocity of 3.82 km./sec.

Fiber Heat Treatment and Properties

The wet yarn is drawn 1.1X through a hot tube (Device A) at 380°C. with an input speed of 12.5 ft./min. (3.81 m./min.). The drawn yarn has the following properties: T/E/Mi/Den. 6.9/2.1/413/74. It has trace crystallinity and an orientation angle of 24° and a sonic velocity of 6.37 km./sec.

EXAMPLE 52

This example illustrates (1) the preparation of a random copolyamide comprised of equimolar amounts of random repeating units selected from the group of

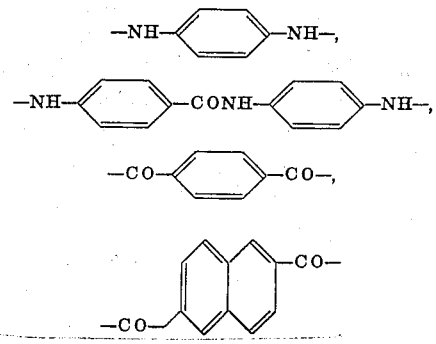

and (2) an anisotropic dope of the copolyamide, and (3) fibers of the copolyamide.

Polymer Preparation

A solution of 1.62 g. (0.015 mole) p-phenylenediamine and 3.35 g. (0.015 mole) 4,4'-diaminobenzanilide in a mixture of 60 ml. of hexamethylphosphoramide and 30 ml. of N-methylpyrrolidone is prepared in a blender jar in a drybox. A mixture of 3.045 g. (0.015 mole) terephthaloyl chloride and 3.795 g. (0.015 mole) 2,6-naphthaloyl chloride is added quickly with very rapid stirring. In two minutes a clear unstirrable gel results. After standing for 2 hours, the polymer is worked up in water, washed in the blender four times with water, one time each with acetone and alcohol, and is dried in a 100°C. vacuum oven. The yield is 9.5 g. (99 percent), ηinh is 2.77.

Dope Preparation

A dope is prepared from the above polymer by combining at room temperature 2 g. of polymer and 18 g. of 99.2 percent $H_2SO_4$. A viscous anisotropic dope results after 6 hours of intermittent stirring; this dope shows stir opalescence.

Spinning and As-extruded Properties

Wet spinning is done from a motor-driven syringe which is fitted with a spinneret having 20 holes of 0.003 in. (0.076 mm.) diameter each. The filaments are coagulated in room temperature water contained in a metal trough. The length of immersion is 33 in. (81 cm.). The filaments are wound up at 71.5 ft./min. (21.7 m./min.) while the bobbin is rotated with the lower face in a pan of water. The fiber is then soaked in water for 16 hrs. and dried. As-extruded yarn properties are: T/E/Mi/Den. 2.14/17.3/78/176. The yarn is amorphous and has an orientation angle of ≈60°.

Fiber Heat Treatment and Properties

The wet fiber from above is drawn 1.1X through a hot tube (Device A) at 475°C. with an input speed of 12.5 ft./min. (3.81 m./min.). The drawn yarn has the following properties: T/E/Mi/Den. 6.8/0.9/698/72.7. It has medium crystallinity, an orientation angle of 12° and a sonic velocity of 8.84 km./sec.

EXAMPLE 53

This example illustrates (1) the preparation of a random co(polyamide-oxadiazole) comprised of repeating units selected from the group of

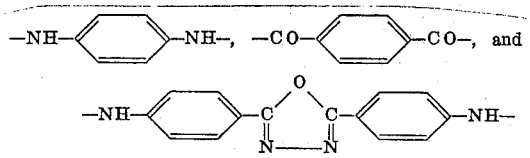

(relative ratio of 3:4:1, respectively), (2) an anisotropic oleum dope of the co(polyamide-oxadiazole), and (3) fibers of the co(polyamide-oxadiazole).

Polymer Preparation

A solution of 3.24 g. (0.03 mole) p-phenylenediamine and 2.52 g. (0.01 mole) 2,5-bis(p-aminophenyl)-1,3,4-oxadiazole in a mixture of 90 ml. of hexamethylphosphoramide and 45 ml. of N-methylpyrrolidone is prepared in a blender jar in a drybox. Terephthaloyl chloride, 8.12 g. (0.04 mole) is added at once with rapid stirring. A very viscous, clear solution results which in 2 minutes becomes unstirrable. It is left undisturbed for 16 hrs. The polymer is worked up in water and is washed in the blender four times with water, one time each with acetone and alcohol, and is dried in a 100°C. vacuum oven; ηinh is 3.28.

Dope Preparation

A dope is prepared from the above polymer by combining 6 g. of polymer, 44 g. of 100.7 percent H₂SO₄ and 10 g. of fuming (20 percent free SO₃) sulfuric acid. This mixture is stirred until a very stiff gel results. It is left undisturbed for two weeks. Although the dope appears to be a fracturable gel, it can be poured slowly into the spinning cell. The dope depolarizes plane-polarized light.

Spinning and As-Extruded Properties

The dope from above is transferred into the spinning cell and is centrifuged for one hour. Wet spinning is done from a motor driven syringe fitted with a heavy face spinneret having 20 holes of 0.003 in. (0.076 mm.) diameter each. The filaments are coagulated in room temperature water contained in a metal trough. The length of immerion is 33 in. (83.8 cm.). The filaments are wound up at 26.5 ft./min. (8.1 m./min.) while the bobbin is rotated in a pan of water. The yarn is then soaked in distilled water for 16 hrs. and dried. As-extruded yarn properties are: T/E/Mi/-Den.2.4/14.4/94.5/103 (10 percent rate of extension). The yarn has trace amounts of crystallinity, an orientation angle of 50° and a sonic velocity of 3.35 km./sec.

Heat Treatment and Properties

The wet yarn from above is drawn 1.1X through a hot tube (device A) at 475°C. with an input speed of 12.5 ft./min. (3.81 m./min.). The drawn yarn has the following properties: T/E/Mi/Den.:3.8/0.9/500/57. It has medium crystallinity and an orientation angle of 15°, and a sonic velocity of 6.80 km./sec.

EXAMPLE 54

This example illustrates the preparation of high modulus poly(2-chloro-p-phenylene terephthalamide) fibers from an optically anisotropic dope comprising about 20 percent by weight of the polyamide.

To a stirred solution of 2-chloro-p-phenylenediamine (35 g., 0.245 mole) dissolved in 425 ml. of hexamethylphosphoramide, cooled in a bath of ice and water, is added terephthaloyl chloride (49.7 g., 0.245 mole). Almost immediately a precipitate forms as a wet paste. The reaction is permitted to stand overnight, after which the polymer is collected and agitated with water in a blender. The polymer is dried for several days at 78°C. in a vacuum oven. There is obtained poly(2-chloro-p-phenylene terephthalamide) 60 g., ηinh = 1.13.

A dope containing 17.2% by weight polymer and 2.7 percent by weight salt is prepared by combining 5 g. of poly(2-chloro-p-phenylene terephthalamide), prepared above, with 25 ml. of a solution obtained by mixing 100 ml. of N,N-dimethylacetamide and 3.1 g. of lithium chloride. The dope is allowed to stand at room temperature for a week or longer, during which time it separates into an isotropic upper layer and an anisotropic lower layer (i.e., for the lower layer, T > 70, as determined by the method described herein); volume ratio is aobut 2.6/1 (upper/lower). The layers are isolated and the anisotropic lower layer is extruded at room temperature through a 5 hole spinneret, each hole 0.003 inch (0.076mm.) in diameter, into a water bath maintained at 21°C. The filaments produced are wound up at 57 ft./min. (17.4 m./min.). After the filaments are soaked in water and dried, they exhibit the following properties: T/E/Mi (boiled-off sample): 3.5/1.8/234; orientation angle is 39.2° (Method Three). When this yarn is passed over a 425°C. pin, filament T/E/Mi (boiled-off sample) become: 2.4/0.7/318; orientation angle is 28° (Method Three).

Physical properties and composition data for each of the above-described layers are tabulated below in Table V. Unless specified otherwise, determinations are made at 25–26°C.

TABLE V

| | Upper Layer | Lower Layer |
|---|---|---|
| Density, g./ml. | 0.97 | 1.01 |
| Ref. Index, $n_D^{25}$ | 1.4725 | 1.4676 |
| Polymer content, g./ml. | 0.112 | 0.179 |
| Polymer η inh | 0.43 | 1.44 |
| LiCl content, g./ml. | 0.0260 | 0.0238 |

EXAMPLE 55

This example illustrates the preparation of an optically anisotropic spin dope comprising about 10 percent by weight poly(2-chloro-p-phenylene terephthalamide) and the preparation of high modulus fibers therefrom.

A dope containing 9.5 percent by weight polymer and 1.5 percent by weight salt is prepared by combining 5 g. of poly(2-chloro-p-phenylene terephthalamide), prepared in Example 54 with 50 ml. of a solution obtained by mixing 100 ml. of N,N-dimethylacetamide and 1.6 g. of lithium chloride. The dope is allowed to stand at room temperature for a week or longer, during which time it separates into 2 fluid layers or phases of approximately equal volume, the upper of which is isotropic and the lower anisotropic (i.e., for the lower layer, T > 70, as determined by the method described herein). The layers are isolated and the anisotropic lower layer is extruded at room temperature through a one-hole spinneret, the hole being 0.005 inch (0.127 mm.) in diameter, into a water bath maintained at 21°C. The resultant filament is wound up at 72 ft./min. (22 m./min.) After the filament is soaked in water and dried, it exhibits the following properties: T/E/Mi (boiled-off sample) 4.6/4.8/198; orientation angle is 43.9° (Method Three). When this filament is passed over a 425°C. pin, T/E/Mi (boiled-off sample) become: 3.1/1.3/274; orientation angle is 28° (Method Three).

Physical properties and composition data for each of the above-described layers are tabulated below in Table VI. Unless specified, otherwise, determinations are made at 25–26°C.

TABLE VI

| | Upper Layer | Lower Layer |
|---|---|---|
| Density, g./ml. | Not taken | 0.99 |
| Ref. Index, $n_D^{25}$ | 1.4584 | 1.4544 |
| Polymer content, g./ml. | 0.080 | 0.098 |
| Polymer, $\eta$ inh | 0.74 | 1.61 |
| LiCl content, g./ml. | 0.0120 | 0.0146 |

In a manner similar to that described above, another spinning dope is prepared, i.e., 5 g. of the polymer in 50 ml. of the amide-salt mixture. The dope is permitted to stand for about a week after which it is shaken to combine the layers into a turbid dope which is not optically clear; T > 50 as determined by the method described herein. This dope is immediately extruded at room temperature through two holes of a spinneret, each hole 0.005 inch (0.0127 cm.) in diameter, into a water bath kept at 23°C. The filaments are wound up between 32–44 ft./min. (9.8–13.5 m./min.). After the filaments are soaked in water and dried, they exhibit the following properties: T/E/Mi (boiled-off sample); 4.1/2.7/223; orientation angle is 38.9° (Method Three).

EXAMPLE 56

This example illustrates the preparation of a birefringent spinning dope of poly(p-phenylene terephthalamide) comprising a mixture of anisotropic and isotropic phases.

To a solution of p-phenylenediamine (31.08 g., 0.287 mole) in a mixture of 360 ml. of hexamethylphosphoramide and 180 ml. of N-methylpyrrolidone-2 is added 3.36 g. of p-aminobenzoic acid, using water bath cooling. To this cooled solution is added terephthaloyl chloride (60.90 g., 0.300 mole). The reaction mixture is stirred overnight, then combined with water in a blender to precipitate polymer. The product is washed with water and dried in a vacuum oven at 65°C. The product is then combined with acetone in a blender, the mixture filtered, and the product collected and dried at 65°C. in a vacuum oven. There is obtained a quantitative yield of poly(p-phenylene terephthalamide) ($\eta$inh = 1.32).

A dope containing 7.96 percent by weight polymer and 1.24 percent by weight salt is prepared by first combining poly(p-phenylene terephthalamide) (18 g., prepared as above); hexamethylphosphoramide (160 ml.), N-methylpyrrolidone-2 (40 ml.), and lithium chloride (2.8 g.). The ingredients are mixed with a shear-disc stirrer and are cooled in a bath of ice and water. After the ingredients stand overnight, with cooling, there is produced a smooth, free-flowing, homogeneous paste. The latter is heated to 60°C. to produce a fluid dope (slightly turbid when allowed to stand unheated) which exhibits opalesence when stirred.

This dope, when heated to about 35°C. to become fluid, depolarizes plane-polarized light when viewed with a polarizing microscope, i.e., a bright field is observed with the microscope.

The apparatus by which filaments are prepared from this dope comprises a solution cell to which is connected an s-shaped tube containing a 20-hole spinneret in its lower end (each spinneret hole is 0.004 inch, 0.01 cm., in diameter). After the hot (60°C.) dope is poured into the solution cell, the cell and the s-shaped tube are warmed with a heat gun until the dope begins to flow from the spinneret orifices. The apparatus is then positioned such that the spinneret discharges in a horizontal direction into a water bath kept at 60°C. The s-shaped tube is partially immersed in the bath to assist in keeping the dope warm prior to extrusion. The dope is extruded at a pressure of 20 lb./in.$^2$ (0.14 Kg./cm.$^2$) and the resultant filaments are wound up on bobbins at 72 ft./min. (22 m./min.), care being taken to keep the filaments taut at the spinneret face. The bobbins are washed in cold water for several hours before being dried in air at room temperature. Filaments from one of the bobbins exhibit the following properties: T/E/Mi/Den (boiled off sample): 3.7/4.0/194/3.7; orientation angle is 39° (Method Three).

When the above-cited procedure is repeated, with the change that the spinneret holes are each 0.003 in. (0.076 mm.) in diameter, there are obtained poly(p-phenyleneterephthalamide) filaments having the following properties: T/E/Mi/Den. (boiled-off sample): 3.2/3.2/219/2.54; orientation angle is 37.3° (Method Three).

EXAMPLE 57

This example illustrates the wet-spinning of an optically anisotropic dope to form poly(p-phenylene terephthalamide) filaments whose properties are significantly enhanced by a subsequent heat treatment.

Poly(p-phenylene terephthalamide) (18 g., $\eta$inh = 1.32, prepared in Example 56), hexamethylphosphoramide (134 ml.), N-methylpyrrolidone-2 (66 ml.), and lithium chloride (2.8 g.) are combined and stirred at −10°C. for 2–3 hrs. to produce a thick mobile paste which is allowed to warm slowly to room temperature. A fluid dope is produced by continuously stirring the material for three days; the dope exhibits opalesence when stirred; T = 46 as measured herein.

The dope, containing 7.95 percent by weight polymer and 1.24 percent by weight salt, is extruded at 20 lb./in.$^2$ (0.14 kg./cm.$^2$) through a 20-hole spinneret, each hole being 0.003 inch (0.076 mm.) in diameter, into a water bath kept at 26°C. The resultant filaments are wound up at 36 ft./min. (11 m./min.) on bobbins which are washed in cool water for 3 hrs. before being dried in air at room temperature. Yarn from one bobbin exhibits the following properties: T/E/Mi/Den. (boiled-off sample): 1.93/2.3/140/45.7; orientation angle is 42.5° (Method Three). A sample of this yarn which has been passed at 20 ft./min. (6.1 m./min.) through a nitrogen-filled tube 1 ft. (0.3 m.) in length and which is heated at the center to 560°C. exhibits the following properties: T/E/Mi/Den. (boiled-off sample): 3.94/1/414/38.4; orientation angle is 24° (Method Three).

EXAMPLE 58

This example illustrates the in situ preparation of an anisotropic dope of poly(p-benzamide) in N,N,N',N'-tetramethylurea.

p-Aminobenzoyl chloride hydrochloride (400 g.) is added to 2 l. of N,N,N',N'-tetramethylurea containing 2 g. of p-aminobenzoic acid, maintained at 5°C. The reaction mixture is stirred with external cooling for about 15 min., then stirred for about 1.75 hr. at autogenous temperature, after which lithium hydroxide (90 g.) is added. The reaction mixture is heated at 125°C. for 3 min., then stirred at autogenous temperature for 2 hrs. to produce a dope containing 10.8 percent polymer (a sample of polymer isolated from the dope exhibits inherent viscosity of 1.40). This dope, now containing about 6% lithium chloride, exhibits a transmittance value (T) of 57, as measured herein.

Poly(p-benzamide) isolated from a similarly prepared dope, but one obtained using only 0.35 g. of p-aminobenzoic acid, exhibits an inherent viscosity of 1.65. This dope exhibits a transmittance value (T) of 58, as measured herein.

EXAMPLE 59

This example illustrates the in situ preparation of an unneutralized anisotropic spin dope comprising poly(p-benzamide). In the final dope there are present 2 moles of hydrogen chloride for each mole of p-aminobenzoyl chloride hydrochloride used as a monomer.

To 2 l. of N,N,N',N'-tetramethylurea to which has been added 0.92 g. of p-aminobenzoic acid, cooled at ice temperature, are added 256 g. of p-aminobenzoyl chloride hydrochloride. The reaction mixture is stirred at bath temperature for about 55 min. to produce a viscous dope. Stirring is halted and the dope, containing about 11 percent by weight polymer, is permitted to stand overnight at room temperature in a nitrogen atmosphere prior to being extruded into fibers. A sample of poly(p-benzamide) isolated from the dope exhibits inherent viscosity of 1.1. The dope exhibits a transmittance value (T) of 55, as measured herein.

EXAMPLE 60

This example illustrates the preparation of an anisotropic dope comprising a random copolymer of poly(p-benzamide/m-benzamide) (95/5) in a mixture of N,N-dimethylacetamide/lithium chloride (95/5).

To N,N,N',N'-tetramethylurea (150 ml.), stirred and cooled in an ice bath, is added a mixture of p-aminobenzoyl chloride hydrochloride (28.5 g.) and m-aminobenzoyl chloride hydrochloride (1.5 g.) over 15 min. The reaction mixture is cooled on ice and stirred for 1 hr., then is stirred for 1.5 hr. at room temperature to produce a stirrable dope. After 20 hrs. at room temperature a clear gel is present. The gel is combined with water in a blender to precipitate the copolymer. The product is isolated, washed, and dried to give 15.5 g. of poly(p-benzamide/m-benzamide) (95/5), $\eta$inh = 1.12.

A dope containing about 10 percent by weight copolymer is prepared by adding a sufficient amount of the above-prepared copolyamide to a mixture of N,N-dimethylacetamide/lithium chloride (95/5 by weight). The ingredients are stirred and heated to 100°C. for 10–15 min., then are stirred at room temperature until a dope free of undissolved polymer is formed. The dope exhibits a transmittance value (T) of 11, measured at room temperature as described herein.

EXAMPLE 61

This example illustrates the in situ preparation of anisotropic spin dopes of poly(p-benzamide), using lithium carbonate to neutralize the dope.

To 200 g. of p-aminobenzoyl chloride hydrochloride are added 1,310 g. of N,N,N',N'-tetramethylurea at about 7°C. This reaction mixture is stirred for about 15 min. at room temperature. After a total of about 80 min. (with stirring) the temperature of the reaction mixture reaches 40°C. The mixture is stirred an additional 28 min. at 40°C., then is stirred rapidly during which time the clarity decreases and lithium carbonate is added in 2 portions (50 g., 28 g.) and the mixture is stored at 85°C. Following this, 2 g. of p-aminobenzoic acid in 30 ml. of N,N,N',N'-tetramethylurea are added, followed by 140 g. more of N,N,N',N'-tetramethylurea. The reaction mixture is heated to about 80–90° by an oil bath at 130°C. and about 225 g. of liquid is removed by subjecting the heated mixture to vacuum. An additional 72 g. of N,N,N',N'-tetramethylurea are added and the reaction mixture heated at 120°C. for four days and centrifuged to remove unreacted $Li_2CO_3$. The reaction mixture is concentrated to produce a dope containing about 9.5 percent by weight poly(p-benzamide) which exhibits an inherent viscosity of 1.74. This dope exhibits a transmittance value (T) of 21, measured at room temperature as described herein.

EXAMPLE 62

This example further illustrates methods of (1) preparing poly(p-benzamide) useful in forming the dopes of this invention and (2) preparing related dopes.

Part A p-Aminobenzoyl chloride hydrochloride (450 g.) is added all at once to 2,200 ml. of dry N,N,N',N'-tetramethylurea, precooled on ice, to instantly form a solution. This solution is stirred at ice bath temperature for 2 hrs. The cooling bath is then removed and the solution stirred for 2 additional hrs., during which time it becomes warm and slowly forms a solid gel. The gel is permitted to stand overnight after which it is washed twice with tap water and once with 2B alcohol in a blender (the gel is divided into 3 portions for these washing operations). The isolated polyamide is dried at 80° in a vacuum oven under a nitrogen atmosphere; $\eta$ inh is 1.83. The sample is comminuted by being ball milled for three days.

When this synthesis is repeated, except that the gel is permitted to stand for only 2 hrs. after formation, the isolated polyamide exhibits an inherent viscosity of 1.74. A similar synthesis produces a polymer exhibiting an inherent viscosity of 1.53 and a peak height ratio of 0.75.

Part B

Into a mixture of 250 ml. of N,N-dimethylacetamide and 15 g. of lithium chloride are added 30 g. of poly(p-benzamide) ($\eta$ inh = 1.5; prepared in Part A; about one half the polymer comminuted by ball milling). The mixture contains 10.8 weight percent of the polyamide and 5.4 weight percent of the salt. Swelling occurs instantaneously. The swelled mass is heated to 100°C. to produce a dope suitable for spinning.

Part C

Into a mixture of 200 ml. of N,N-dimethylisobutyramide and 13 g. of lithium chloride are added, at room temperature, 20 g. of poly(p-benzamide) ($\eta$ inh = 1.39, prepared by the general method of Part A). The combined ingredients, containing 9.4 weight percent of the polyamide and 6.1 weight percent of the salt are stirred at autogeneous temperature until a marked viscosity increase is noted, after which they are frozen in a bath of solid carbon dioxide and acetone and subsequently allowed to warm up to room temperature during overnight standing. The ingredients are then heated to 110°C. and maintained thereat for about 2 hours to form a very viscous composition. The composition is frozen as before and permitted to warm up and stand over the weekend. The ingredients are subsequently heated with stirring in a bath maintained at 100°C. to produce a thick viscous dope.

Part D

A spinning dope is prepared by adding 15 g. of poly(p-benzamide) ($\eta$ inh = 1.20, comminuted by ball milling, prepared by the general procedure of Part A) to a mixture of 148 ml. of N-methylcaprolactam and 7 g. of lithium chloride at room temperature. This combination, containing 8.8 weight percent of the polyamide and 4.1 weight percent of the salt, is stirred at room temperature until swelling occurs. The swollen mass is first cooled on a mixture of solid carbon dioxide and acetone and is then heated to 110°C. to produce a dope.

Part E

Lithium chloride (10 g.) is dissolved at 55°C. in 200 ml. of dry N-methylpyrrolidone-2. Poly(p-benzamide) (20 g., $\eta$ inh = 1.6; prepared by the general procedure of Part A) is added thereto at 100°C., with vigorous stirring. The mixture contains 8.9 weight percent of the polyamide and 4.4 weight percent of the salt. In about 1 hour a viscous composition results. This is stirred overnight at 100°C. to produce a free flowing dope.

PART F p-Aminobenzoyl chloride hydrochloride (40 g.) is added to 200 ml. of N,N'-dimethylethyleneurea at ice temperature to form a clear solution. The cooling bath is removed after 20 minutes whereupon a thick mass forms. After 1 hour, lithium hydroxide (10 g.) is added and the mixture heated to 110°C. to again produce a clear, easily stirrable composition. A sample of the polymer, precipitated by addition of water, has an inherent viscosity of 1.36. This composition contains about 9.7 weight percent of the polyamide and about 6.9 weight percent of lithium chloride.

Each of the homopolymeric poly(p-benzamide) samples of Parts A to F, inclusive, exemplify the preferred composition for use in the dopes and/or fibers of this invention, i.e., each polymer has a PHR less than about 0.86 and satisfies the Sedimentation Test.

EXAMPLE 63

Shown in the following Table VII are data determined by the previously-described procedures on various anisotropic dopes of this invention comprising poly(p-benzamide). The column labeled "Source" indicates either the specific Part of Example 62 in which the dope is prepared or else a Part of Example 62 whose general procedure is employed to prepare the dope. The symbol T is used for the value obtained from the expression $2(I^{s'}_{+}/I^{s'}_{-} - I^{c'}_{+}/I^{c'}_{-}) \times 100$.

TABLE VII

Anisotropy of the Dopes

| Item | Ex. 62 Source | Poly(p-benzamide) $\eta$ inh | Poly(p-benzamide) wt.% in composition | Amide or Urea | Wt.% LiCl in composition | T** |
|---|---|---|---|---|---|---|
| 1 | F | 1.28 | 8.2 | a | 4.9 | 42 |
| 2 | D | 1.26 | 8.7 | b | 2.5 | 68 |
| 3 | C | 1.39 | 9.4 | c | 6.1 | 64 |
| 4 | B* | 1.18 | 7.4 | d | 4.6 | 4.2 |
| 5 | B* | 1.18 | 8.2 | d | 4.6 | 29 |
| 6 | E | 1.10 | 8.0 | e | 6.0 | 21 |
| 7 | E | 1.10 | 8.0 | e | 4.0 | 47 |
| 8 | E | 1.18 | 12.7 | d | 5.1 | 68 |
| 9 | B* | 1.18 | 16.7 | d | 5.0 | 68 |
| 10 | B* | 1.18 | 13.8 | d | 4.3 | 78 |

Legend
a = N,N'-dimethylethyleneurea
b = N-methylcaprolactam
c = N,N-dimethylisobutyramide
d = N,N-dimethylacetamide
e = N-methylpyrrolidone-2

Footnotes
*Polymer dissolved at room temperature.
**All measurements made at room temperature.

EXAMPLE 64

This example illustrates a phase diagram for a N,N-dimethylacetamide lithium chloride dope.

Isolated poly(p-benzamide) having an inherent viscosity of 1.18 is prepared by the general procedure outlined in Example 62-A. Dopes are prepared, according to the general procedures previously outlined, by combining the polyamide, N,N-dimethylacetamide (containing about 0.2 to 2 percent of water) and lithium chloride in various concentrations, at room temperature, by high speed (3,000 to 4,000 r.p.m.) stirring with a serrated spiral blade 0.25 in. (0.635 cm.) in diameter in a 2 ml. tube, 0.375 in. (0.952 cm.) in diameter, without external heating. Small quantities of particles which resist solution are crushed manually, if necessary. Dope samples at various concentrations are examined by pressing each sample into a thin layer between a microscope slide and coverslip. These slides are viewed between crossed polarizers with or without magnification to determine whether the dopes contain a single isotropic phase, a single anisotropic phase, or an emulsion of these phases. The presence of any solid particulate polyamide in the dope sample is also determined in this manner.

The results of such an evaluation are shown in the phase diagram of FIG. I. Five regions are shown. Region 1 is completely isotropic with the polymer being completely dissolved therein. Region 2 is partially anisotropic; microscopic regions depolarize plane-polarized light. Region 3 is completely anisotropic. Region 4 is also completely anisotropic but contains solid particulate polyamide therein. The line between Regions 3 and 4 represents the maximum polyamide content, i.e., as the polyamide content increases above this point, dope becomes supersaturated, having solid polyamide therein. Region 5 is completely isotropic but contains solid particulate polyamide therein.

The phase diagram is determined based upon the appearance of the dope samples, as follows.

The dopes referred to as isotropic (Region 1) are clear and transparent, and appear as a structureless, dark field when viewed between cross-polarizers (as described above) with or without magnification.

The dopes referred to as partially anisotropic (Region 2) are emulsions of isotropic and anisotropic phases. At lower polyamide concentrations, the continuous phase is isotropic; at higher polyamide concentrations, the continuous phase is anisotropic. These dopes appear cloudy, often exhibit opalescence on stirring, and can be separated by centrifugation (or in some cases, by gravity). When the continuous phase is isotropic, the microscopic birefringent portions of these dopes appear as a multiplicity of bright areas of varying size and shape against a dark field when viewed under magnification (e.g., 400X) between crossed polarizers (as described above). When the continuous phase is anisotropic, the isotropic portions of these dopes appear as a multiplicity of small dark areas against a bright background when viewed under magnification (e.g., 400X) between crossed-polarizers (as described above).

The dopes referred to as completely anisotropic (Region 3) when viewed between crossed-polarizers (as described above), under magnification, (e.g., 400X) appear as a bright field with varying direction of birefringence. Threadlike lines, characteristic of nematic mesophases, are frequently seen. The field is depolarized at low or no magnification. On standing undisturbed, the bulk dope frequently becomes transparent and turns transluscent only on flow.

The dopes within Regions 4 and 5 are similar to dopes within Regions 3 and 1, respectively, but further contain solid particulate polyamide therein. Without magnification, these dopes may be undistinguishable from the emulsions in Region 2. However, at high magnification, (e.g., 790X) the particulate material in these dopes appears angular in shape and is not fluid. The non-fluid nature thereof may be seen by the fact that this material does not flow when pressure is placed upon the coverslip.

Regions 2 and 3 are highly preferred dopes. The as-extruded properties of fibers produced from these anisotropic dopes are generally superior to those produced from otherwise similar dopes which are isotropic or less anisotropic as the following example illustrates.

EXAMPLE 65

This example compares the as-extruded fiber properties of a fiber prepared from a highly anisotropic dope to those of a fiber prepared from a dope which is slightly anisotropic.

A poly(p-benzamide) dope is prepared in N,N-dimethylacetamide from p-aminobenzoyl chloride hydrochloride, using lithium carbonate, by general procedures, above. The resulting dope ($\eta$ inh = 2.36) is centrifuged in a Beckman "L" ultracentrifuge at 50,000 r.p.m. using a Ti 50 rotor for 21.5 hours. The two liquid layers are separated and extruded separately through a one-hole, 0.004-inch (0.01-cm.) spinneret into a coagulating bath of water maintained at 60–75°C. to produce filaments which, after being dried, exhibit the following tensile properties:

From the upper, slightly anisotropic layer,
T/E/Mi/Den. = 1.2/9.0/64/22.5.
From the lower, highly anisotropic layer,
T/E/Mi/Den. = 7.2/8.1/283/4.8.

EXAMPLE 66

This example (Table VIII) illustrates (1) the effect of the particular amide or urea media and (2) contrasts the effectiveness of lithium and calcium chlorides in preparing anisotropic poly(p-benzamide) dopes of this invention, each of which have the maximum polymer content found possible for the specific systems evaluated. The table also indicates the relative solvent power of calcium chloride systems contrasted to lithium chloride systems. As the table indicates, lithium chloride is generally better.

Isolated poly(p-benzamide) having an inherent viscosity of about 0.7 is prepared by the general procedures outlined in Example 62. Dopes of each of the amide or urea media containing about 4–9 percent by weight of lithium chloride or calcium chloride are prepared with polyamide being added until the maximum polyamide content is obtained. The salt is added in the amount which optimizes the polyamide content for that particular amide or urea medium. These date are presented in Table VIII.

TABLE VIII, Part 1

| Amide or Urea Medium | Maximum Polymer Concentration (weight %) | Lithium Chloride Concentration (weight %) |
|---|---|---|
| Acyclic Amides | | |
| N,N-dimethylacetamide | 20 | 5.3 |
| N,N-dimethylpropionamide | 28 | 5.1 |
| N,N-dimethylbutyramide | 30 | 6.5 |
| N,N-dimethylisobutyramide | 21 | 9.2 |
| N,N-dimethylmethoxyacetamide | 11 | 5.1 |
| N,N-diethylacetamide | 22 | 5.0 |
| Cyclic Amides | | |
| N-methylpyrrolidone-2 | 14 | 5.2 |
| N-methylpiperidone-2 | 11 | 5.4 |
| N-methylcaprolactam | 13 | 5.2 |
| N-ethylpyrrolidone-2 | 25 | 5.3 |
| Acetylated Cyclic Amines | | |
| N-acetylpyrrolidine | 17 | 5.4 |
| N-acetylpiperidine | 14 | 3.8 |
| Cyclic Ureas | | |
| N,N'-dimethylethyleneurea | 19 | 5.0 |
| N,N'-dimethylpropyleneurea | 18 | 5.1 |

TABLE VIII, Part 2*

| Amide or Urea Medium | Maximum Polymer Concentration (wt.%) | Calcium Chloride Concentration (wt. %) | Calcium Chloride System Relative to Lithium Chloride System* |
|---|---|---|---|
| Acyclic Amides | | | |

TABLE VIII, Part 2*-Continued

| Amide or Urea Medium | Maximum Polymer Concentration (wt.%) | Calcium Chloride Concentration (wt. %) | Calcium Chloride System Relative to Lithium Chloride System* |
|---|---|---|---|
| N,N-dimethylacetamide | 11.4 | 8.0 | A |
| Cyclic Amides | | | |
| N-methylpyrrolidone-2 | 19 | 7.6 | D |
| N-methylpiperidone-2 | 14 | 8.7 | C |
| N-ethylpyrrolidone-2 | 17 | 6.4 | A |
| Acetylated Cyclic Amines | | | |
| N-acetylpyrrolidine | 17 | 5.1 | B |
| N-acetylpiperidine | 15 | 7.7 | B |

*Legend
A Less effective        Difference <10%, >5%
B Equally effective     Within 3% of each other
C Slightly more effective  Difference <5%, >3%
D More effective        Difference <10%, >5%

EXAMPLE 67

This example illustrates the preparation of copolymers of poly(p-phenylene teraphthalamide) and poly(p-phenylene isophthalamide), dopes thereof, and fibers thereof. Fiber property contrasts between products from anisotropic and isotropic dopes are shown.

Copolymer Preparation:

Isophthaloyl chloride (sublimed) is added at once to a solution of p-phenylenediamine (5.40 g., 0.050 mole) in a mixture of hexamethylphosphoramide (65 ml.) and N-methyl-2-pyrrolidone (35 ml.) contained in a 500 ml. resin-making kettle equipped with an air-driven stirrer and a calcium chloride drying tube. The mixture is stirred for 2 min. and powdered terephthaloyl chloride (sublimed) is added at once with vigorous stirring. The temperature of the reaction mixture is moderated with a cool (i.e., 20°C.) water bath. Stirring is continued until an unstirrable mass is obtained. The mixture is allowed to stand overnight at room temperature, and is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70°C. The yields of polymer are tabulated in Table IX, as well as the inherent viscosities as measured from a solution of 125 mg. polymer in 25.0 ml. of 95–98 percent (by weight) sulfuric acid.

acid is mixed anhydrously with a mechanically driven, paddle-type stirrer in a 200 ml. round bottom flask while cooling with an ice/water bath. The mixture is allowed to stir overnight during which time the cooling bath is allowed to warm to room temperature. The resulting very viscous dope exhibits stir-opalescence and depolarizes plane-polarized light.

Fiber Preparation from Polymer [A] by Wet Spinning

The spin dope prepared above is centrifuged to remove entrapped gases. It is then extruded by means of mechanically driven syringe through a 0.010 in. (0.025 cm.) thick precious metal spinneret having 20 holes of 0.003 in. (0.0076 cm.) diameter into an aqueous bath at 25°C. The water bath is about 2 in. (5.1 cm.) wide and about 1 in. (2.54 cm.) deep. After passing through the bath for about 2.5 ft. (0.75 m.), the yarn is snubbed out of the water at about a 45° angle to an electrically driven wind-up drvice. The yarn is collected on a perforated bobbin at 22 ft./min. (7.22 m./min.). It is then washed in cool running water for several (i.e., 3 hr) hours and dried in air at room temperature. The filaments exhibit low crystallinity and an orientation angle of 35° as measured from a wide angle X-ray pattern. Filaments exhibit the following T/E/Mi/Den. values: 7.7/11.3/195/4.22.

Preparation of Isotropic Dope from Polymer [D]

A mixture of 5.0 g. of polymer D (see Table IX) and 45.0 g. of fuming (0.8 percent free $SO_3$) sulfuric acid is mixed anhydrously with a mechanically driven, paddle-type stirrer in a 200 ml. round-bottom flask while cooling with an ice/water bath. The mixture is allowed to stir overnight during which time the cooling bath is allowed to warm to room temperature. The resulting dope is viscous, clear and isotropic.

Fiber Preparation from Polymer [D] by Wet Spinning

The spin dope prepared above is centrifuged to remove entrapped gases. It is then extruded by means of a mechanically driven syringe through a 0.010-in. (0.025 cm.) thick precious metal spinneret having 20 holes of 0.03-in. (0.0076 cm.) diameter into an aqueous bath at 25°C. The water bath is about 2 in. (5.1 cm.) wide and about 1 in. (2.54 cm.) deep. After passing through the bath for about 2.5 ft. (0.76 m.), the yarn is snubbed out of the water at about a 45° angle to an electrically driven wind-up device. The yarn is collected on a perforated bobbin at 18 ft./min. (5.9 m./min.). It is then washed in cool running water for several (i.e., 3 hr.) hours and dried in air at room temperature. The filaments exhibit low cyrstallinity and an

TABLE IX

| Copolymer | Isophthaloyl Chloride (I) | | Terephthaloyl Chloride (T) | | Yield | η inh | T/I |
|---|---|---|---|---|---|---|---|
| | g. | mole | g. | mole | g. | | |
| [A] | 0.51 | 0.0025 | 9.65 | 0.0475 | 11.5 | 4.48 | 95/5 |
| [B] | 1.02 | 0.005 | 9.14 | 0.045 | 11.2 | 3.84 | 90/10 |
| [C] | 1.53 | 0.0075 | 8.63 | 0.0425 | 11.4 | 3.22 | 85/15 |
| [D] | 2.04 | 0.010 | 8.12 | 0.0400 | 11.7 | 1.69 | 80/20 |

Preparation of Anisotropic Dope from Polymer [A]
A mixture of 5.0 g. of Polymer A (from Table IX) and 45.0 g. of fuming (0.8 percent free $SO_3$) sulfuric orientation angle of 55° as measured from a wide angle X-ray pattern. Filaments exhibit the following T/E/Mi/Den. values: 2.4/25.1/82/5.68.

EXAMPLE 68

This example illustrates the preparation of fibers from an anisotropic dope comprising poly(p,p'-phenylenebenzamide) and fluorosulfonic acid.

A total of 28 g. of poly(p,p'-phenylenebenzamide) of $\eta$inh of about 2.0 (in sulfuric acid, 99.8 percent by wt., C = 0.5 percent) is dissolved in 102 ml. of commercial fluorosulfonic acid to form a dark gray, opaque, anisotropic dope exhibiting marked stir opalescence. All but about 5 ml. of this dope is poured into an "Inconel" spinning cell 1,870 in. (4.75 cm.) inner diameter and 4.625 in. (11.7 cm.) deep. The dope is spun through a 100-hole Pt. spinneret, each hole having a diameter of 0.0025 in. (0.0635 mm.) by exerting mechanical pressure of 190 to 330 lb./in.$^2$ (13.4 to 23.2 kg./cm.$^2$) on a piston above the spinning dope. The fiber is extruded into water at 5 – 10°C. and after a travel of about 140 cm. in this bath is wound at a rate of 45–70 ft./min. (14.7–22.6 m./min.). The fiber is washed in running water on the bobbin during windup and for 16 hours afterwards. The fiber is then dried in air on the bobbin for 1.5 hours and processed by drawing 1.14X at the rate of 25 ft./min. (8.2 m./min.) in a tube (Device C) heated to 635°C. The yarn properties are T/E/Mi = 3.70/1.2/402; orientation angle is 21°.

EXAMPLE 69

This example illustrates the preparation of fibers from an anisotropic dope comprising poly(p-phenylene p,p'-biphenyldicarboxamide), fluorosulfonic acid, and HF.

An isotropic dope is prepared by dissolving 13 g. of poly(p-phenylene p,p-diphenyldicarboxamide) ($\eta$inh = 2.2) in 40 ml. of anhydrous HF at 0°C. This dope is cooled overnight at −80°C. It is rewarmed to 0° and 20 ml. of commercial fluorosulfonic acid are added. The dope is warmed to room temperature under nitrogen to allow most of the HF to evaporate. The next day an additional 5 ml. of fluorosulfonic acid are added. A viscous stir opalescent, anisotropic dope results; the latter consists of about 25 ml. of fluorosulfonic acid, 5 ml. of HF and 13 g. of polymer. The 25 ml. of viscous opaque dope exhibits stir opalsecence. The dope is extruded into filaments by using the apparatus described in the previous example by applying 430 to 500 lb./in.$^2$ (30.5 to 35.2 kg./cm.$^2$) mechanical pressure to a piston over the dope. The filaments are wet spun into water at 9–11°C. and after a travel of 140 cm. in water and about 5 cm. in ice water (in which the filaments are snubbed by use of a pigtail guide turned at 90° to the threadline direction) are wound at a rate of 60 ft./min. (19.7 m./min.). The filaments are washed with running water on the bobbin and for four days afterwards. The filaments are drawn 1.12X at the rate of 25 ft./min. (8.2 m./min.) by passing the wet filaments through a tube (Device C) heated to 550°C. The filaments have average tensile properties of T/E/Mi/Den. = 3.2/7.2/141/2 before drawing and 5.4/1.2/508 after drawing.

EXAMPLE 70

This example illustrates the preparation of poly(3,3'-dimethyl-4,4'-biphenylene terephthalamide), poly(3,3'-dimethoxy-4,4'-biphenylene terephthalamide) and poly(3,3'-dimethoxy-4,4'-biphenylene-4,4'-biphenyldicarboxamide) and anisotropic oleum dopes thereof.

PART A

Polymer Preparation:

The procedure of Example 49 is used except that 2.12 g. of 3,3'-dimethylbenzidine is used as the daimine. The solid carbon dioxide cooling is removed at 15 min. and at 30 min. a precipitate forms. Stirring is stopped at 2 hrs. and the mixture is allowed to stand for 16 hrs. more. The washed and dried polymer weighs 3.39 g. and has an inherent viscosity of 2.11.

Dope Preparation

The polymer (2.0 g.) is dissolved anhydrously in 8.0 ml. of 100.95 percent sulfuric acid by stirring slowly for 48 hr. to form an anisotropic dope which shows stir opalescence.

PART B

Polymer Preparation

The procedure of Part A, above, is used except that 2.44 g. of 3,3'-dimethoxybenzidine is used as the diamine. Stirring is continued for 2 hrs. during which time the system becomes very viscous and then a precipitate forms. The mixture is allowed to stand 16 hrs. at room temperature. The washed and dried polymer weighs 3.9 g. and has an inherent viscosity of 0.99.

Dope Preparation

The polymer (2.0 g.) is dissolved anhydrously in 8.0 ml. of 100.95 percent sulfuric acid by stirring slowly for 24 hrs. A clear isotropic solution forms. The addition of 0.2 g. of polymer and its dissolution produces a smooth, viscous, anisotropic dope, exhibiting a high degree of stir opalescence.

PART C

Polymer Preparation: The procedure of Part A is used with the following exceptions: 3,3'-dimethoxybenzidine (2.44 g.) is used as the diamine and 4,4'-bibenzoyl chloride (2.79 g.) is added as a finely ground solid. The solid carbon dioxide cooling is removed at 15 min. and at 20 min. the mixture is viscous, but milky. Stirring is stopped at 2 hrs. and the mixture is allowed to stand for 48 hours more. The washed and dried polymer weighs 4.4 g. and has an inherent viscosity of 1.43.

Dope Preparation: The polymer (2.0 g.) is dissolved anhydrously in 8.0 ml. of 100.95 percent sulfuric acid by stirring slowly for 24 hrs. A clear isotropic solution forms. The addition of 0.2 g. of polymer and its dissolution produces a smooth, viscous, anisotropic dope, exhibiting a high degree of stir opalescense.

In another dope preparation, a similarly prepared polymer sample (2.0 g., $\eta$inh = 1.67) is stirred anhydrously for 24 hours at room temperature with 18 ml. of technical grade, methane-sulfonic acid (water content 0.30 percent, refractive index $1.4293_D^{20°}$). The resulting viscous dope is anisotropic; it is stir-opalescent and depolarizes plane polarized light when viewed through crossed polarizers.

EXAMPLE 71

This example illustrates the preparation of poly(3-methyl-p-benzamide) and anisotropic oleum dopes thereof.

Polymer Preparation: A 500 ml. resin-making kettle equipped with an egg-beater-type stirrer, calcium chloride drying tube, and nitrogen inlet tube is flamed with a Bunsen burner and simultaneously flushed with nitrogen. The kettle is sealed and placed in a dry-box. 3-Methyl-4-aminobenzoyl chloride hydrochloride (24.728 g., 0.12 mole) is weighed out in the dry-box and transferred to the kettle. The latter is removed from the dry-box, reconnected with the stirring motor nitrogen line and cooled in an ice-bath.

Cold tetramethylurea (140 ml.) is poured rapidly into the 3-methyl-4-aminobenzoyl chloride hydrochloride which is being stirred at high speed. The resulting solution followed shortly by precipitation is stirred for 1 hr. at about 5°C. and for 4 hr. at about 25°C. The mixture is now cooled in solid carbon dioxide and lithium carbonate (8,868 g., 0.12 mole) is added. The latter is stirred for one-half hr. while cooling in solid carbon dioxide and for 1 hr. at about 25°C. The mixture is allowed to stand for 63 hr. at about 25°C. The mixture is combined with water, stirred in a blender and filtered. The precipitate is washed three times with water and once each with acetone and alcohol by stirring in a blender and filtering after each wash. The polymer is dried 16 hr. at 80°C. in a vacuum oven with a nitrogen bleed. The yield is 100 percent and the $\eta_{inh} = 0.88$.

Dope Preparation: The above polymer (1.0 g.) is combined with 5.66 g. of 100.81 percent sulfuric acid (3.6 percent free $SO_3$) in a test tube and stirred with cooling until solution results. This anisotropic dope contains 15 percent polymer by weight; DDA = 80.6.

The above polymer (1.0 g.) is combined with 5.66 g. of 100.14 percent sulfuric acid (0.65 percent free $SO_3$) in a test tube and stirred with cooling until solution results. This anisotropic dope contains 15 percent polymer by weight; DDA = 92.2.

The above polymer (10.0 g.) is combined with 48.82 g. of 100.95 percent sulfuric acid (4.25 percent free $SO_3$) in a test tube and stirred with cooling until solution results. This anisotropic dope contains 17 percent polymer by weight.

EXAMPLE 72

This example illustrates the preparation of poly(p-phenylene terephthalamide), together with anisotropic oleum dopes and fibers thereof. The DDA value is shown for the dope.

To a solution of 43.2 g. (0.4 mole) of a p-phenylenediamine dissolved in 480 ml. of dry hexamethylphosphoramide and 240 ml. of dry N-methylpyrrolidone-2 contained in a blender are added, with stirring, 81.2 g. (0.4 mole) of finely ground terephthaloyl chloride. A gel forms in about 20 seconds. After 20 minutes the gel is broken up and washed three times with water, twice with alcohol and twice with acetone to give 93 g. of air-dried polymer of $\eta_{inh} = 3.13$. Several batches of somewhat higher and lower inherent viscosity polymer are prepared similarly as above and combined to give a polymer of $\eta_{inh} = 3.16$.

30 g. of the blended polymer are dissolved at room temperature in 270 g. of 100.4 percent sulfuric acid to give a fluid composition containing 10 percent polymer by weight. It is anisotropic as determined by its degree of depolarization anisotropy (DDA) value of 93.6.

The room temperature dope is extruded at 865 lb./in.² (60.7 kg./cm²) pressure through a 60-hole spinneret, each hole of 0.0025 in. (0.0635 mm.) diameter, into a water bath maintained at 4°C. The filaments are wound up at 21 ft./min. (6.8 m./min.). They exhibit the following filament tensile properties after being dried: T/E/Mi/Den. = 7.0/10.7/197/4.9.

EXAMPLE 73

This example illustrates determinations of anisotropic and isotropic phase relationships for HF, $FSO_3H$, and $ClSO_3H$ dopes prepared from various polymers and copolymers useful in this invention. A specific determination is shown for one system and summarized results (obtained in like manner but without viscosity determinations) are tabulated for the other systems.

PART A

From the data presented below and by reference to FIG. II, it is seen that discontinuity exists in the slope of a dope viscosity versus polymer concentration curve for exemplary dopes of this invention comprising poly(p-benzamide) in HF The slope of the curve changes when the polymer concentration in the dopes becomes about 14 percent (i.e., at the critical concentration). At lesser polymer concentrations the dope is clear and isotropic. However, when more polymer is added beyond the critical point, there is produced a second phase which becomes visible at 15 ± 0.5 percent and which is of lower viscosity and which is stir-opalescent and opaque. This anisotropic phase separates from the original high viscosity clear phase.

The data pertinent to the above observations are collected as follows. Two poly(p-benzamide) dopes in HF are prepared by combining samples of the polymer with HF in either a polyallomer test tube [1.5 in. (3.82 cm.) in diameter × 4 in. (10.2 cm.) deep; nearly transparent] equipped with a Teflon TFE-fluorocarbon cap through which a viscometer spindle extends into the dope or a polyethylene bottle about 1.75 in. (4.45 cm.) in diameter × 4.25 in. (10.8 cm.) deep, equipped with a cap, through which a viscometer spindle extends. A constant temperature of 0°C. is maintained by use of an external ice-water bath. The viscosity of the stirred dope is measured with a Brookfield Synchro-Lectric Viscometer (Model RV, product of the Brookfield Engineering Laboratories, Inc., Staughton, Mass.), using the No. 4 and No. 6 spindles obtained from the above-cited manufacturer. Viscosity calculations are made at different concentrations by correlating the viscometer dial readings (obtained with various spindle settings which establish spindle speeds and, therefore, shear rates) with the tabulated figures provided in the "Brookfield Factor Finder". As more polymer is added, the viscosity of the solution increases until a maximum value of about 3600 poises is measured when 13.4 percent (by weight) polymer is present in the tube. When 20 ± 1.0 percent (by weight) polymer is present at the tube, the original clear phase completely disappears and only the anisotropic phase is visible. The anisotropic phase (1) depolarizes the plane of plane polarized light when viewed through crossed polarizers in a microscope, (2) is highly stir opalescent when stirred, and (3) is thixotropic.

Specific data from these determinations are tabulated below in Table X-A:

TABLE X-A

Dope No. 1 (uses 58 ml. of anhydrous HF; $\eta$ inh = 3.9)

| Grams of polymer/ wt.% polymer | Spindle Setting/Spindle Dial Reading | Calc. Dope Viscosities in Poises |
|---|---|---|
| 3/4.9% | 50*/11.5 | 46 |
| 5/7.9% | 10*/55.5 | 110 |
| 7/10.8% | 0.5*/21.5 | 860 |
| 9/13.4% | 1**/36 | 3,600 |
| 14/19.4% | 1**/2.0 | 200 |

Dope No. 2 (uses 90 ml. of anhydrous HF, same polymer as in Dope No. 1)

| | | |
|---|---|---|
| 4/4.2% | 100*/10.5 | 2.1 |
| 6/6.2% | 50*/48 | 19 |
| 8/8.1% | 20*/90 | 90 |
| 10/10.0% | 1*/51 | 1,020 |
| 12/11.8% | 0.5*/44 | 1,760 |
| 14/13.5% | 2.5**/80 | 3,200 |
| 16/15.1% | 1**/28 | 2,800 |
| 19/17.5% | 1**/17 | 1,700 |
| 21/18.9% | 1**/8 | 800 |
| 22/19.6% | 1**/4 | 400 |
| 24/21.0% | 1**/3 | 300 |

*RV No. 4 spindle used
** RV No. 6 spindle used

When the viscosity is plotted versus polymer concentration in FIG. II (plotting both sets of results on one curve with Dope No. 1 data represented by X's and Dope No. 2 data represented by dots), the critical point is seen to occur at about 14 percent (by weight) polymer. The final viscosity of 200–400 poises is about 4–6 percent of the highest bulk viscosity measured or determined from FIG. II from the viscosity at the discontinuity in the curve. (Note: The above viscosity determinations are made with an uncalibrated viscometer-spindle system in vessels which are not of optimum dimensions; while relative viscosity determinations for the dopes are accurate, absolute values are not necessarily correct).

TABLE X-B

ANISOTROPIC AND ISOTROPIC DOPES — PHASE RELATIONSHIPS

| Polymer Of Example | | Solvent | $A^a$ | $B^a$ |
|---|---|---|---|---|
| 1 | ($\eta$inh = 4.0) | HF | 13% | 20–21% |
| 62-A | ($\eta$inh = 2.86) | FSO$_3$H | 9% | 12–13% |
| 62-A | HF 3 | 15×0.5% | 19% | |
| $\eta$inh = 3.9) | | | | |
| 62-A | ($\eta$inh = 2.86) | HF | 17% | 18–19% |
| 62-A | ($\eta$inh = 3.9) | FSO$_3$H | 8% | 10% |
| 28 | ($\eta$inh = 2.0) | FSO$_3$H | 11–12% | 14–15% |
| 27 | ($\eta$inh = 1.55) | FSO$_3$H | 9% | 15%$^b$ |
| 1 | ($\eta$inh = 3.4) | FSO$_3$H | 7–8% | 9–10% |
| 62-A | ($\eta$inh = 2.86) | ClSO$_3$H | 8% | 10% |
| 1 | ($\eta$inh = 3.4) | ClSO$_3$H | 7% | 9% |
| 28 | ($\eta$inh ~ 2.0) | ClSO$_3$H | 9% | — |
| 23 | ($\eta$inh = 3.2)c-1 | FSO$_3$H | 9% | 11% |
| 23 | ($\eta$inh = 3.5)c-2 | FSO$_3$H | 8% | 10% |
| 23 | ($\eta$inh = 3.2)c-1 | ClSO$_3$H | 9% | 10% |
| 23 | ($\eta$inh = 3.5)c-2 | ClSO$_3$H | 8% | 10% |

Legend $^a$A = Polymer concentration in dope at which visible opalescence or a second phase (anisotropic) appears.

B = Polymer concentration at which only a single phase (anisotropic) is visible.

$^b$Appears to form 2 anisotropic phases: one at about 15% and one at 19–20% by weight.

(c-1) Mole ratio of —CO—⟨C₆H₄⟩—CO—/—CO—⟨C₆H₄⟩—⟨C₆H₄⟩—CO— is 50/50

(c-2) Mole ratio of —CO—⟨C₆H₄⟩—CO—/—CO—⟨C₆H₄⟩—⟨C₆H₄⟩—CO— is 90/10

PART B

By application of the above-described procedures, the data presented below in Table X-B are obtained for the systems indicated. For the systems of the Table X-B viscosity decreases (similar to that shown above) are qualitatively observed when each given dope changes from isotropic to anisotropic as the polymer concentration of the dope is increased. The anisotropic dopes, as before, are visually stir-opalescent and depolarize the plane of plane polarized light when viewed through cross-polaroids with a microscope. In Table X-B the column entitled "Polymer Of" indicates an example herein whose general procedure may be employed to prepare the given polymer or copolymer whose dope is evaluated by the procedures of this example. Inherent viscosities are parenthetically shown for each polymer or copolymer.

EXAMPLE 74

This example illustrates the effects of the parameters of (1) acid strength and polymer concentration, (2) polymer inherent viscosity, and (3) added salts on the anisotropic sulfuric acid and oleum dopes of this invention which comprise poly(p-benzamide) and poly(p-phenylene terephthalamide).

Acid Strength and Polymer Concentration. The results of solubility investigations of poly(p-benzamide) in sulfuric acid and oleum are tabulated in Tables XI and XII. The solubility data are obtained as follows: an excess of polymer is added to the acid or oleum in a round-bottom flask equipped with a ground glass bearing and stirring rod at the end of which is attached a Teflon* TFE-fluorocarbon paddle-stirrer. The temperature of the contents of the flask is moderated with a room temperature water bath. Increments of acid or oleum are added after long (e.g., 2–16 hr.) periods of stirring and the maximum concentrations determined visually as the point at which no solid could be observed. Further increments of acid or oleum are added to the stir-opalescent, liquid anisotropic dopes until the dope becomes visually clear; the polymer concentration present when the dope becomes visually clear is taken as the critical concentration point. The data shown concerns poly(p-benzamide) samples with inherent viscosity of 2.72 and 1.53.

TABLE XI

SOLUBILITY OF POLY(p-BENZAMIDE) ($\eta$inh = 2.72)[a] IN SULFURIC ACID

| $H_2SO_4$ % | Maximum Solubility[b] | CRITICAL Point[c] |
|---|---|---|
| 96.3 | 4.5 | none |
| 97.3 | 7.14 | none |
| 99.2 | 10.3 | 8.67 |
| 100.5 | 12.7 | 8.67 |
| 102.3 | 14.4 | 8.55 |
| 104.5 | 14.5 | 8.76 |

[a] Prepared in N,N-dimethylacetamide and neutralized with $Li_2CO_3$.
[b] Determined visually as concentration (wt.% polymer) at which no solid particles are observed.
[c] Weight percent polymer in dope.

TABLE XII

SOLUBILITY OF POLY(p-BENZAMIDE) ($\eta$inh =1.53) IN SULFURIC ACID

| $H_2SO_4$ % | Maximum Solubility[a] | Critical Point[b] |
|---|---|---|
| 95.9 | 6.7% | — |
| 99.2 | 11 | 9.68 |
| 100.5 | 15.5 | 9.60 |

[a] Determined visually as concentration (wt.% polymer) at which no solid particles are observed.
[b] Weight percent polymer in dope.

Using the data from the bove Tables, Phase diagrams may be drawn as depicted in FIG. IV.

Data from similar determinations for a poly(p-phenylene terephthalamide) sample of inherent viscosity of 3.32 are tabulated in Table XIII. A phase diagram derived from these data is shown in FIG. V.

TABLE XIII

SOLUBILITY OF POLY(p-PHENYLENE TEREPHTHALAMIDE) ($\eta$inh = 3.32) IN SULFURIC ACID

| $H_2SO_4$ % | Maximum Solubility[a] | Critical Point[b] |
|---|---|---|
| 97.3 | 4.6 | — |
| 99.2 | 7.8 | — |
| 100.5 | 11.7 | 8.65 |

[a] Determined visually as concentration (wt. % polymer) at which no solid particles are observed.
[b] Weight percent polymer in dope.

Polymer Inherent Viscosity

The critical concentration for a given polymer in a given acid may be expected to vary with the molecular weight (or inherent viscosity exhibited) of the polymer. Data for poly(p-phenylene terephthalamide) samples of different inherent viscosity are shown in Table XIV. The procedure used in obtaining these data is as follows: A sufficient and known amount of polymer is completely dissolved. The resulting anisotropic dopes are then titrated (while mixing with a spatula) with the same acid or oleum until the dopes are visually clear when sheared. This method may take from several days to several weeks to dissolve the polymer because of the very high dope viscosity. Generally, the method is more satisfactory for polymers whose inherent viscosity is less than 3.5.

TABLE XIV

CRITICAL POINTS (OR concentrations) of POLY(p-PHENYLENE TEREPHTHALAMIDES) IN 100.2% SULFURIC ACID

| Polymer $\eta$inh | Critical Concentration[a] |
|---|---|
| 1.24 | 10.81% |
| 2.23 | 9.47 |
| 2.64 | 9.52 |
| 2.70 | 9.13 |
| 2.76 | 8.92 |
| 2.80 | 8.95 |
| 3.06 | 8.77 |
| 3.37 | 8.39 |

[a] Weight percent polymer in dope.

Similar information is presented for poly(p-benzamide) in Table XV. The data of this Table show a trend toward lower critical concentrations as the polymer's inherent viscosity increases. The data of Tables XIV and XV are illustrated in FIGS. VI and VII, respectively.

TABLE XV

CRITICAL POINTS (OR CONCENTRATIONS) OF POLY(p-BENZAMIDE) IN SULFURIC ACID

| Polymer $\eta$inh | $t_2SO_4$ % | Critical Concentration |
|---|---|---|
| 1.67 | 99.5 | 9.88% |
| 1.67 | 100.3 | 9.55 |
| 1.75 | 99.7 | 9.74 |
| 1.75 | 100.5 | 8.57 |
| 1.75 | 100.5 | ~10.00 |
| 2.16 | 100.2 | 9.67 |
| 2.66 | 100.2 | 9.22 |
| 2.76 | 100.2 | 9.30 |
| 2.76 | 100.3 | 9.69 |

[a] Weight percent polymer in dope.

Added Satls

The addition of salts causes oleum dopes of (I) poly(p-phenylene terephthalamide) ($\eta$inh=2.80) and (II) poly (p-benzamide) ($\eta$inh=2.72) to each become a solid mush after a given amount of salt is added. The amount of salt necessary to form the mush is shown below in Table XVI for dopes which initially comprise 3.0 g. of the polymer and 27.0 g. of 100.2 percent sulfuric acid.

TABLE XVI

DOPE-SALT SOLIDIFICATION RELATIONSHIPS

| Polymer in Dope | Salt | Amount of Salt for Solid Mush to Appear |
|---|---|---|
| I | $Na_2HPO_4$ | 0.6 g. |
| II | $Na_2HPO_4$ | 0.8 g. |
| I | KOAc[a] | 0.6 g. |
| II | $Na_2SO_4$ | 0.8 g. |

TABLE XVI-Continued

DOPE-SALT SOLIDIFICATION RELATIONSHIPS

| Polymer in Dope | Salt | Amount of Salt for Solid Mush to Appear |
|---|---|---|
| II | $Na_2SO_4$ | 0.8 g. |

<sup>a</sup> Potassium Acetate

The salts are added in 0.2 g. increments. The dopes remain fluid and exhibit stir-opalescene when lesser quantities of salt than those shown in the Table are present in each dope.

EXAMPLE 75

This example illustrates the effect of temperature and weight percent of polymer on the critical concentration points for poly(p-benzamide) and poly(p-phenylene terephthalamide).

Poly(p-benzamide), having an inherent viscosity of about 2.72, is prepared in a manner similar to that previously described. Dopes are prepared of various concentrations, namely 9.2, 10.0 and 12.0 percent in 99.5 percent by weight $H_2SO_4$ at room temperature. Each of these dopes are anisotropic at that temperature. As the temperature is gradually increased, the three dope samples convert to essentionally isotropic dopes at 29°C., 53°C., and 77° C., respectively.

Poly(p-phenylene terephthalamide) having an inherent viscosity of about 3.16 is prepared in a manner similar to that previously described. Dopes are prepared of various concentrations, namely, 9.2, 10.0 and 12.0 percent in 100.3 percent by weight $H_2SO^4$ at room temperature. Each of these dopes are anisotropic at that temperature. As the temperature is gradually increased, the three dope samples convert to essentially isotropic dopes at 41°C., 67°C. and 109°C., respectively.

The points where each of the above samples convert to an essentially isotropic dope is the critical volume concentration point for each. As the example indicates, this point for a particular polymer/liquid medium is dependent on the temperature of the dope and the weight percent of polymer therein.

EXAMPLE 76

This example illustrates the preparation of poly(2-chloro-1,4-phenylene terephthalamide), an anisotropic spin dope in N,N-dimethylacetamide/lithium chloride and high modulus fibers therefrom.

Polymer Preparation:

Powdered terephthaloyl chloride (95.0 g., 0.468 mole) is added at once to a cooled (ca. 3°C) solution of 2-chloro-1,4-phenylene diamine(71.4 g., 0.502 mole) in 2000 ml. of N,N-dimethylacetamide; the mixture is stirred at high speeds while being cooled with an ice/water bath. The mixture becomes stir-opalescent after about 1 to 2 minutes. Ten minutes after the addition of terephthaloyl chloride, 37.0 g. (0.501 mole) of powdered lithium carbonate is added at once with sufficient cooling to maintain the temperature at leas than about 10°C. After stirring is continued for about 5 min., powdered terephthaloyl chloride is added in small amounts until the mixture is quite thick. The cooling bath is removed and the dope is allowed to warm to room temperature at which time more powdered terephthaloyl chloride is added over a period of a few minutes (i.e., 5 min.) in small increments until a maximum of 0.500 mole total terephthaloyl chloride has been added, or until the dope no longer flows. Usually a smaller quantity (i.e., 0.490 mole) is used in order to maintain at all times a fluid dope. The dope is then allowed to stand at room temperature for a few hours (i.e., 12 hr). during which time it becomes somewhat more fluid. A small portion of the dope is combined with water and agitated in a high speed blender. The polymer is collected by filtering through a glass-funnel or coarse porosity. The wet polymer is dried in a vacuum oven at about 70°C. The inherent viscosity measured as a 0.5 percent (W/V) solution in 95–98 percent (by weight) sulfuric acid is 2.79. The dope is combined with another similarly prepared dope and used directly for yarn production. The dope exhibits stir-opalescence and depolarizes polarized light.

Fiber Preparation by Wet Spinning:

The spin dope prepared above is extruded at the rate of about 41 ml./min. through a precious metal spinneret having 580 holes of 0.003 in. (0.0076 cm.) diameter into an aqueous coagulating bath maintained at about 15°C. The bath is about 12 in. (30.48 cm.) wide, 4.5 in. (10.8 cm.) deep and 5.5 ft. (1.676 m.) long. The filament bundle is drawn through the bath and snubbed out of the bath at about a 45° angle to an electrically driven wind-up device. The yarn is collected at 144 ft./min. (43.89 m./min.), washed in cool running water for a few hours (i.e., 3 hrs.) and then dried in air at room temperature. The dry filaments exhibit low crystallinity and an orientation angle of 30° as measured from a wide angle X-ray pattern. A yarn twisted at three turns per inch exhibits the following T/E/Mi/Den. values: 11.4/5.6/379/555.

Heat Treatment:

The yarn prepared above is passed at 15 ft./min. (4.572 m./min.) through a nitrogen filled tube [Device B] assembly heated to 450°C. and collected at 15.75 ft./min. (4.801 m./min.). The resulting filaments exhibit high crystallinity and an orientation angle of 12° as measured from a wide angle X-ray pattern. A 10-inch length of yarn twisted at three turns per inch exhibits the following T/E/Mi/Den. values: 11.9/1.4/875/493 and the yarn exhibits a sonic velocity of 7.84 km./sec.

EXAMPLE 77

This example illustrates the preparation of poly(2-methyl-1,4-phenylene terephthalamide), an anisotropic spin dope in hexamethylphosphoramide/N-methyl-2-pyrrolidone/lithium chloride, and high modulus fibers therefrom.

Polymer Preparation:

Powdered terephthaloyl chloride (10.15 g.; 0.05 mole) is added at once to an ice/water-cooled slurry of 2-methyl-1,4-phenylene diamine dihydrochloride 9.75 g. (0.05 mole) in 56 ml. of hexamethylphosphoramide and 112 ml. of N-methyl-2-pyrrolidone and the mixture is stirred at high speeds. The mixture becomes clear within one minute and slowly becomes more viscous. After about 2.5 hr., 7.4 g. of $Li_2CO_3$ is added to give, after vigorous mixing, an anisotropic dope having the consistency of a heavy grease. The dope depolarizes polarized light. A small portion of the dope is removed and worked-up with water and dried in a vacuum oven at 70°C. The inherent viscosity is 4.46 in 95–98 percent (by weight) sulfuric acid. The dope is allowed to stand at room temperature for 4 days and is then used for spinning.

Fiber Preparation by Wet Spinning:

The spin dope is extruded at the rate of about 2.0 ml./min. through a metal spinneret having 100 holes of 0.0025 in. (0.0064 cm.) diameter into an aqueous coagulating bath maintained at 17°C. The bath is about 16 in. (40 cm.) wide, 5.5 in. (14 cm.) deep, and 37 in. (94 cm.) long. The filament bundle is drawn through the coagulant and is then snubbed out of the bath at about a 45° angle to an electrically driven wind-up device. The filaments are collected at 23 ft./min. (7.015 m./min.), washed in cool water for several days, and dried in air at room temperature. The dry filaments exhibit low crystallinity and an orientation angle of ca. 50° as measured from a wide angle X-ray pattern. Filaments exhibit the following T/E/Mi/Den. values: 9.74/10.2/287/1.64.

Another portion of the dope is extruded at the rate of about 0.9 ml./min. through a precious metal spinneret having 20 holes of 0.002 in. (0.0051 cm.) diameter into a bath of isopropanol maintained at 24°C. The bath is about 2 in. (5.1 cm.) wide, about 1 in. (2.54 cm.) deep, and about 2.0 ft. (0.61 m.) long. The yarn is drawn through the coagulant and is then snubbed out of the bath at about a 45° angle to an electrically driven wind-up device. The yarn is collected at 35 ft./min. (10.68 m./min.) washed in cool running water for several days, and dried in air at room temperature. The dry filaments exhibit low crystallinity and an orientation angle of ca. 40° as measured from a wide angle X-ray pattern. Filaments exhibit the following T/E/Mi/Den. values: 9.0/8.6/265/1.82.

Heat Treatment:

The yarn prepared above (from isopropanol coagulant) is passed at 25 ft./min. (7.62 m./min.) through a nitrogen filled tube (Device B) assembly heated to 450°C. and collected at 26.3 ft./min. (8.02 m./min.); draw ratio is 1.05X. The resulting filaments exhibit medium crystallinity and an orientation angle of 20° as measured from a wide angle X-ray pattern. The filaments exhibit the following T/E/Mi/Den. values: 8.53/2.1/448/1.809; sonic velocity is 7.27 km./sec.

EXAMPLE 78

This example illustrates the preparation of an anisotropic dope of poly(2-nitro-1,4-phenylene terephthalamide) in a mixture of hexamethylphosphoramide, N-methyl-2-pyrrolidone, and lithium chloride.

Dope Preparation:

Powdered terephthaloyl chloride (6.09 g., 0.030 mole) is added at once to a solution of 2-nitro-1,4-phenylene diamine (4.59 g., 0.030 mole) in 45 ml. of N-methyl-2-pyrrolidone and 25 ml. of hexamethylphosphoramide and stirred rapidly while cooling with an ice/water bath. The dope becomes stir-opalescent within a few minutes (i.e., 2 min.) and after about 3 hrs., 2.22 g. (0.030 mole) of $Li_2CO_3$ is added to give a stir-opalescent dope which depolarizes light under crossed polars.

A sample of isolated polymer had an inherent viscosity of 0.86

EXAMPLE 79

This example illustrates the preparation of poly(3,3'-dichloro-4,4'-biphenylene terephthalamide) from 3 3'-dichlorobenzidine and terephthaloyl chloride, and fibers therefrom.

Polymer Preparation:

In a 500-ml. resin kettle equipped with a disc stirrer, a nitrogen bleed, and an outlet capped with a drying tube, are placed 250 ml. of hexamethylphosphoramide, 250 ml. of N-methylpyrrolidone-2, and 25.3 g. of 3,3'-dichlorobenzidine. After a solution is formed, the vessel is cooled with a bed of solid carbon dioxide and 20.3 g. of terephthaloyl chloride are added with stirring. Initially a clear solution forms, but this soon changes to a slurry which remains stirrable. The cooling bath is removed after 15 minutes; after 1 hour, 14.8 g of lithium carbonate powder are added. Stirring is continued for about an hour at which time the mixture is no longer stirrable with this equipment. The closed vessel and contents are allowed to stand at room temperature for about 16 hours. The polymer is isolated by precipitation in water, washed thoroughly with water, and dried in a vacuum oven. The yield is 38.92 g. and the inherent viscosity of the polymer is 1.69.

Dope and Fiber Preparation:

The above polymer (10 g.) is dissolved in 100 g. of concentrated (95–98 percent) sulfuric acid to form a clear, viscous dope at about 45°C. At 26°C. the dope becomes stiff and opaque. The dope is extruded from a warmed cell through a spinneret having 20 holes of 0.003 inch (0.076 mm.) diameter into a water bath maintained at 45°C. The filaments are wound up at 72 ft./min. (22 m./min). The yarn is soaked on perforated bobbins in two changes of distilled water for a total of 24 hours and is then air-dried. The as-extruded filaments then exhibit the following tensile properties: T/E/Mi/Den.: 1.8/32.3/68.8/8.3; sonic velocity is 2.71 km./sec. After being extended 1.75X while being slowly hand drawn over a 300°C. hot bar [0.5 inch (1.27 cm.) contact surface], the filaments exhibit the following properties: T/E/Mi/Den.: 2.07/0.6/326/6.3/; O.A. = 12°; and medium crystallinity. After the as-extruded yarn is drawn as just described except that the bar is at 400°C. the following filament properties are observed: T/E/Mi/Den.: 3.35/0.9/372/5.9; O.A. = 12°; and high crystallinity.

EXAMPLE 80

This example illustrates the preparation of high modulus fiber of ordered poly(chloro-p-phenylene terephthalamide).

Preparation of N,N'-bis(4-nitro-2-chlorophenyl)-terephthalamide

In a 1 l. 3-neck round bottom flask provided with a stirrer, nitrogen inlet and drying tube, a solution of 52.56 g. (0.3 mole) 4-nitro-2-chloroaniline (recrystallized from water) in 250 ml. of distilled hexamethylphosphoramide is prepared. The solution is cooled with an ice bath, and 30.45 g. (0.15 mole) terephthaloyl chloride is added in small portions over a period of 1½ hours. After the addition is completed, the ice-bath is removed. A precipitate forms in 4 hours and the resulting suspension is stirred for 20 hours. After this period 1 l. of water is added to precipitate the product. The pale yellow powder is filtered, and washed two times with hot water in a blender. After being dried at 80°C.

in a vacuum oven, 68.2 g. (95 percent of theoretical) of product is obtained; m.p. 339°C. (determined by Differential Thermal Analysis).

The IR spectrum shows carbonyl absorption at 5.87μ, $NO_2$ and φ-Cl absorption.

Preparation of N,N'-bis(4-amino-2-chlorophenyl)-terephthalamide

Forty grams of the above dinitro-compound is reduced in 320 ml. N,N-dimethylacetamide using Raney Ni catalyst at 100°C. and 900 psi (63.2 kg./cm.$^2$) hydrogen over a period of 3 hours. The resulting solution is heated to 100°, filtered free of suspended catalyst, and is treated with water at 90–95° to the cloud point. A fine precipitate separates out on cooling. This is collected, washed two times with warm water, and dried in a vacuum oven at less than 100°C. The yield of diamine is 26.4 g. m.p. 261°C. The infrared spectrum shows carbonyl absorption at 6.05μ, amine absorption, and is consistent with the expected structure.

Anal. Calcd. for $C_{20}H_{16}N_4O_2Cl_2$:
Calcd.: C, 57.84; H, 3.88; N, 13.49
Found: C, 58.92; H, 3.83; N, 13.37

Preparation of high modulus fibers of an ordered poly(chloro-p-phenylene terephthalamide)

In a 500-ml. resin kettle equipped with an air-driven basket type stirrer, a nitrogen inlet, and a drying tube is placed N,N'-bis(4-amino-2-chlorophenyl)terephthalamide (6.23 g., 0.015 mole), lithium chloride (1.25 g.) and N,N-dimethylacetamide (120 ml.). The solution is cooled with a wet ice bath for 15 minutes, then terephthaloyl chloride (2.74 g., 0.0135 mole) is added. The resulting mixture is stirred rapidly. After 5 minutes, lithium carbonate (1.11 g.) is added. After an additional 5 minutes, the reaction mixture appears as a slightly viscous solution. Additional terephthaloyl chloride (0.25 g.) is added in small quantities and allowed to react until the reaction mixture appears as a soft gel. The solution is stirred overnight, and after standing for several days forms a solution which has the property of depolarizing light when observed between crossed polars. A small portion of the solution is precipitated in water, and the solid polymer which results is washed several times with water and acetone, then dried in a vacuum oven. The polymer has an inherent viscosity of 3.25.

The above-prepared dope is centrifuged to remove air bubbles and is then extruded through a 60-hole spinneret, each hole of 0.002 inch (0.05 mm.) diameter, into a water bath at 10°C. The filaments are wound up at the rate of 50 ft./min. (15.2 m./min.) and washed in distilled water overnight. After the yarn is dried in air at room temperature, the following filament properties are observed: T/E/Mi/Den = 10.6/6.6/343/1.49; orientation angle = 32°. The sonic velocity observed is 5.91 km./sec., measured at 0.1 gm./den. tension.

The yarn is heat treated by being passed at an input speed of 25 ft./min. (7.6 m./min.) through a tube (Device A) heated 437°C; the yarn is drawn 1.06 X while passing through the tube. Filaments then exhibit the following properties: T/E/Mi/Den. = 13.3/1.9/763/1.36; orientation angle = 13°.

EXAMPLE 81

This example illustrates the preparation of high modulus fibers of poly(2,6-dichloro-p-phenylene terephthalamide).

In a 1-liter resin kettle equipped with an air-driven basket-type stirrer, a nitrogen inlet, and a drying tube are placed 2,6-dichloro-p-phenylenediamine (17.70 g. 0.10 mole) and N,N-dimethylacetamide (410 ml.). The solution is cooled with a wet ice bath for 15 minutes after which powdered terephthaloyl chloride (20.30 g., 0.10 mole) is added while the solution is stirred rapidly. The ice bath is removed after 20 minutes and replaced by a water bath maintained at room temperature. The solution gradually increases in viscosity. After being allowed to stand for 3 days, the reaction mixture forms a clear, very viscous solution. A sample of the polymer is precipitated from the reaction mixture by combining a portion of it with water. The solid polymer is washed several times with water and once with acetone, after which it is dried in a vacuum oven; ηinh = 3.77. Lithium carbonate (7.39 g., 0.10 mole) is added to the remainder of the clear reaction mixture, with stirring. An unstirrable gel is formed. The polymer is precipitated by combining the reaction mixture with water. The polymer is washed repeatedly with water and finally with acetone. The polymer is dried in a vacuum oven; ηinh = 3.84.

A spin dope is prepared by combining 23.9 grams of the above-prepared polyamide and 75 ml. of concentrated (100.2 percent) sulfuric acid in a jacketed resin kettle and stirring the mixture with a shear disc-type stirrer until a smooth, pinkish, stir opalescent dope is formed. This dope depolarizes plane-polarized light when observed between crossed polars. The dope is centrifuged and is then extruded by means of an oil-driven piston through a 20-hole spinneret, each hole of 0.003-inch (0.076 mm.) diameter into a water bath maintained at 4°C. The filaments are wound up at the rate of 6.5 ft./min. (1.98 m./min.), and are washed in running distilled water overnight. After being dried in air at room temperature, the filaments exhibit the following properties: T/E/Mi/Den. = 8.73/5.6/241/3.16; orientation angle = 31°; sonic velocity is 5.31 km./sec.

A sample of the yarn is heat treated by being passed at an input speed of 25 ft./min. (7.7 m./min.) through a tube (Device A) heated to 454°C.; the yarn is drawn 1.05x while passing through the tube. Filaments exhibit the following tensile properties: T/E/Mi/Den.: 14.6/3.5/490/2.65; orientation angle is 15°, the filaments have high crystallinity, sonic velocity is 7.27 km./sec.

EXAMPLE 82

This example illustrates the preparation of high modulus fibers of poly(p-phenylene 2,5-dichloroterephthalamide).

A solution of p-phenylenediamine (17.28 g., 0.162 mole) in hexamethylphosphoramide (120 ml.) and N-methyl-pyrrolidone-2 (240 ml.) is prepared in a 1-liter resin kettle, using mechanical stirring. To this is added 2,5-dichloroterephthaloyl chloride (43.52 g., 0.162 mole), using water bath cooling. The contents of the kettle quickly become extremely viscous and the polymer precipitates in about a minute. The reaction mixture is stirred with a spatula to give a wet powder which is permitted to stand overnight. After the powder is agitated with water in a blender and the resultant product isolated, washed, and dried in a vacuum oven at 70°C., there is obtained poly(p-phenylene 2,5-dichloroterephthalamide), 49.5 g. ηinh = 1.59 .

A spin dope is prepared by combining 3.5 g. of the above-prepared polyamide with 46.5 g. of concentrated (99.5 percent) sulfuric acid, using a paddle stirrer for mixing. This dope is extruded through a 60-hole spinneret, each hole of 0.002 inch (0.05 mm.) diameter, into a water bath maintained at 8°C. The resultant filaments are wound up at the rate of 25 ft./min.) and washed in cold running water on the bobbin overnight. After the yarn is dried in air at room temperature, a filament sample removed from the bobbin exhibits the following properties: T/E/Mi/Den.: 2.40/24.4/85.3/1.6. The filaments have low crystallinity and trace orientation. The yarn is heat-treated by being passed at an input speed of 25 ft/min. (7.6 m./min.) through a tube [Device A] heated to 305°C.; the yarn is drawn 1.3X while passing through the tube. The yarn is then again passed at the same speed through the same tube (not heated to 502°C.) without being drawn. Filaments exhibit the following properties: T/E/Mi/Den. 7.36/2.4/386/0.93, orientation angle is 24°and the filaments have high crystallinity.

EXAMPLE 83

This example illustrates the percentage of crystallites aligned within an angle equal to one half the orientation angle of the fiber axis for particular as-extruded polymer samples from some of the foregoing examples. The intensity trace of the fiber's diffraction pattern of each of these samples is not necessarily Guassian-like curve.

The orientation angle of each of the following as-extruded samples is determined using Method One, previously described, and the percentage of crystallities is determined also as previously described. The difference, if any, in the stated orientation angle value, is due to the greater degree of precision in Method One, as comapred to Method Two values stated in the preceding examples. The orientation angle and crystallite percentage values are stated in the following table (Table XVII). As the table indicates in each instance, greater than about 50 percent of the crystallites are aligned within one half the orientation angle.

TABLE XVII

| Example | O.A. | % of Aligned Crystallites |
|---------|------|---------------------------|
| 2 | 29° | 65% |
| 6 | 30° | 70% |
| 14 | 33° | 68% |
| 16 | 24° | 64% |
| 18 | 24° | 65% |
| 20 | 25° | 66% |
| 23B | 28° | 71% |
| 40 | 20° | 56% |
| 46 | 24° | 66% |
| 76 | 24° | 68% |
| 81 | 25° | 76% |

What is claimed is:

1. Fiber of polymer consisting essentially of at least one carbocyclic aromatic homo- or copolycarbonamide having chain extending bonds from each aromatic nucleus which are coaxial or parallel and oppositely directed, the orientation of said fiber being characterized by an orientation angle of less than about 45°, said fiber having an initial modulus of at least about 300 grams per denier.

2. Fiber of claim 1 having a tenacity of at least about 5 grams of denier.

3. Fiber of claim 2 wherein said orientation is further chracterized by a sonic velocity of at least about 4.0 km./sec.

4. Fiber of claim 3 wherein said orientation angle is less than about 35°, said sonic velocity is at least about 6.0 km./sec.

5. Fiber of claim 4 wherein said sonic velocity is at least about 7.0 km./sec.

6. Fiber of claim 4 wherein said orientation angle is less than about 25°.

7. Fiber of claim 4 wherein said initial modulus is at least about 400 grams per denier.

8. As-extruded fiber of polymer consisting essentially of at least one carbocyclic aromatic homo- or copolygcarbonamide having chain extending bonds from each aromatic nucleus which are coaxial or parallel and oppositely directed, the orientation of said fiber being characterized by an orientation angle of less than about 45°, said fiber having a tenacity of at least about 5 grams per denier.

9. Fiber of claim 8 having an elongation of at least about 5 percent.

10. Fiber of claim 9 having an initial modulus of at least about 200 grams per denier.

11. Fiber of claim 10 wherein said orientation is further characterized by a sonic velocity of at least about 4.0 km./sec.

12. Heat-treated fiber of polymer consisting essentially of at least one carbocyclic aromatic homo- or copolycarbonamide having chain extending bonds from each aromatic nucleus which are coaxial or parallel and oppositely directed, sad fiber being characterized by an orientation angle less than about 45° and a sonic velocity at least about 4.0 km./sec., said fiber having an initial modulus of at least about 300 grams per denier and a tenacity of at least about 5 grams per denier.

13. Fiber of claim 12 wherein said orientation angle is less than about 25° and said sonic velocity is at least about 7.0 km./sec., said fiber having an initial modulus of at least about 400 grams per denier.

14. Fiber of polymer consisting essentially of at least one carbocyclic aromatic homo- or random copolycarbonamide having chain extending bonds from each aromatic nucleus which are coaxial or parallel and oppositely directed, the orientation of said fibers being characterized by an orientation angle of less than about 45°, said fibers having an intial modulus of at least about 300 grams per denier.

15. Fiber of claim 14 wherein said orientation is further characterized by a sonic velocity of at least about 4.0 km./sec. and said fiber has a tenacity of at least about 5 grams per denier.

16. Fiber of claim 1 wherein the polymer of the fiber is a homopolyamide.

* * * * *

PO-1050
(5/69)

UNITED STATES PATENT OFFICE
CERTIFICATE OF CORRECTION

Patent No. 3,819,587    Dated June 25, 1974

Inventor(s) Stephanie Louise Kwolek

It is certified that error appears in the above-identified patent and that said Letters Patent are hereby corrected as shown below:

Cover page, change the spelling of "Kwoleck" to read -- Kwolek --, both occurrences.

Column 1, line 11, after "June 12, 1968" insert -- now abandoned --.

Column 1, line 17, insert -- SPECIFICATION -- as a heading before the paragraph.

Column 5, line 3, "IV" should read -- (IV) --.

Column 11, line 59, "0.5" should read -- 0.5% --.

Column 13, line 36, " T " should read -- "T" --.

Column 13, line 37, " T " should read -- "T" --.

Column 15, line 4, " DDA " should read -- "DDA" --.

UNITED STATES PATENT OFFICE
CERTIFICATE OF CORRECTION

Patent No. 3,819,587　　　　　　　　　Dated June 25, 1974

Inventor(s) Stephanie Louise Kwolek

It is certified that error appears in the above-identified patent and that said Letters Patent are hereby corrected as shown below:

Column 17, line 59, "filter" should read -- fiber --.

Column 19, line 23, "Figure III" should read -- Figure VIII --.

Column 19, line 24, "shown" should read -- show --.

Column 19, lines 30 and 31, " As-spun or as-extruded " should read -- "As-spun" or "as-extruded" --.

Column 19, line 57, "leat" should read -- least --.

Column 20, line 7, "essentiall" should be deleted.

Column 20, line 48, "polpmer" should read -- polymer --.

Column 20, line 61, "denier," second occurrence should read -- denier. --.

Column 21, line 59, "Devcie" should read -- Device --.

UNITED STATES PATENT OFFICE
CERTIFICATE OF CORRECTION

Patent No. 3,819,587     Dated June 25, 1974

Inventor(s) Stephanie Louise Kwolek

It is certified that error appears in the above-identified patent and that said Letters Patent are hereby corrected as shown below:

Column 22, line 4, "throug" should read -- through --.

Column 22, line 12, " Pyrovane " should read -- "Pyrovane" --.

Column 22, line 23, " "0.286" " should read -- 0.286" --.

Column 22, line 24, "(7,26 mm.)" should read -- (7.26 mm.) --.

Column 22, line 24, " "32" " should read -- 32" --.

Column 22, line 35, " Pyrovane " should read -- "Pyrovane" --.

Column 22, line 64, "wich" should read -- which --.

Column 23, line 3, "pol" should read -- poly --.

Column 23, line 23, "2," should read -- 20, --.

Column 24, line 28, "12.45" should read -- 12045 --.

UNITED STATES PATENT OFFICE
CERTIFICATE OF CORRECTION

Patent No. 3,819,587       Dated June 25, 1974

Inventor(s) Stephanie Louise Kwolek

It is certified that error appears in the above-identified patent and that said Letters Patent are hereby corrected as shown below:

Column 31, line 58, "12,65" should read -- 12.65 --.

Column 32, line 58, "(3.52 $_{Kg}$/cm.$^2$)" should read -- (3.52 $^{Kg}$/cm.$^2$) --.

Column 35, line 45, "wqth" should read -- with --.

Column 35, line 67, "Th" should read -- The --.

Column 37, line 1, "H$_2$SO4" should read -- H$_2$SO$_4$ --.

Column 37, line 44, "2,6naphthalamide" should read -- 2,6-naphthalamide --.

Column 38, line 42, "0.025 in" should read -- 0.025 in. --.

Column 42, line 15, "pyroolidone" should read -- pyrrolidone --.

Column 47, line 26, "(O.A)" should read -- (O.A.) --.

UNITED STATES PATENT OFFICE
CERTIFICATE OF CORRECTION

Patent No. 3,819,587  Dated June 25, 1974

Inventor(s) Stephanie Louise Kwolek

It is certified that error appears in the above-identified patent and that said Letters Patent are hereby corrected as shown below:

Column 48, line 20, "(62.200" should read -- (62.220 --.

Column 50, line 14, "90/10)" should read -- (90/10) --.

Column 50, line 35, "galatinous" should read -- gelatinous --.

Column 51, line 31, " resin kettle " should read -- "resin kettle" --.

Column 52, line 68, "km.sec." should read -- km./sec. --.

Column 56, line 46, "exceptions" should read -- exceptions: --.

Column 57, line 15, "600°F." should read -- 600°C. --.

Column 58, line 8, "2,2" should read -- 2.2 --.

Column 59, line 25, "poly(p." should read -- poly(p, --.

UNITED STATES PATENT OFFICE
CERTIFICATE OF CORRECTION

Patent No. 3,819,587      Dated June 25, 1974

Inventor(s) Stephanie Louise Kwolek

It is certified that error appears in the above-identified patent and that said Letters Patent are hereby corrected as shown below:

Column 59, line 65, ".(2)" should read -- , (2) --.

Column 60, line 62, "22'." should read -- 22° --.

Column 61, line 2, insert a comma before "(2)".

Column 61, line 22, " rubbery " should read -- "rubbery" --.

Column 62, line 61, "(60.9" should read -- (60.0 --.

Column 65, line 31, "(3.79 l.))" should read -- (3.79 l.) --.

Column 65, line 41, " egg-beater " should read -- "egg-beater" --.

PO-1050
(5/63)

UNITED STATES PATENT OFFICE
CERTIFICATE OF CORRECTION

Patent No. 3,819,587      Dated June 25, 1974

Inventor(s) Stephanie Louise Kwolek

It is certified that error appears in the above-identified patent and that said Letters Patent are hereby corrected as shown below:

Column 66, line 24, "stired" should read -- stirred --.

Column 66, line 51, "95:95:9" should read -- 95:95:5 --.

Column 69, line 2, after "fiber" insert -- collected --.

Column 70, line 25, "8.01" should read -- 8.0 --.

Column 71, line 18, after "spinning" change "an" to -- of --.

UNITED STATES PATENT OFFICE
CERTIFICATE OF CORRECTION

Patent No. 3,819,587          Dated   June 25, 1974

Inventor(s) Stephanie Louise Kwolek

It is certified that error appears in the above-identified patent and that said Letters Patent are hereby corrected as shown below:

Column 72, line 6, "comined" should read -- combined --.

Column 73, line 57, "bibenzoly" should read -- bibenzoyl --.

Column 73, line 64, "yeild" should read -- yield --.

Column 74, line 13, "dired" should read -- dried --.

Column 75, line 61, "immerion" should read -- immersion --.

Column 76, line 3, "(device A)" should read -- (Device A) --.

Column 87, line 12, "1,870" should read -- 1.870 --.

Column 88, line 66, after "thereof." insert -- DDA values are shown for the dopes. --

Column 89, line 15, "(8,868 g." should read -- (8.868 g. --.

PAGE 9

PO-1050
(5/69)

UNITED STATES PATENT OFFICE
CERTIFICATE OF CORRECTION

Patent No. 3,819,587          Dated   June 25, 1974

Inventor(s)  Stephanie Louise Kwolek

It is certified that error appears in the above-identified patent and that said Letters Patent are hereby corrected as shown below:

Column 90, line 21, "HF" should read -- HF. --.

Column 90, line 23, after "14%" insert -- by weight --.

Column 92, line 9, Table X-B, Example 62-A, second occurrence, should be deleted and replaced with -- 62-A ($\eta$inh = 3.9) - HF 3 - 15 $\pm$ 0.5% - 19% -- under the appropriate columns; line 11, delete "$\eta$inh = 3.9)"

Column 92, line 39, Legend, column B, after "is" insert -- visible --; line 37, delete "visible".

Column 93, line 20, Table XI, delete the headings " % $H_2SO_4$ Solubility$^b$ ", "Maximum Point$^c$", and "CRITICAL" and insert therefor -- $H_2SO_4$ % --, -- Maximum Solubility $^b$ --, and -- Critical Point$^c$ --.

Column 93, line 41, "Phase" should read -- phase --.

Column 94, line 50, "Satls" should read -- Salts --.

Column 95, line 34, "H$_2$SO4" should read -- $H_2SO_4$ --.

Column 95, line 35, "are" should read -- is --.

UNITED STATES PATENT OFFICE
CERTIFICATE OF CORRECTION

Patent No. 3,819,587      Dated June 25, 1974

Inventor(s) Stephanie Louise Kwolek

It is certified that error appears in the above-identified patent and that said Letters Patent are hereby corrected as shown below:

Column 101, line 7, "min.)" should read -- min. --; after "min.)" insert -- (7.6 m./min.) --.

Column 101, line 17, "not" should read -- now --.

Column 102, line 19, claim 8, "copolyg-" should read -- copoly- --.

Column 102, line 38, "sad" should read -- said --.

Signed and sealed this 3rd day of June 1975.

(SEAL)
Attest:

RUTH C. MASON
Attesting Officer

C. MARSHALL DANN
Commissioner of Patents
and Trademarks